(12) United States Patent
Park et al.

(10) Patent No.: US 11,595,880 B2
(45) Date of Patent: *Feb. 28, 2023

(54) NODE SELECTION FOR NETWORK SHARING

(71) Applicant: HONDA MOTOR CO., LTD., Tokyo (JP)

(72) Inventors: Kyungmin Park, Herndon, VA (US); Esmael Dinan, McLean, VA (US); Hyoungsuk Jeon, Centreville, VA (US); Hua Zhou, Herndon, VA (US); Alireza Babaei, Fairfax, VA (US); Ali Cirik, Herndon, VA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/724,259

(22) Filed: Apr. 19, 2022

(65) Prior Publication Data

US 2022/0295382 A1    Sep. 15, 2022

Related U.S. Application Data

(63) Continuation of application No. 16/437,791, filed on Jun. 11, 2019, now Pat. No. 11,343,755.
(Continued)

(51) Int. Cl.
*H04W 48/08* (2009.01)
*H04W 72/04* (2009.01)
(Continued)

(52) U.S. Cl.
CPC .......... *H04W 48/10* (2013.01); *H04W 48/08* (2013.01); *H04W 48/20* (2013.01);
(Continued)

(58) Field of Classification Search
CPC ..... H04W 48/10; H04W 48/20; H04W 48/08; H04W 72/0413; H04W 72/0433;
(Continued)

(56) References Cited

U.S. PATENT DOCUMENTS

| 2017/0223584 A1 | 8/2017 | Deng et al. |
| 2018/0242223 A1 | 8/2018 | Chendamarai Kannan et al. |

(Continued)

OTHER PUBLICATIONS

Non-Final Office Action dated Dec. 12, 2019, issued in U.S. Appl. No. 16/437,783 (16 pages).
(Continued)

*Primary Examiner* — Ashley Shivers
(74) *Attorney, Agent, or Firm* — WHDA, LLP

(57) ABSTRACT

A base station distributed unit transmits at least one system information block to a wireless device. The at least one system information block indicates a first public land mobile network (PLMN) and a second PLMN. The base station distributed unit receives a radio resource control message from the wireless device. The radio resource control message indicates at least one PLMN of the first PLMN and the second PLMN. The base station distributed unit determines, by based on the at least one PLMN, at least one base station central unit from: a first base station central unit of the first PLMN; and a second base station central unit of the second PLMN. The base station distributed unit transmits the radio resource control message to the at least one base station central unit.

19 Claims, 49 Drawing Sheets

---

Receive, by a 1st base station CU from a base station DU, 2nd configuration parameter(s) associated with a 2nd base station CU
4810

↓

Send, by the 1st base station CU to the base station DU, system information block(s) comprising: 1st configuration parameter(s) associated with the 1st base station CU; and the 2nd configuration parameter(s)
4820

Related U.S. Application Data

(60) Provisional application No. 62/696,912, filed on Jul. 12, 2018, provisional application No. 62/683,373, filed on Jun. 11, 2018.

(51) Int. Cl.
  *H04W 84/04* (2009.01)
  *H04W 48/10* (2009.01)
  *H04W 48/20* (2009.01)
  *H04L 5/00* (2006.01)
  *H04W 88/08* (2009.01)

(52) U.S. Cl.
  CPC ... *H04W 72/0413* (2013.01); *H04W 72/0433* (2013.01); *H04L 5/0032* (2013.01); *H04W 84/042* (2013.01); *H04W 88/085* (2013.01)

(58) Field of Classification Search
  CPC . H04W 84/042; H04W 88/085; H04W 48/12; H04W 48/18; H04W 88/10; H04W 72/042; H04W 92/12; H04L 5/0032
  See application file for complete search history.

(56) References Cited

U.S. PATENT DOCUMENTS

| | | | |
|---|---|---|---|
| 2018/0288815 | A1 | 11/2018 | Byun et al. |
| 2018/0338277 | A1 | 11/2018 | Byun et al. |
| 2018/0368109 | A1 | 12/2018 | Kim |
| 2019/0075552 | A1 | 3/2019 | Yu et al. |
| 2019/0150220 | A1 | 5/2019 | Byun et al. |
| 2019/0159086 | A1 | 5/2019 | Xu et al. |
| 2019/0288909 | A1 | 9/2019 | Kadiri et al. |
| 2019/0335391 | A1 | 10/2019 | Kwon et al. |
| 2019/0342809 | A1 | 11/2019 | Kim |
| 2019/0350031 | A1 | 11/2019 | Bedekar |
| 2020/0314696 | A1 | 10/2020 | Futaki et al. |
| 2020/0382240 | A1 | 12/2020 | Centonza et al. |
| 2020/0396786 | A1 | 12/2020 | Park et al. |

OTHER PUBLICATIONS

Non-Final Office Action dated Jun. 22, 2020, issued in U.S. Appl. No. 16/871,654 (19 pages).
Non-Final Office Action dated Jun. 1, 2021, issued in U.S. Appl. No. 16/871,654 (24 pages).
Final Office Action dated Oct. 5, 2021, issued in U.S. Appl. No. 16/871,654 (28 pages).
Notice of Allowance dated Apr. 29, 2020, issued in U.S. Appl. No. 16/437,783 (9 pages).
Final Office Action dated Nov. 19, 2020, issued in U.S. Appl. No. 16/871,654 (25 pages).
R2-1801779; 3GPP TSG-RAN WG2#101; Athens, Greece, Feb. 26-Mar. 2, 2018; Agenda Item: 9.7.2; Source: OPPO; Title: Discussion UE assistance for CN Node Indication in el TE; Document for: Discussion, Decision.
R3-171631; 3GPP TSG-RAN WG3 Meeting #96; Hangzhou, P.R. China, May 15-19, 2017; Agenda item: 10.10.1; Source: Samsung, KT, SK Telecom; Title: Relationship among gNB-CU, gNB-DU and cell; Document for Discussion & Decision.
R3-172417; 3GPP TSG RAN WG3 NRAD HOC; Qingdao, China, Jun. 27-29, 2017; Agenda item: 10.10.1; Source: ZTE, China Unicom; Title: Discussion on CU DU ID and NCGI; Document for: Discussion and Approval.
R3-173307; 3GPP TSG RAN WG3 #97; Berlin, Germany Aug. 21-25, 2017; Date: Aug. 7, 2017; Date: Aug. 7, 2017; From: Small Cell Forum.
R3-173658; 3GPP TSG RAN WG3 NR#97bis; Prague, Czech, Oct. 9-13, 2017; Agenda item: 10.10.2.1; Source: ZTE; Title: Update on F1 interface management for TS38.470; Document for: pCR.
R3-180421; 3GPP TSG RAN WG3 NR AdHoc 1801 Tdoc; Sophia Antipolis, France, Jan. 22-26, 2018; Agenda Item: 10.10.1; Source: Ericsson; Title: Cells information from gNB-DU to gNB-CU; Document for: approval (TP TS 38.473).
R3-182100; 3GPP TSG-RAN WG3 #99bis; Sanya, China, Apr. 16-20, 2018; Agenda Item: 10.15; Source: China Telecom; Title: Discussion on Network Sharing for NR; Document for: Discussion.
International Search Report and Written Opinion for PCT International Application PCT/US2019/036530; dated Sep. 4, 2019.
3GPP TS 38.300 V15.1.0 (Mar. 2018); Technical Specification; 3rd Generation Partnership Project; Technical Specification Group Radio Access Network; NR; NR and NG-RAN Overall Description; Stage 2; (Release 15).
3GPP TS 38.300 V15.2.0 (Jun. 2018); Technical Specification; 3rd Generation Partnership Project; Technical Specification Group Radio Access Network; NR; NR and NG-RAN Overall Description; Stage 2; (Release 15).
3GPP TS 38.331 V15.1.0 (Mar. 2018); Technical Specification; 3rd Generation Partnership Project; Technical Specification Group Radio Access Network; NR; Radio Resource Control (RRC) protocol specification; (Release 15).
3GPP TS 38.331 V15.2.1 (Jun. 2018); Technical Specification; 3rd Generation Partnership Project; Technical Specification Group Radio Access Network; NR; Radio Resource Control (RRC) protocol specification; (Release 15).
3GPP TS 38.471V15.0.0 (Dec. 2017); Technical Specification; 3rd Generation Partnership Project; Technical Specification Group Radio Access Network; NG-RAN; F1 layer 1; (Release 15).
3GPP TS 38.472 V15.1.0 (Jun. 2018); Technical Specification; 3rd Generation Partnership Project; Technical Specification Group Radio Access Network; NG-RAN; F1 signalling transport (Release 15).
3GPP TS 38.473 V15.1.1 (Apr. 2018); Technical Specification; 3rd Generation Partnership Project; Technical Specification Group Radio Access Network; NG-RAN; F1 application protocol (F1AP); (Release 15).
3GPP TS 38.473 V15.2.1 (Jul. 2018); Technical Specification; 3rd Generation Partnership Project; Technical Specification Group Radio Access Network; NG-RAN; F1 application protocol (F1AP); (Release 15).
R2-1800758; 3GPP TSG-RAN WG2 NR Ad Hoc; Vancouver, Canada, Jan. 22-26, 2018;; Agenda Item:10.2.14; Source:Huawei, HiSilicon; Title: Network sharing in NR.
R2-1802289 Network sharing for NR; 3GPP TSG-RAN WG2#101; R2-170xxxx Athens, Greece, Feb. 26-Mar. 2, 2018Resubmission of R2-1800758;; Agenda Item:10.2.14; Source: Huawei, HiSilicon; Title:Network sharing in NR.
R2-1802359—RAN Sharing and identifier aspects in NR; 3GPP TSG-RAN WG2#101Tdoc; Athens, Greece, Feb. 26-Mar. 2, 2018 (Resubmission of R2-1800326);; Agenda Item:10.2.14; Source: Ericsson; Title:RAN Sharing and identifier aspects in NR.
R2-1802360—Stage 2 text proposal on RAN Sharing; 3GPP TSG-RAN WG2 #101Tdoc; Athens, Greece, Feb. 26-Mar. 2, 2018; ; Agenda Item:10.2.14; Source:Ericsson; Title:Stage 2 proposal for RAN Sharing.
R3-181274 (TP for SA BL CR) System information delivery; 3GPP TSG RAN WG3 Meeting #99NR Tdoc R3-181274 Athens, Greece, Feb. 26-Mar. 2, 2018;; Agenda Item:10.10.2; Source:Ericsson; Title:(TP for SA BL CR) System Information delivery.
R3-182616_relayXn38300; 3GPP TSG-RAN WG3 Meeting #100R3-182616 Busan, Korea, May 21-25, 2018;;; Agenda Item:10.6.4; Source:Nokia, Nokia Shanghai Bell.
R3-182617 relayXn423; 3GPP TSG-RAN WG3 Meeting #100R3-182617 Busan, Korea, May 21-25, 2018;;; Agenda Item:10.6.4; Source:Nokia, Nokia Shanghai Bell.
R3-182756 ACB over F1; 3GPP TSG RAN WG3 Meeting#100Tdoc R3-182756 Busan, Korea, May 21-25, 2018;; Agenda Item:10.10.2; Source:Ericsson; Title:(TP for SA BL CR for TS 38.473): Access class barring over F 1.
R3-182757 other SI deliver command; 3GPP TSG RAN WG3 Meeting #100Tdoc R3-182757 Busan, Korea, May 21-May 25, 2018;; Agenda Item:10.10.2; Source:Ericsson; Title:(TP for SA BL CR for TS 38.473): Other SI delivery command.
R3-182758 Public warning system over F1; 3GPP TSG RAN WG3 Meeting #100Tdoc R3-182758 Busan, Korea, May 21-25, 2018;;

(56) References Cited

OTHER PUBLICATIONS

Agenda Item:10.10.2; Source:Ericsson; Titie:(TP for SA BL CR for TS 38.473) Public Warning System over F1.
R3-182869 (TP for SA BL CR) Further discussion on Access Control for F1 interface; 3GPP TSG-RAN NG3#1 OOR3-182869 Busan, Korea, May 21-25, 2018;;; Agenda item:10.10.3; Source: ZTE.
R3-182873 (TP for NR BL CR for TS38.470) Support PWS in CU-DU deployment; 3GPP TSG RAN WG3 Meeting #100R3-182873 Busan, South Korea, May 21-25, 2018;; Agenda item:10. 10.2; Source: ZTE; Title: (TP for NR BL CR for TS38.470) Support PWS in CU-DU deployment.
R3-182874 (TP for SA BL CR for TS38.473) Support PWS in CU-DU deployment; 3GPP TSG RAN WG3 NR#100 R3-182874 Busan, Korea, May 21-25, 2018;;; Agenda item:10.10.2; Source: ZTE.
R3-182915; 3GPP TSG-RAN3 Meeting #100R3-182915 Busan, Korea, May 21-25, 2018;; Title:1-RNTI encoding and length reduction; Source:Huawei; Agenda item:10.6.4.
R3-182924 Handling of gNB-DU UE F1AP ID; 3GPP TSG-RAN WG3#100R3-182924 Busan, South Korea, May 21-25, 2018;; Agenda item:10.10.3; Source: Nokia, Nokia Shanghai Bell; Title:Handling of UNB-DU UE F1AP ID during RRC Connection Re-establishment.
R3-182967; 3GPP TSG-RAN WG3 Meeting #100R3-182967 Busan, Korea, May 21-25, 2018;;; Agenda Item:10.6.4; Source:Ericsson.
R3-182968; 3GPP TSG-RAN WG3 Meeting #100R3-182968 Busan, Korea, May 21-25, 2018;;; Agenda Item:10.6.4; Source:Ericsson.
R3-182969; 3GPP TSG-RAN WG3 Meeting #100R3-182969 Busan, Korea, May 21-25, 2018;; Title:[Draft] Reply LS on MSG3 size reduction; Response to:LS R2-1806502 from RAN2; Release:Rel-15.
R3-183012; 3GPP TSG-RAN WG3 Meeting #100 R3-183012 Busan, Korea, May 21 -25, 2018;; Agenda item:10.6.4; Source:Samsung; Title:Considerations on the 1-RNTI size for NR.
R3-183014_0nDemandSI_v0.1; 3GPP TSG-RAN WG3 #100R3-183014 Busan, South Korea, May 21-25, 2018;; Agenda item:10. 10.2; Source:Samsung, KT Corp.; Title:{TP for NR BL CR for TS38.401) Discussions on supporting Msg3 based on-demand SI over F1.
R3-183015_0nDemandSI_Stg3_v0.1; 3GPP TSG-RAN WG3 #1 OOR3-183015 Busan, South Korea, May 21-25, 2018;; Agenda item:10.10.2; Source:Samsung, KT Corp.; Title:{TP for SA BL CR for TS38.473) Discussions on supporting Msg3 based on-demand SI over F1.
R3-183129 (TP for SA BL CR for TS 38.473) on gNB-CU behaviour without DU to CU RRC information; 3GPP TSG-RAN3 Meeting #100R3-1 83129 Busan, Korea, May 21-25, 2018;; CR-Form-v11.2; ; Change Request.
U-183131 (TP for SA BL CR for TS 38.473) on clarification of on the presence of C-RNTI in Initial UL RRC Transfer message; 3GPP TSG-RAN3 Meeting #100R3-183131 Busan, Korea, May 21-25, 2018;;; Title: (TP for SA BL CR for TS 38.473): on clarification of on the presence of CRNTI in Initial UL RRC Transfer message; Source: Huawei.
R3-183133 {TP for SA BL CR for TS 38.473) on RRC connection rejection indication over F1; 3GPP TSG-RAN3 Meeting #100R3-183133 Busan, Korea, May 21-25, 2018;; Agenda Item:10.10.7.3; Source: Huawei; Title:(TP for SA BL CR for TS 38.473): on RRC connection rejection indication over F1.
R3-183142 (TP for SA BL CR for TS 38.473) on PWS in CU DU split; 3GPP TSG-RAN3 Meeting #100R3-183142 Busan, Korea, May 21-25, 2018;; Title: (TP for SA BL CR for TS 38.473): on PWS in CU DU split; Source: Huawei; Agenda item:10.10.2.
R3-183143 (TP for SA BL CR for TS 38.470) on PWS in CU DU split; 3GPP TSG-RAN3 Meeting #100R3-183143 34 Busan, Korea, May 21-25, 2018;; Title: (TP for NR BL CR for TS 38.470): on PWS in CU DU split; Source: Huawei; Agenda item:10.10.2.
R3-183144 (TP for SA BL CR for TS 38.473) on System information delivery over F1 interface; 3GPP TSG-RAN3 Meeting #100R3-183144 Busan, Korea, May 21-25, 2018;; Agenda Item:10.10.2; Source: Huawei; Title:(TP for SA BL CR for TS 38.473): on System information delivery over F1 interface.
R3-183230; 3GPP TSG-RAN WG3 Meeting #100R3-183230 Busan, Korea, May 21-25, 2018;; Agenda item:10.6.4; Source:LG Electronics Inc.; Title:Content of data forwarding address indication message.

User Plane Protocol Stack

Control Plane Protocol Stack

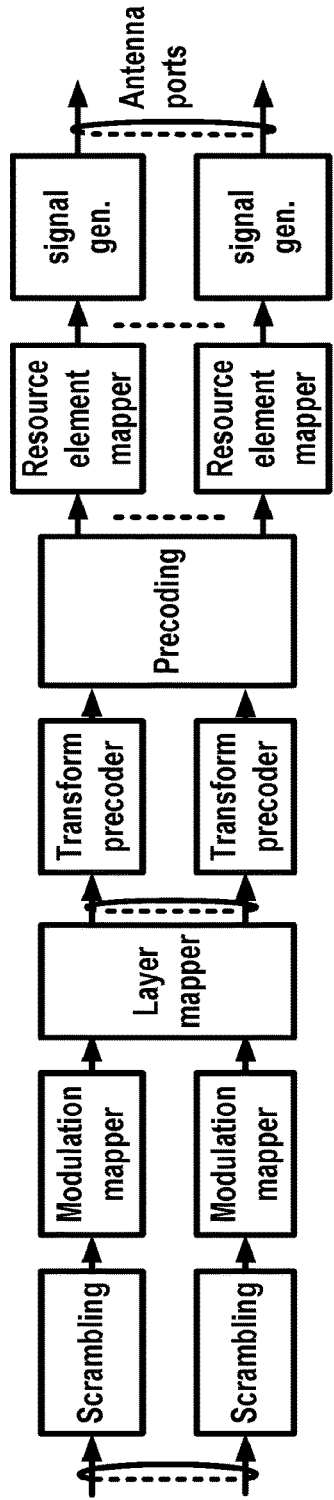
FIG. 4A
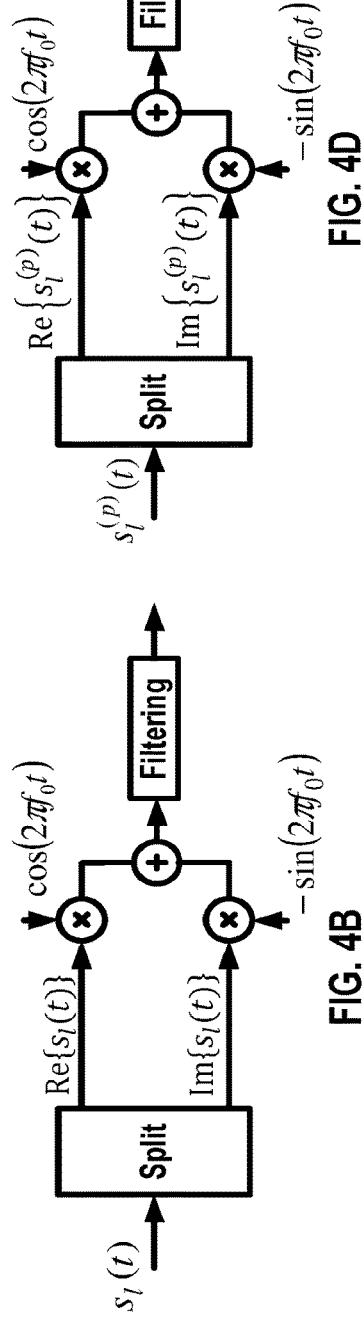
FIG. 4B
FIG. 4D
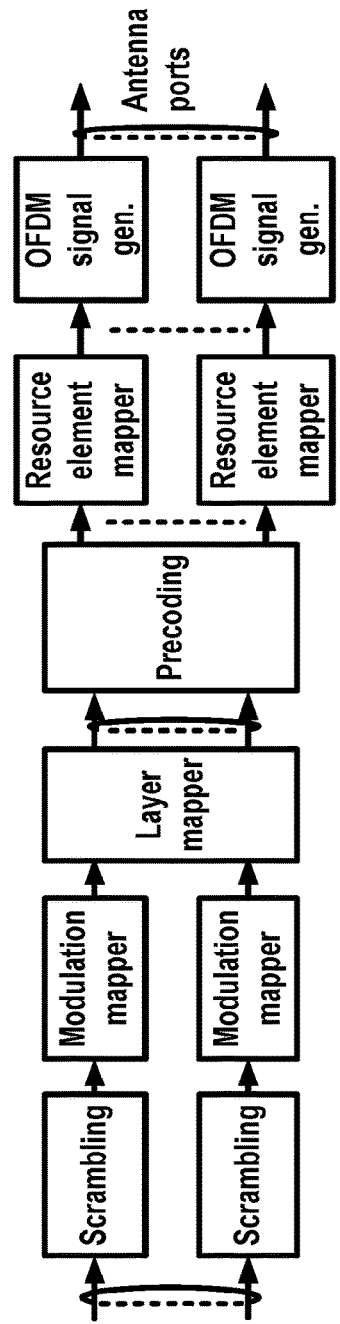
FIG. 4C

Example of PLMN Identity (TS 38.413 v0.8.0)

| IE/Group Name | Presence | Range | IE type and reference | Semantics description |
|---|---|---|---|---|
| PLMN Identity | M | | OCTET STRING (SIZE(3)) | Digits 0 to 9 encoded 0000 to 1001, 1111 used as filler digit.<br><br>Two digits per octet:<br>- bits 4 to 1 of octet n encoding digit 2n-1<br>- bits 8 to 5 of octet n encoding digit 2n<br><br>PLMN Identity consists of 3 digits from MCC followed by either:<br>- a filler digit plus 2 digits from MNC (in case of 2 digit MNC) or<br>- 3 digits from MNC (in case of 3 digit MNC). |

Example of PLMN Identity (RRC information element)

```
PLMN-Identity information element
-- ASN1START

PLMN-Identity ::=     SEQUENCE {
    mcc               MCC           OPTIONAL,    -- Cond MCC
    mnc               MNC
}

MCC ::=               SEQUENCE (SIZE (3)) OF
                      MCC-MNC-Digit MNC ::=               SEQUENCE (SIZE (2..3)) OF
                      MCC-MNC-Digit MCC-MNC-Digit ::=     INTEGER (0..9)

-- ASN1STOP
```

FIG. 32

Example of F1 SETUP REQUEST message from gNB-DU to gNB-CU (gNB-CU-CP) (TS 38.473 v15.1.1)

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| gNB-DU ID | M | | 9.3.1.9 | | YES | reject |
| gNB-DU Name | O | | PrintableString(SIZE(1..150,...)) | | YES | ignore |
| gNB-DU Served Cells List | | 1 | | List of cells configured in the gNB-DU | YES | reject |
| >gNB-DU Served Cells Item | | 1..<maxCellingNBDU> | | | EACH | reject |
| >>Served Cell Information | M | | 9.3.1.10 | Information about the cells configured in the gNB-DU | - | - |
| >>gNB-DU System Information | O | | 9.3.1.18 | RRC container with system information owned by gNB-DU | - | - |

FIG. 33

Example of F1 SETUP RESPONSE message from gNB-CU (gNB-CU-CP) to gNB-DU (TS 38.473 v15.1.1)

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| gNB-CU Name | O | | PrintableString(SIZE(1..150,...)) | Human readable name of the gNB-CU. | YES | ignore |
| Cells to be Activated List | | 0..1 | | | | |
| >Cells to be Activated List Item | | 1..<maxCellingNBDU> | | List of cells to be activated | YES | reject |
| >> NR CGI | M | | 9.3.1.12 | | - | - |
| >> NR PCI | O | | INTEGER (0..1007) | Physical Cell ID | - | - |

FIG. 34

Example of GNB-CU CONFIGURATION UPDATE message from gNB-CU (gNB-CU-CP) to gNB-DU (TS 38.473 v15.1.1)

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| Cells to be Activated List | | 0..1 | | List of cells to be activated | YES | reject |
| >Cells to be Activated List Item | | 1.. <maxCelling NBDU> | | | EACH | reject |
| >> NR CGI | M | | 9.3.1.12 | | - | - |
| >> NR PCI | O | | INTEGER (0..1007) | Physical Cell ID | - | - |
| Cells to be Deactivated List | | 0..1 | | List of cells to be deactivated | YES | reject |
| >Cells to be Deactivated List Item | | 1.. <maxCelling NBDU> | | | EACH | reject |
| >> NR CGI | M | | 9.3.1.12 | | - | - |

FIG. 35

Example of GNB-CU CONFIGURATION UPDATE ACKNOWLEDGE message from gNB-DU to gNB-CU (gNB-CU-CP) (TS 38.473 v15.1.1)

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| Cells Failed to be Activated List | | 0..1 | | List of cells which are failed to be activated | YES | reject |
| >Cells Failed to be Activated Item | | 1..<maxCellingNBDU> | | | EACH | reject |
| >> NR CGI | M | | 9.3.1.12 | | - | - |
| >> Cause | M | | 9.3.1.2 | | - | - |
| Criticality Diagnostics | O | | 9.3.1.3 | | YES | ignore |

FIG. 36

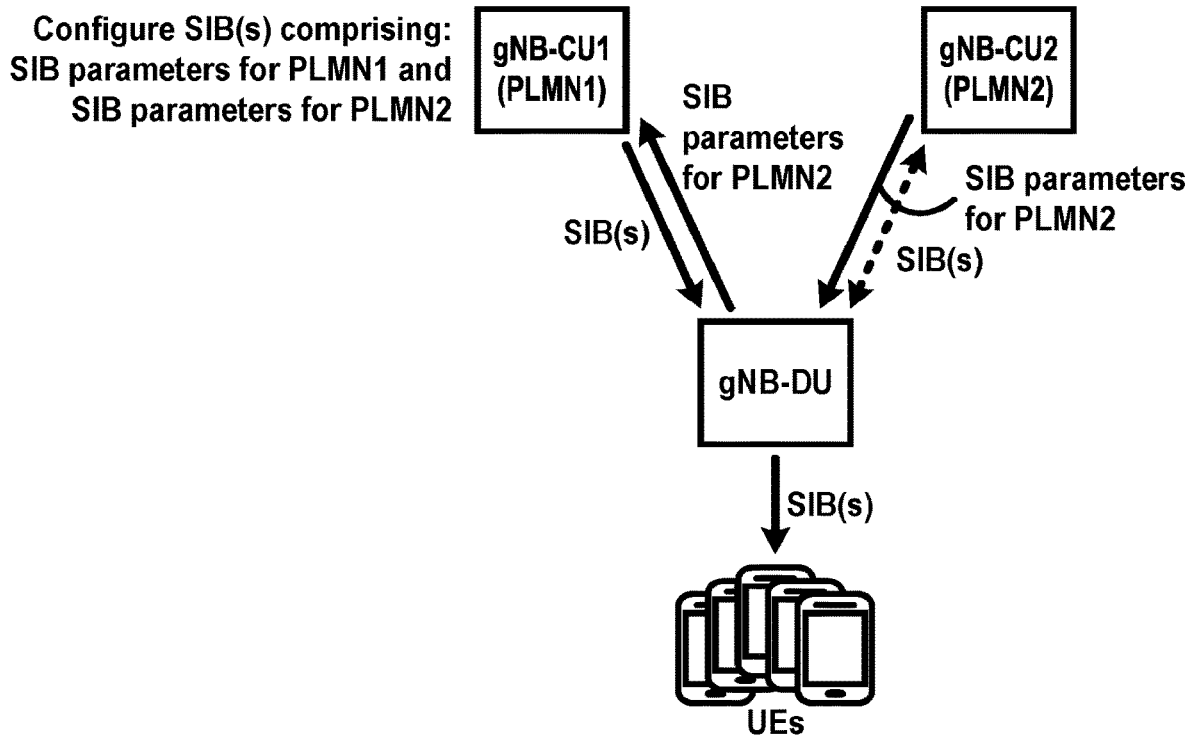
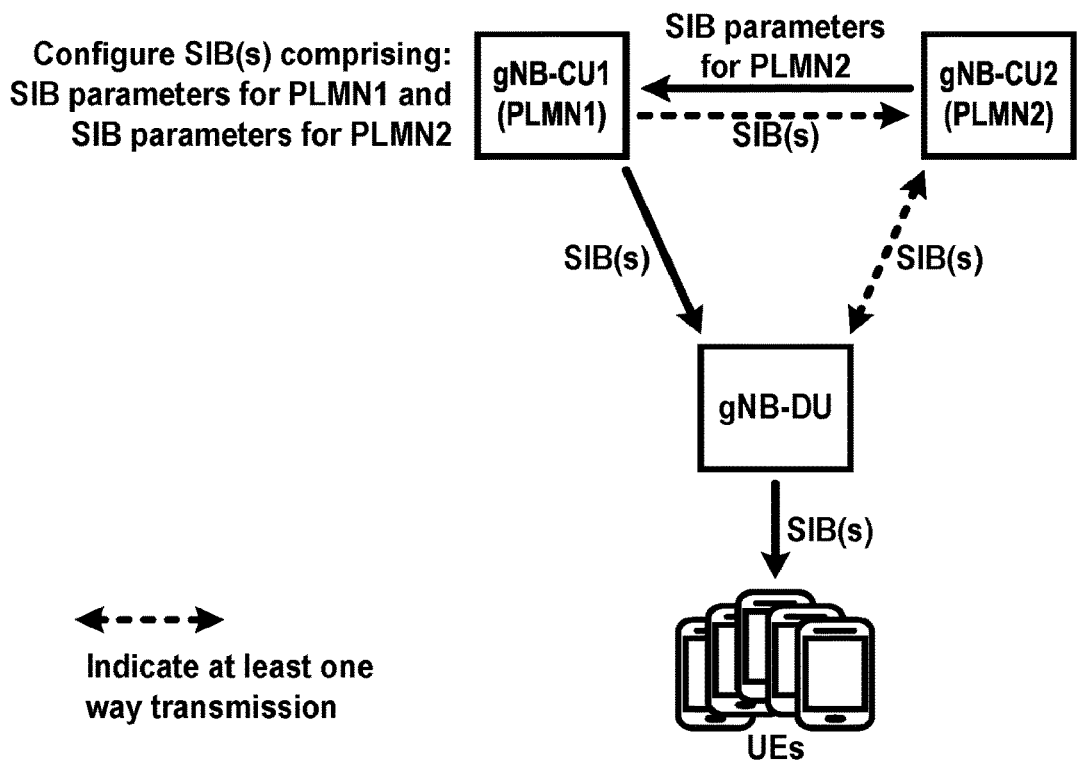
FIG. 37

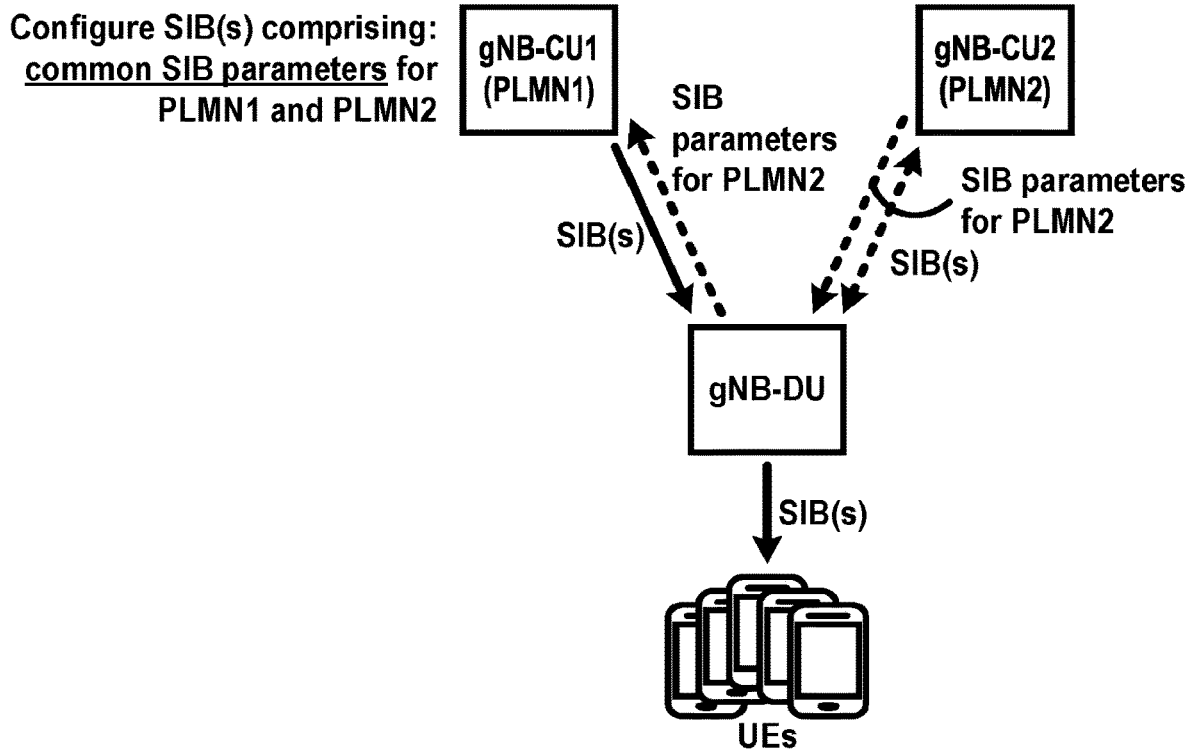
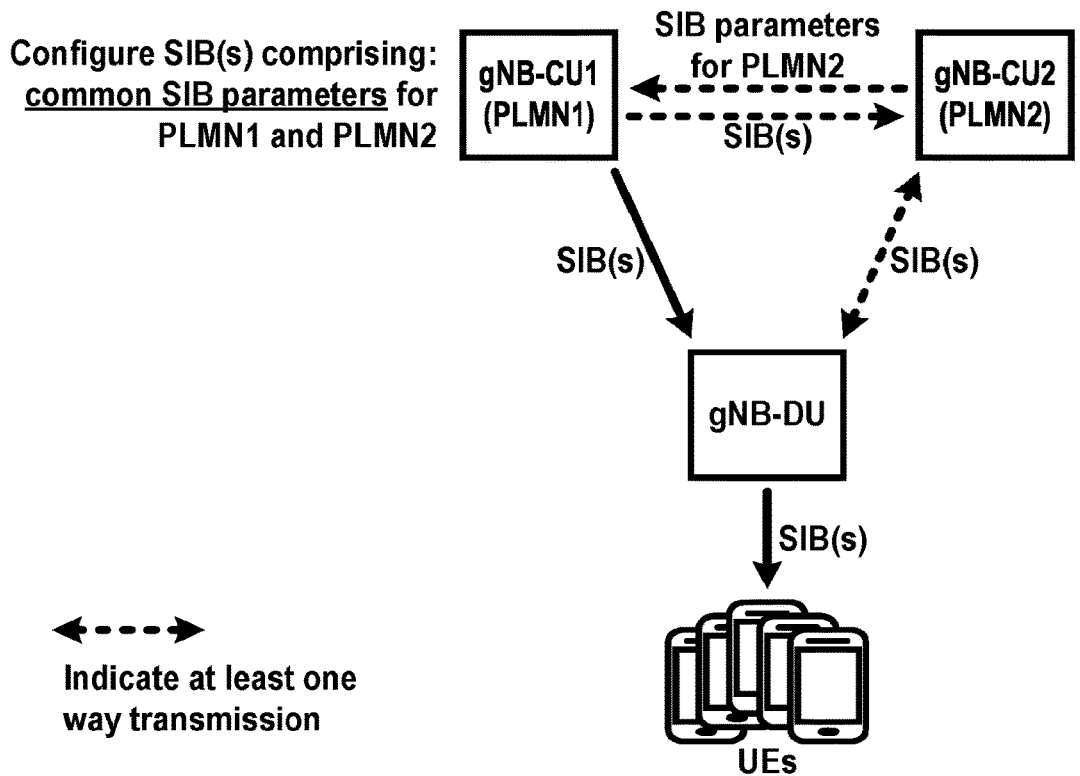
FIG. 39

Communicate, by a base station DU with a 1st base station CU of a 1st PLMN, 1st packets associated with the 1st PLMN, where: the base station DU communicates with a 2nd PLMN; and the 1st base station CU does not communicate with the 2nd PLMN
4510

FIG. 45

Receive, by a base station DU from a 1st base station CU, a 1st message comprising a 1st PLMN identifier of a 1st PLMN comprising the 1st base station CU
4610

Transmit, by the base station DU, the system information block(s)
4620

FIG. 46

```
┌─────────────────────────────────────────────┐
│ Receive, by a 1st base station CU from a    │
│ base station DU, 2nd configuration          │
│ parameter(s) associated with a 2nd          │
│ base station CU                             │
│ 4810                                        │
└─────────────────────────────────────────────┘
                      │
                      ▼
┌─────────────────────────────────────────────┐
│ Send, by the 1st base station CU to the     │
│ base station DU, system information         │
│ block(s) comprising: 1st configuration      │
│ parameter(s) associated with the 1st base   │
│ station CU; and the 2nd configuration       │
│ parameter(s)                                │
│ 4820                                        │
└─────────────────────────────────────────────┘
```

FIG. 48

```
┌─────────────────────────────────────────────┐
│ Receive, by a base station DU from a 1st    │
│ base station CU, a 1st message comprising   │
│ a 1st network identifier of a 1st network   │
│ that the 1st base station CU supports       │
│ 4910                                        │
└─────────────────────────────────────────────┘
                      │
                      ▼
┌─────────────────────────────────────────────┐
│ Receive, from a 2nd base station CU, a 2nd  │
│ message comprising a 2nd network identifier │
│ of a 2nd network that the 2nd base station  │
│ CU supports                                 │
│ 4920                                        │
└─────────────────────────────────────────────┘
                      │
                      ▼
┌─────────────────────────────────────────────┐
│ Transmit system information block(s)        │
│ comprising: the 1st network identifier;     │
│ and the 2nd network identifier              │
│ 4930                                        │
└─────────────────────────────────────────────┘
```

FIG. 49

```
┌─────────────────────────────────────────────────────────────┐
│   Transmit, by a base station DU to a wireless device, system│
│ information block(s) comprising: a 1st PLMN identifier of a 1st base│
│   station CU; and a 2nd PLMN identifier of a 2nd base station CU │
│                            5210                              │
└─────────────────────────────────────────────────────────────┘
                              ↓
┌─────────────────────────────────────────────────────────────┐
│  Receive, by the base station DU from the wireless device, a RRC │
│ message comprising PLMN(s) identifier selected from the 1st PLMN │
│             identifier and the 2nd PLMN identifier           │
│                            5220                              │
└─────────────────────────────────────────────────────────────┘
                              ↓
┌─────────────────────────────────────────────────────────────┐
│ Select, by the base station DU, base station CU(s) from the 1st base │
│    station CU and the 2nd base station CU based on the PLMN(s)    │
│                         identifier                           │
│                            5230                              │
└─────────────────────────────────────────────────────────────┘
                              ↓
┌─────────────────────────────────────────────────────────────┐
│ Transmit, by the base station DU to the base station CU(s), the RRC │
│                           message                            │
│                            5240                              │
└─────────────────────────────────────────────────────────────┘
```

FIG. 52

```
┌─────────────────────────────────────────────────────────────┐
│    Transmit, by a base station DU to a wireless device, system   │
│      information block(s) indicating a 1st PLMN and a 2nd PLMN   │
│                            5310                              │
└─────────────────────────────────────────────────────────────┘
                              ↓
┌─────────────────────────────────────────────────────────────┐
│  Receive, by the base station DU from the wireless device, a RRC │
│  message comprising cell identifier(s) of a cell, the cell identifier(s) │
│        associated with PLMN(s) of the 1st PLMN and the 2nd PLMN  │
│                            5320                              │
└─────────────────────────────────────────────────────────────┘
                              ↓
┌─────────────────────────────────────────────────────────────┐
│  Determine, by the base station DU based on the cell identifier(s), │
│ base station CU(s) from: a 1st base station CU of the 1st PLMN; and │
│              a 2nd base station CU of the 2nd PLMN           │
│                            5330                              │
└─────────────────────────────────────────────────────────────┘
                              ↓
┌─────────────────────────────────────────────────────────────┐
│ Transmit, by the base station DU to the base station CU(s), the RRC │
│                           message                            │
│                            5340                              │
└─────────────────────────────────────────────────────────────┘
```

FIG. 53

NODE SELECTION FOR NETWORK SHARING

CROSS-REFERENCE TO RELATED APPLICATIONS

This application is a continuation of U.S. patent application Ser. No. 16/437,791, now U.S. Pat. No. 11,343,755, filed Jun. 11, 2019, which claims the benefit of U.S. Provisional Application No. 62/683,373, filed Jun. 11, 2018, and U.S. Provisional Application No. 62/696,912, filed Jul. 12, 2018, which are hereby incorporated by reference in their entirety.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

FIG. 32 is an example diagram of an aspect of an embodiment of the present disclosure.

FIG. 33 is an example diagram of an aspect of an embodiment of the present disclosure.

FIG. 34 is an example diagram of an aspect of an embodiment of the present disclosure.

FIG. 35 is an example diagram of an aspect of an embodiment of the present disclosure.

FIG. 36 is an example diagram of an aspect of an embodiment of the present disclosure.

FIG. 37 is an example diagram of an aspect of an embodiment of the present disclosure.

FIG. 39 is an example diagram of an aspect of an embodiment of the present disclosure.

FIG. 45 is an diagram of an aspect of an example embodiment of the present disclosure.

FIG. 46 is an diagram of an aspect of an example embodiment of the present disclosure.

FIG. 48 is an diagram of an aspect of an example embodiment of the present disclosure.

FIG. 49 is an diagram of an aspect of an example embodiment of the present disclosure.

FIG. 52 is an diagram of an aspect of an example embodiment of the present disclosure.

FIG. 53 is an diagram of an aspect of an example embodiment of the present disclosure.

DETAILED DESCRIPTION OF EMBODIMENTS

Figure 1:
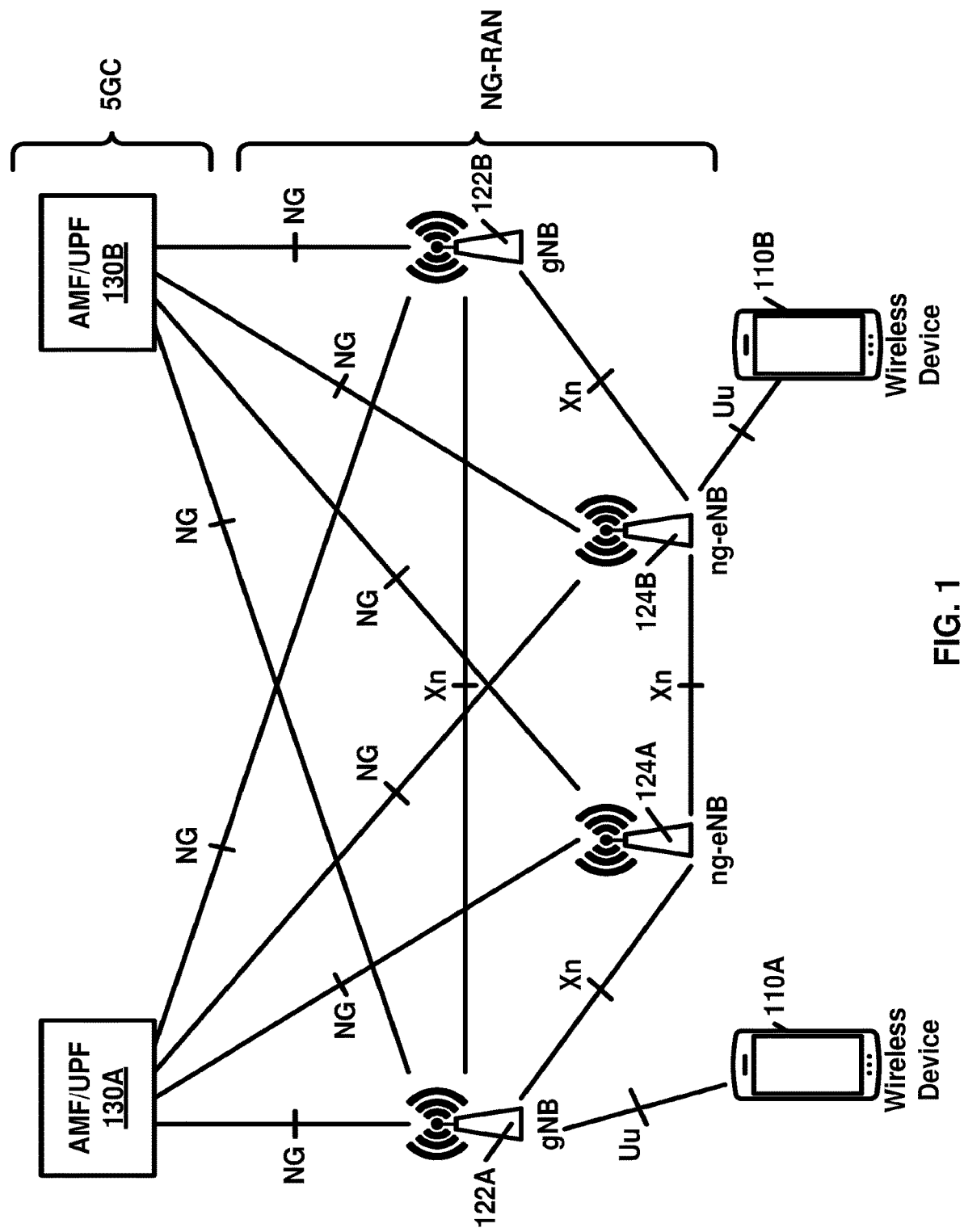
FIG. 1 is a diagram of an example RAN architecture as per an aspect of an embodiment of the present disclosure.

Example embodiments of the present disclosure enable operation of wireless systems. Embodiments of the technology disclosed herein may be employed in the technical field of multicarrier communication systems. More particularly, the embodiments of the technology disclosed herein may relate to radio access technologies in multicarrier communication systems.

The following Acronyms are used throughout the present disclosure:

3GPP 3rd Generation Partnership Project
5GC 5G Core Network
ACK Acknowledgment
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control CHannel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic CHannel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel IDentifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgment
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups RI Rank Indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
  SDAP Service Data Adaptation Protocol
  SDU Service Data Unit
  SeNB Secondary evolved Node B
  SFN System Frame Number
  S-GW Serving GateWay
  SI System Information
  SIB System Information Block
  SMF Session Management Function
  SN Secondary Node
  SpCell Special Cell
  SRB Signaling Radio Bearer
  SRS Sounding Reference Signal
  SS Synchronization Signal
  SSS Secondary Synchronization Signal
  sTAG secondary Timing Advance Group
  TA Timing Advance
  TAG Timing Advance Group
  TAI Tracking Area Identifier
  TAT Time Alignment Timer
  TB Transport Block
  TC-RNTI Temporary Cell-Radio Network Temporary Identifier
  TDD Time Division Duplex
  TDMA Time Division Multiple Access
  TTI Transmission Time Interval
  UCI Uplink Control Information
  UE User Equipment
  UL Uplink
  UL-SCH Uplink Shared CHannel
  UPF User Plane Function
  UPGW User Plane Gateway
  VHDL VHSIC Hardware Description Language
  Xn-C Xn-Control plane
  Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 124A, 124B), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface. In this disclosure, wireless device 110A and 110B are structurally similar to wireless device 110. Base stations 120A and/or 120B may be structurally similarly to base station 120. Base station 120 may comprise at least one of a gNB (e.g. 122A and/or 122B), ng-eNB (e.g. 124A and/or 124B), and or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, and dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide, for example, NG interface management, UE context management, UE mobility management, transport of NAS messages, paging, PDU session management, configuration transfer and/or warning message transmission, combinations thereof, and/or the like.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
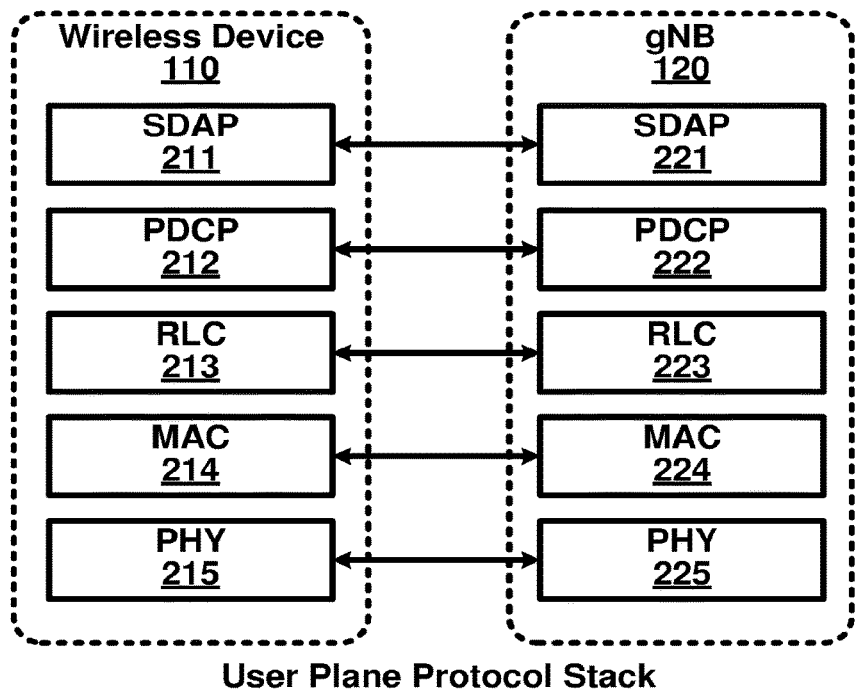
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
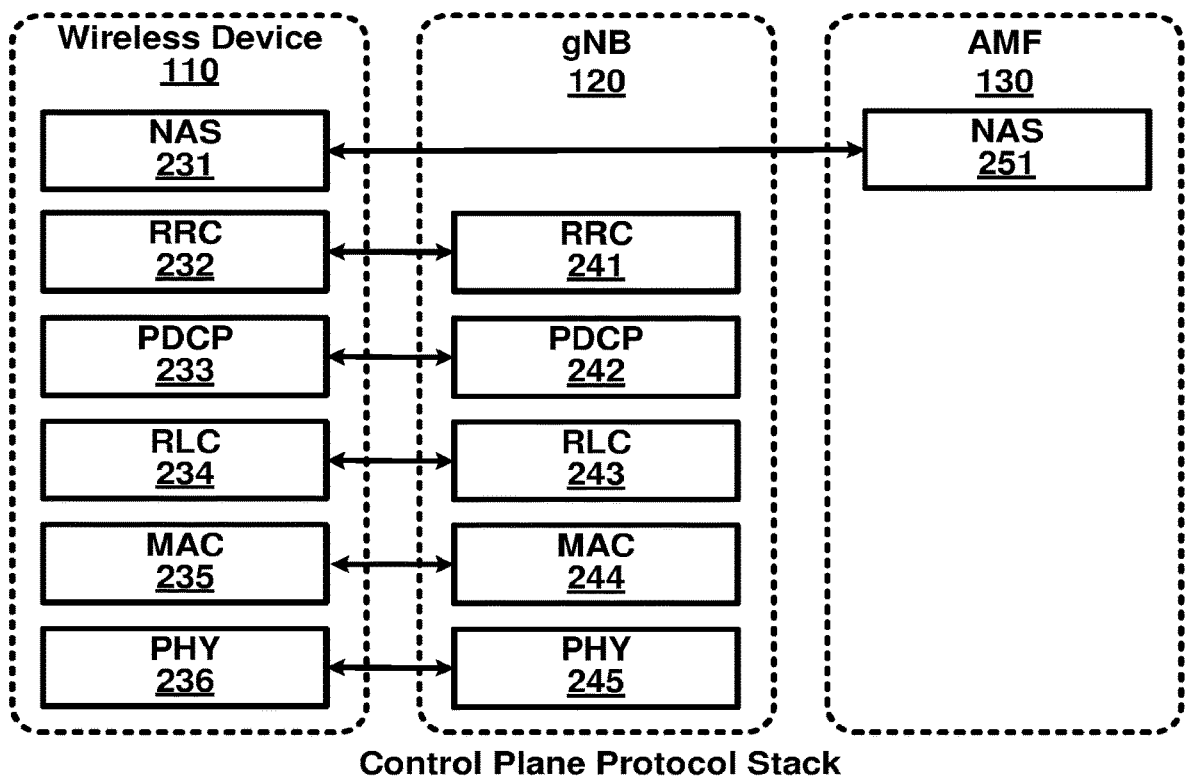
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
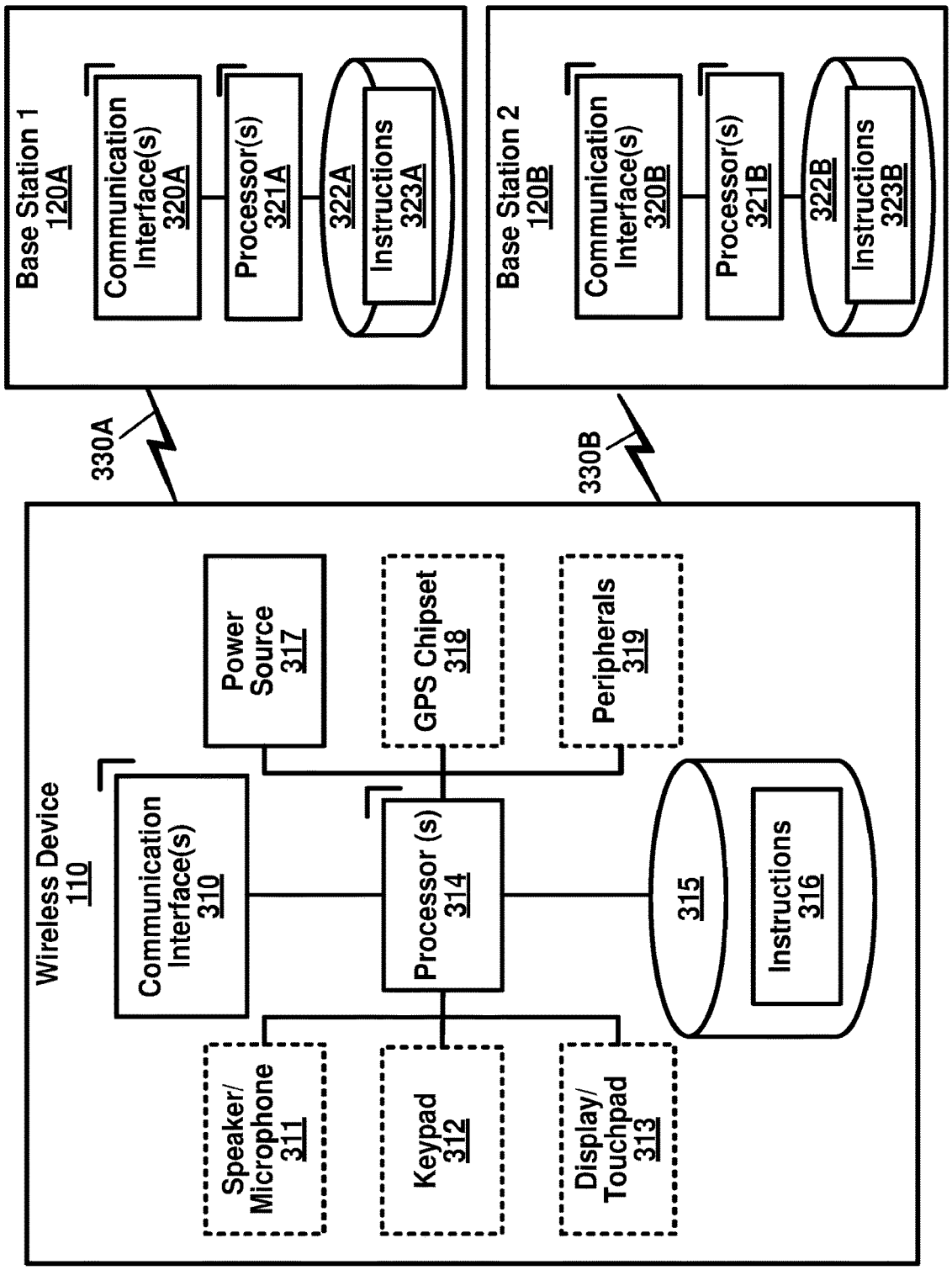
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
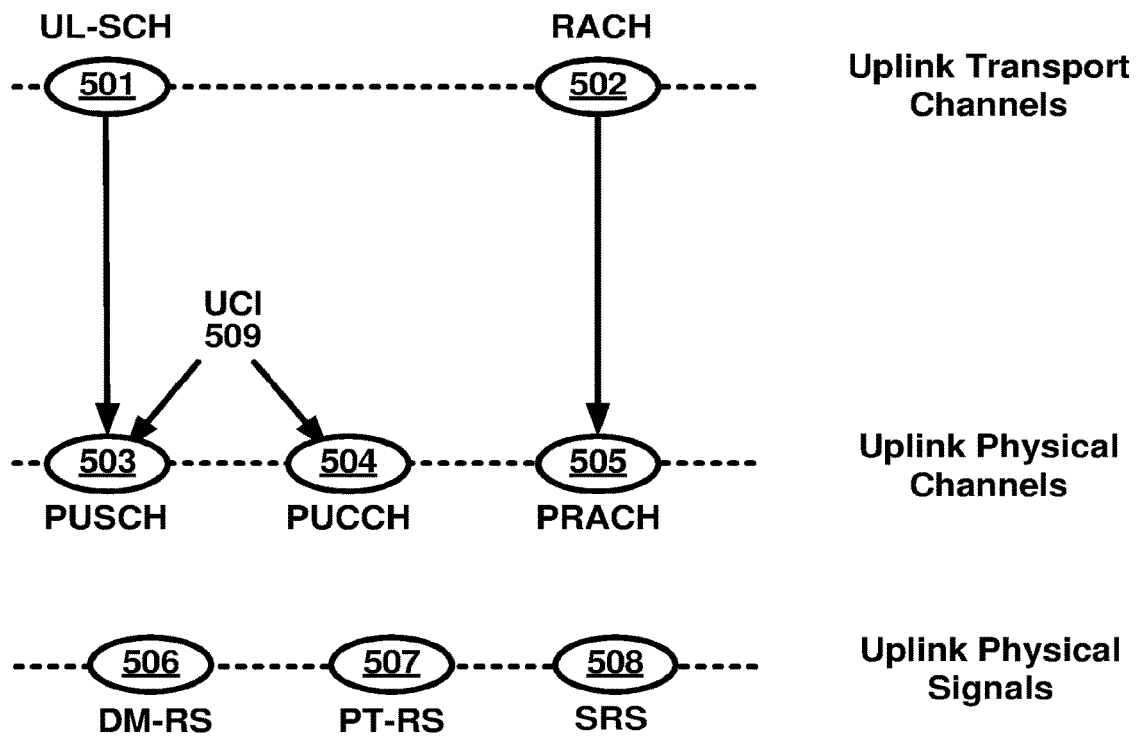
FIG. 5A is a diagram of an example uplink channel mapping and example uplink physical signals as per an aspect of an embodiment of the present disclosure.
Figure 5B:
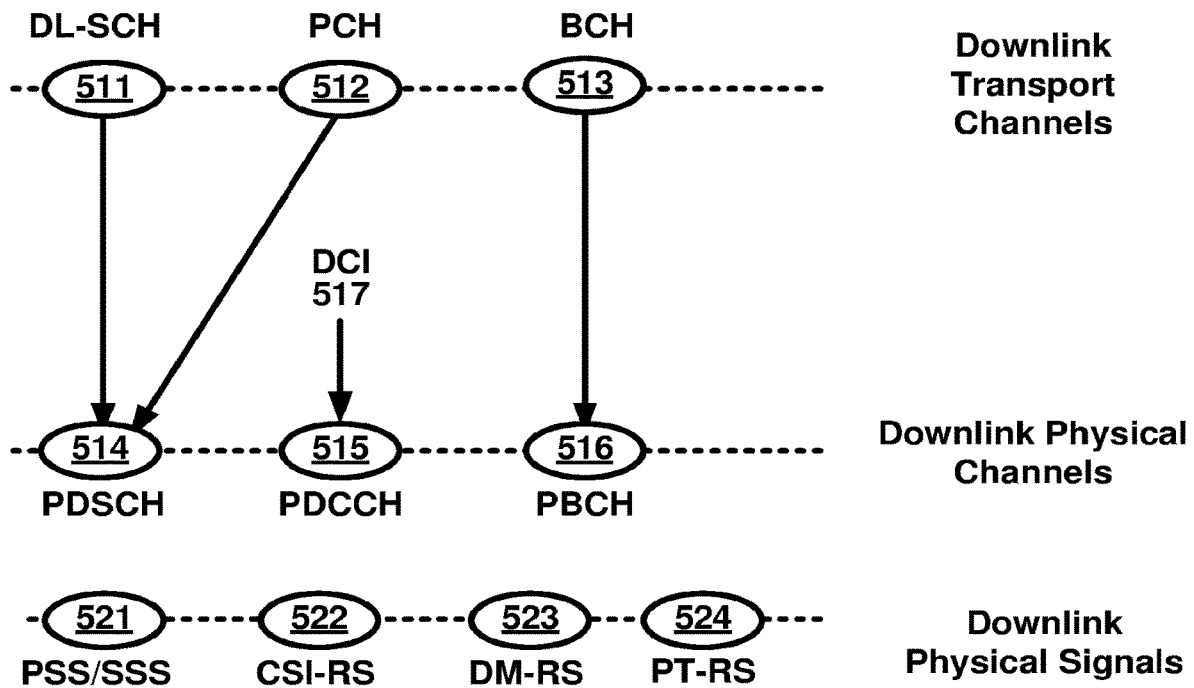
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgment (ACK)/Negative Acknowledgment (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
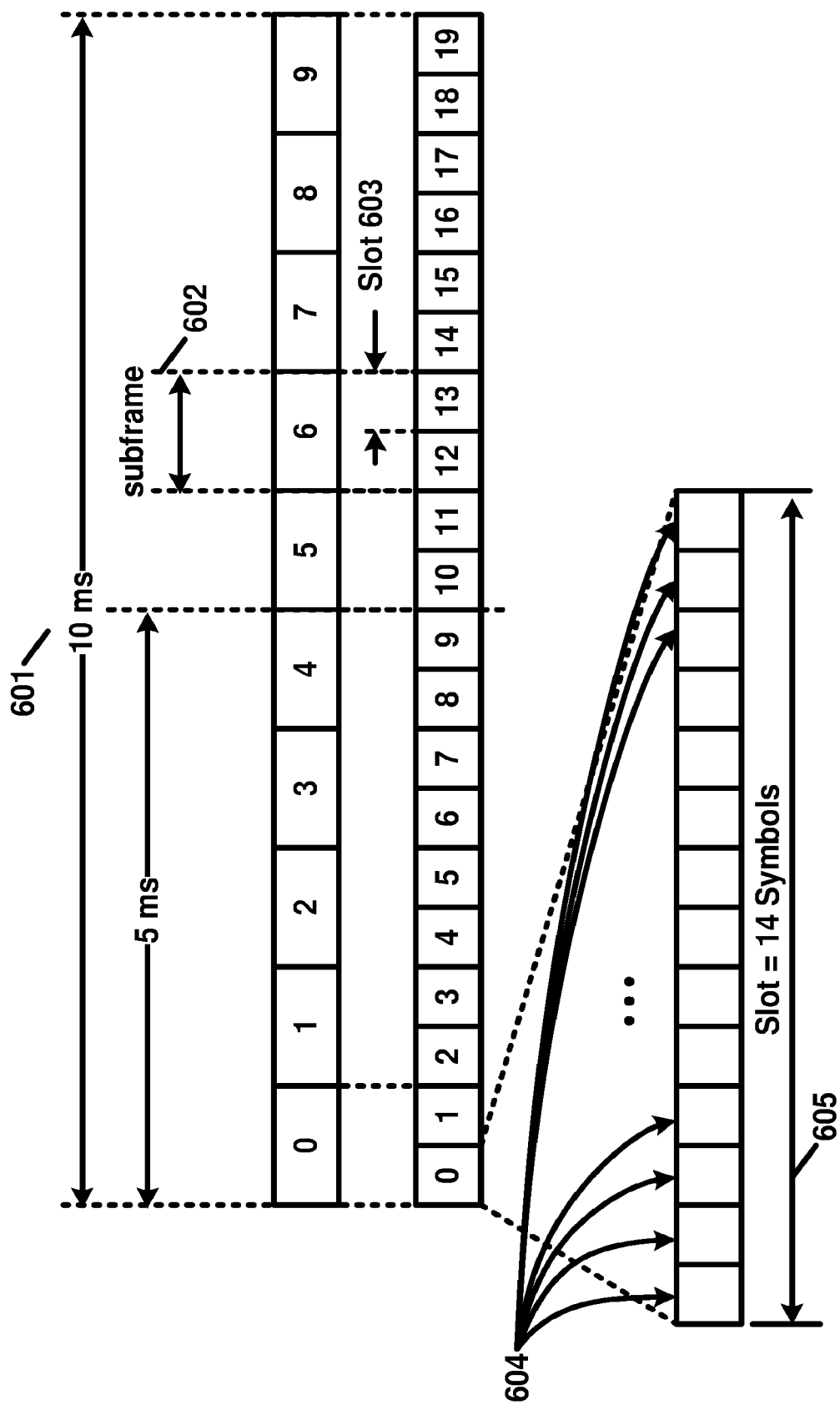
FIG. 6 is a diagram depicting an example frame structure as per an aspect of an embodiment of the present disclosure.

FIG. 6 is a diagram depicting an example frame structure for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame structure. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
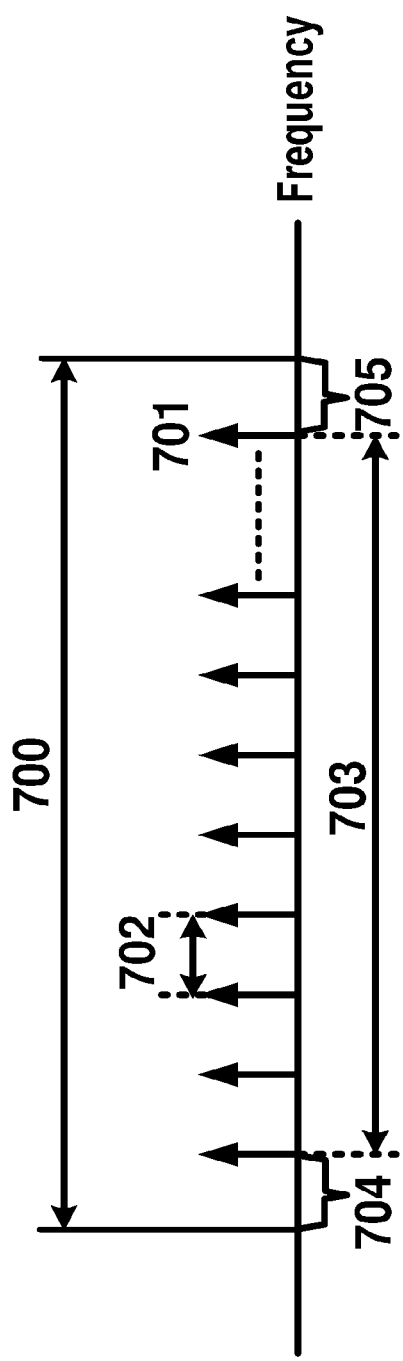
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

Figure 7B:
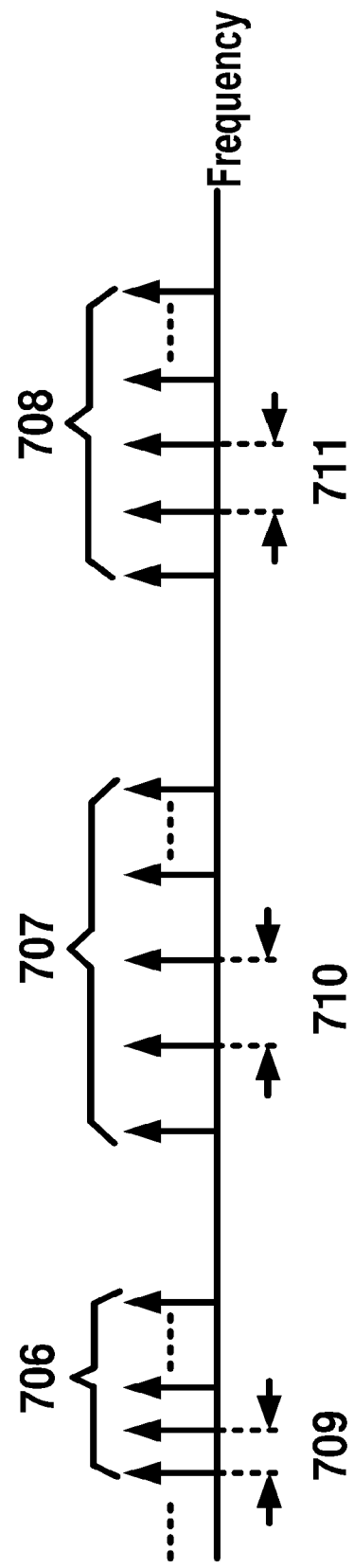

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
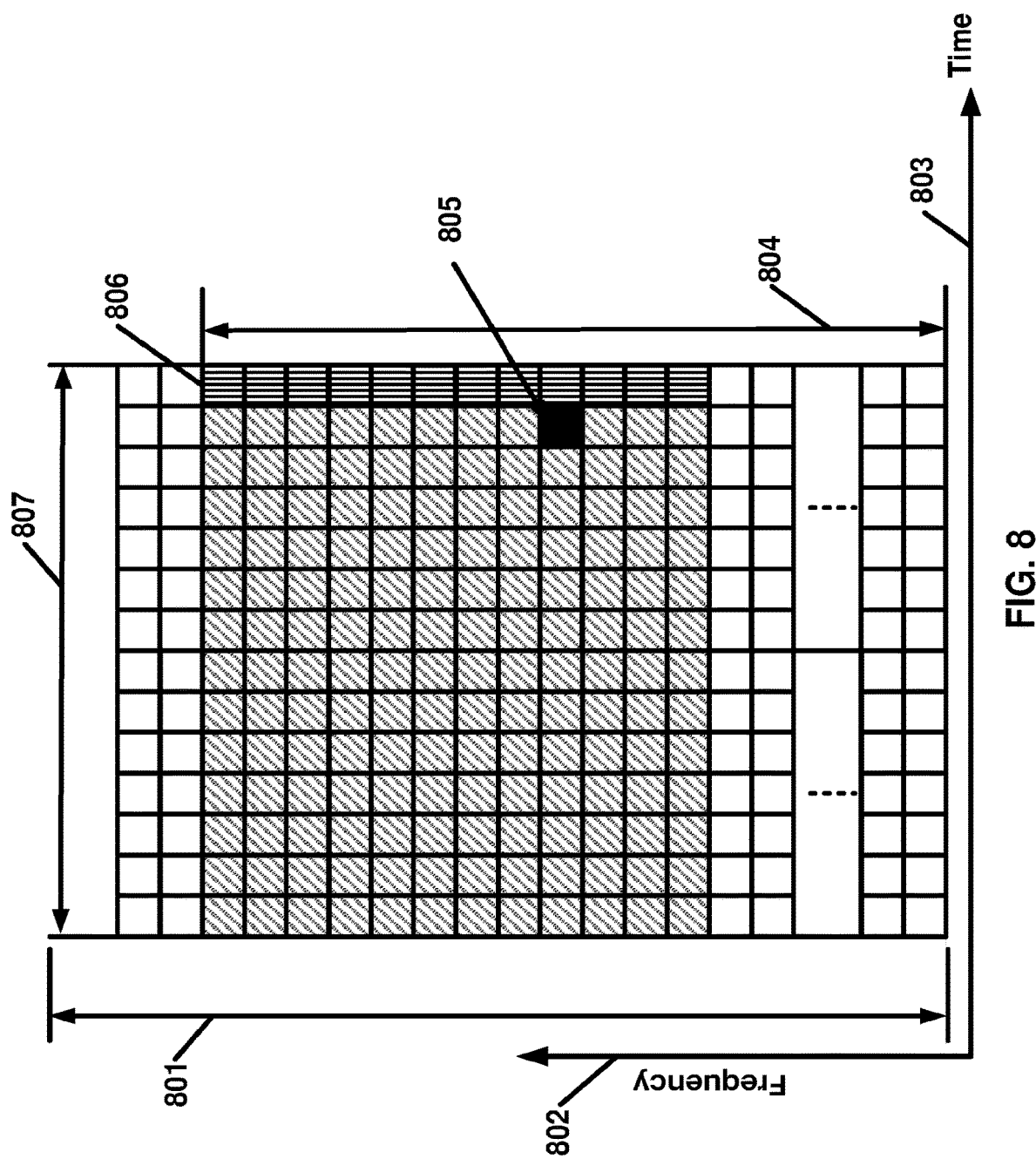
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCL-ed with the DM-RS antenna port(s). Different set of DM-RS antenna port(s) for a DL data channel may be indicated as QCL with different set of the RS antenna port(s).

Figure 9A:
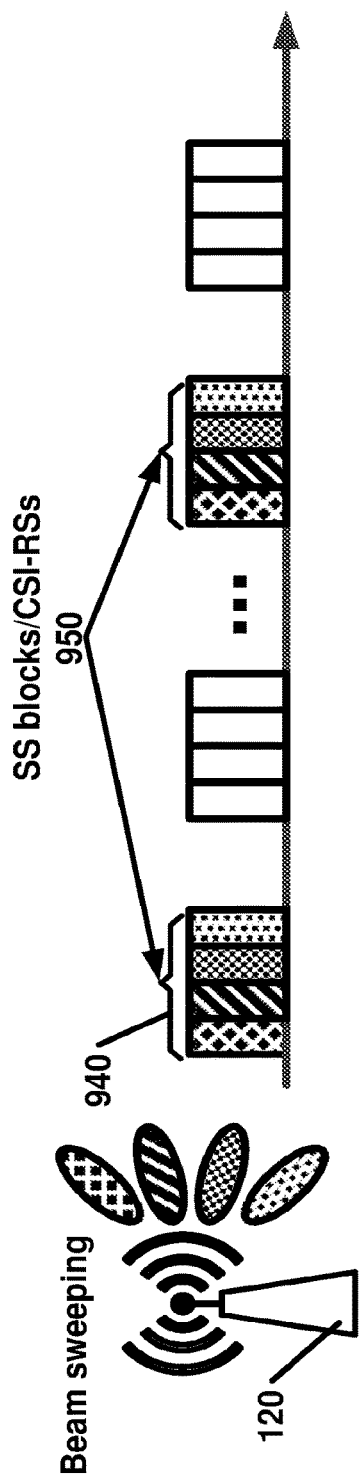
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
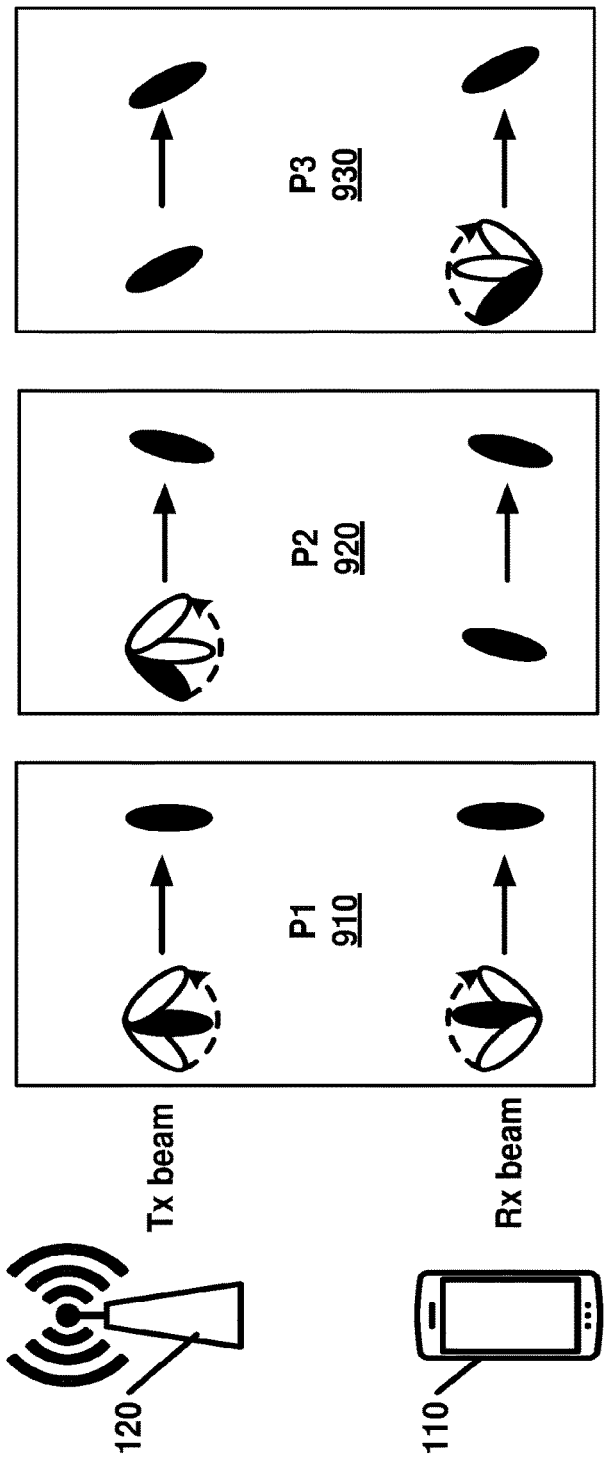
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
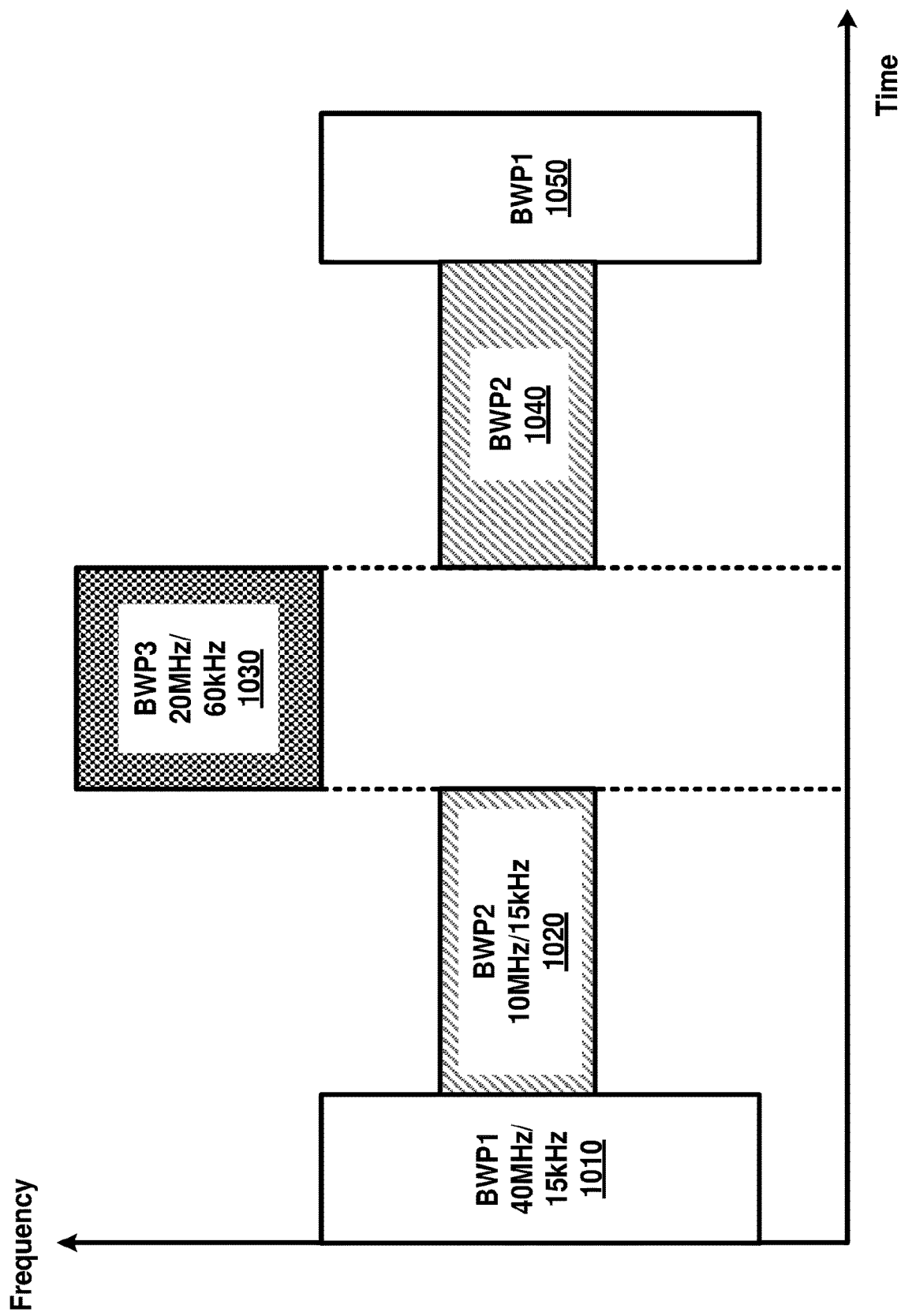
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
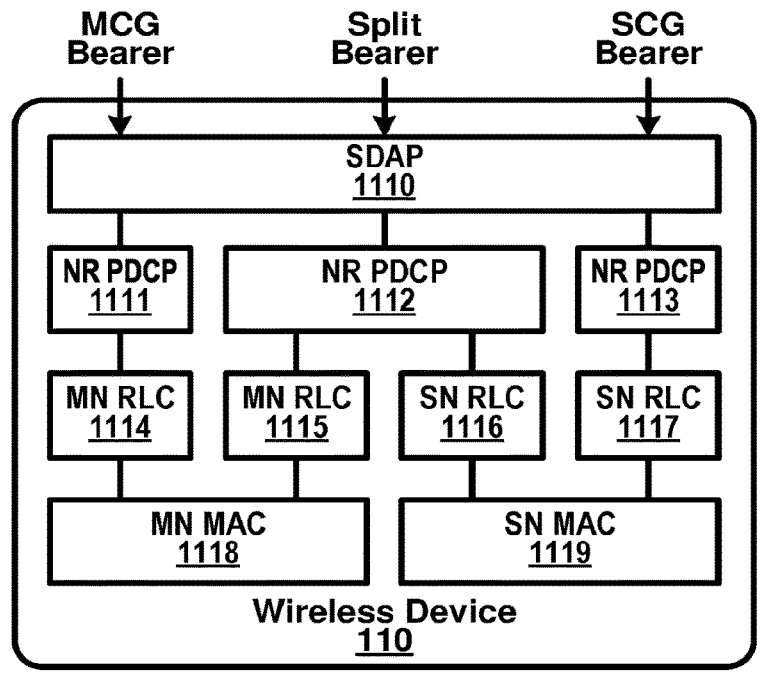
FIG. 11A, and FIG. 11B are diagrams of an example multi connectivity as per an aspect of an embodiment of the present disclosure.
Figure 11B:
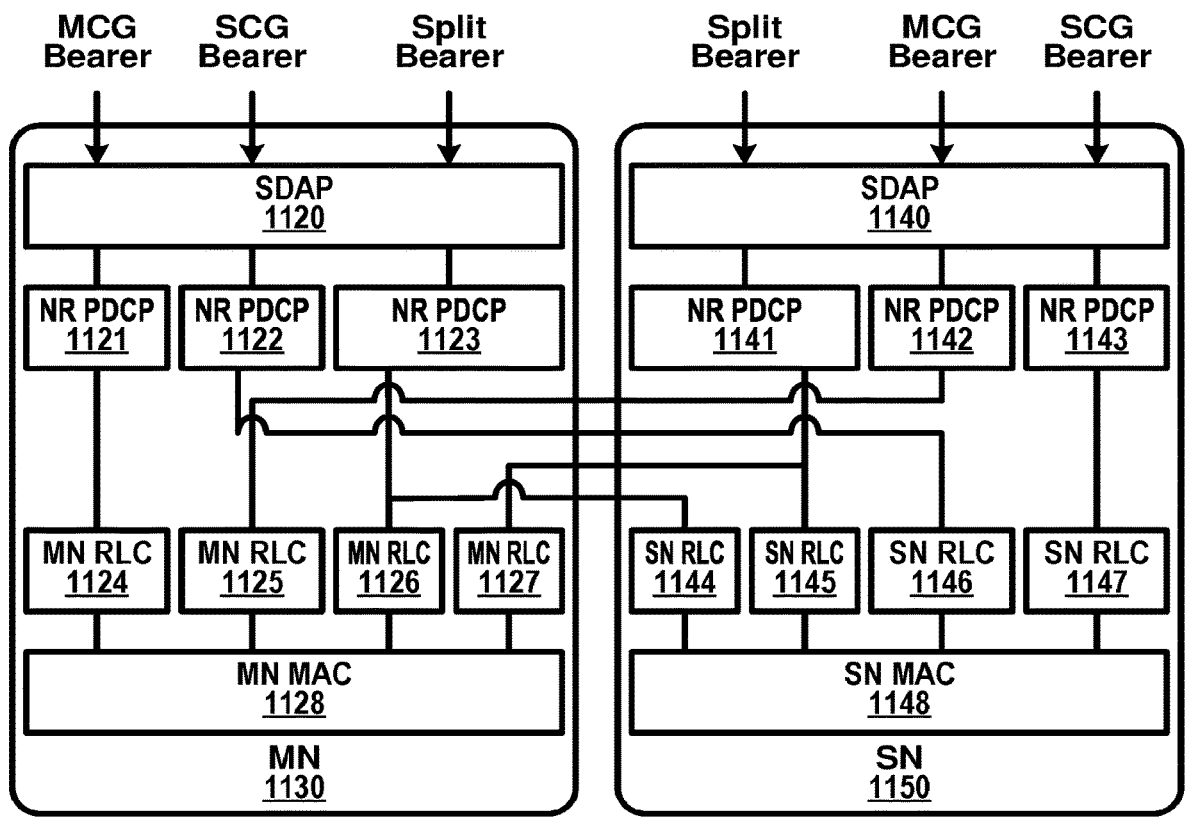

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
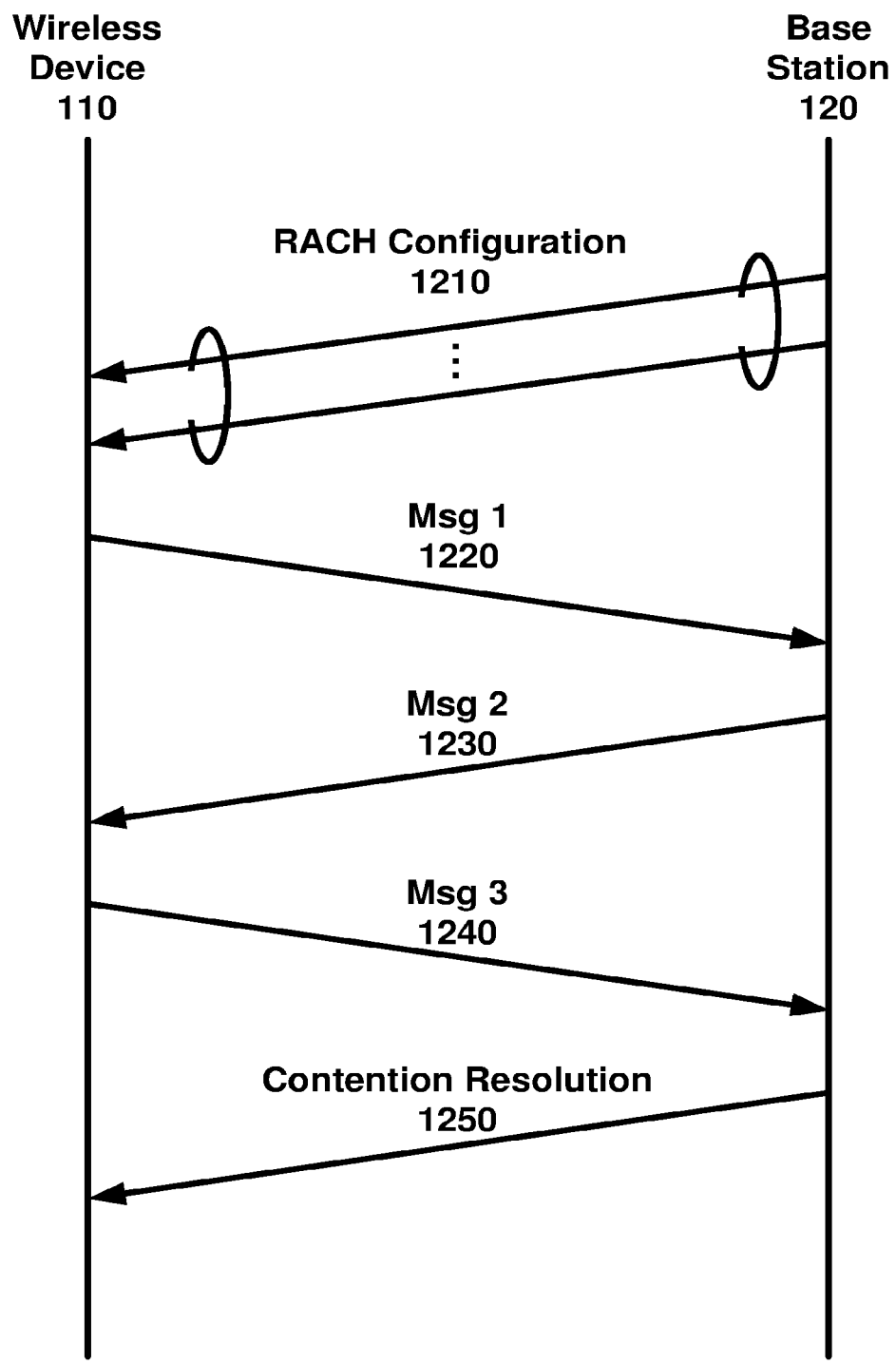
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-ResponseWindow) to monitor a random access response. For beam failure recovery request, a base station may configure a UE with a different time window (e.g., bfr-ResponseWindow) to monitor response on beam failure recovery request. For example, a UE may start a time window (e.g., ra-ResponseWindow or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgment for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
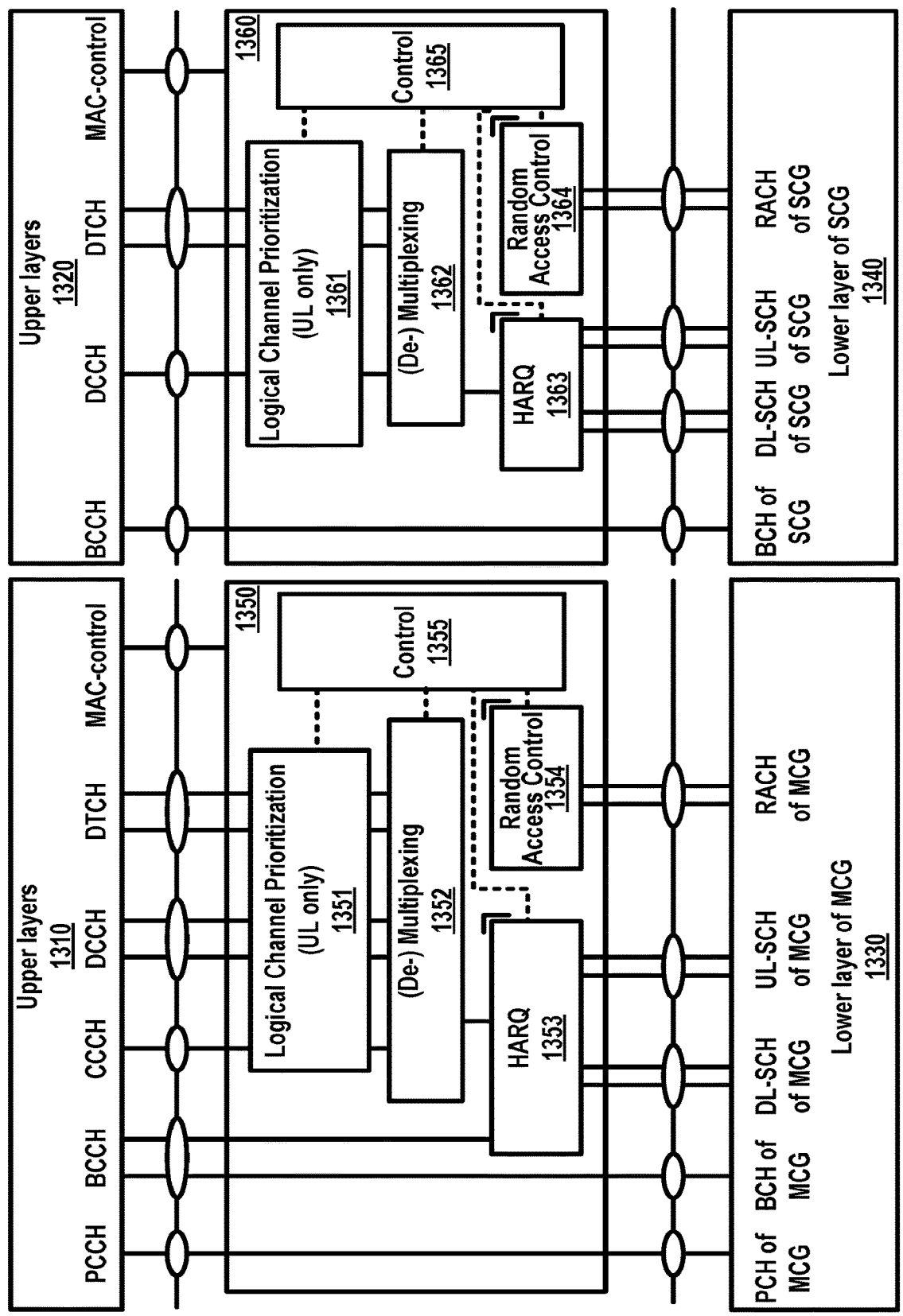
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
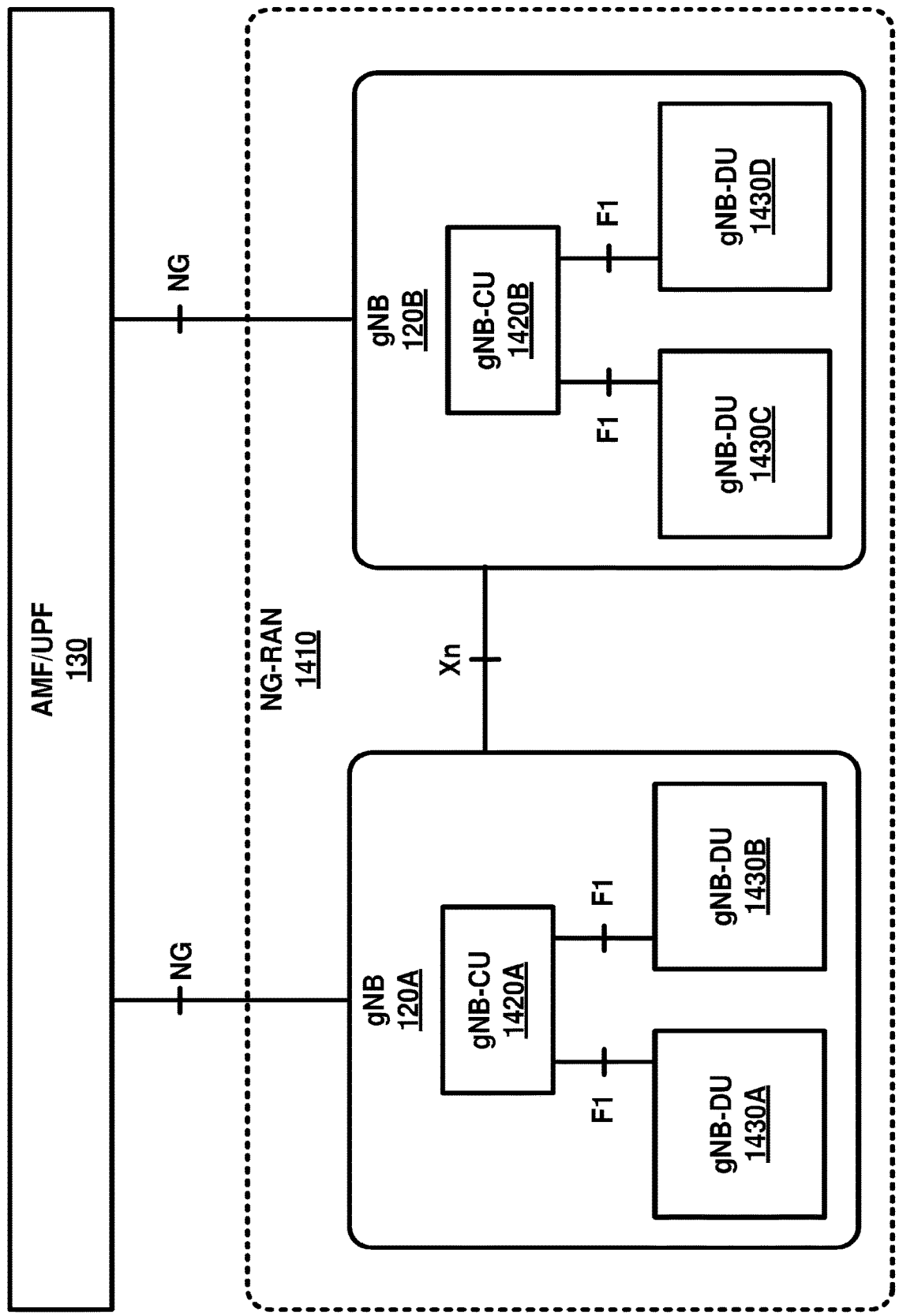
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
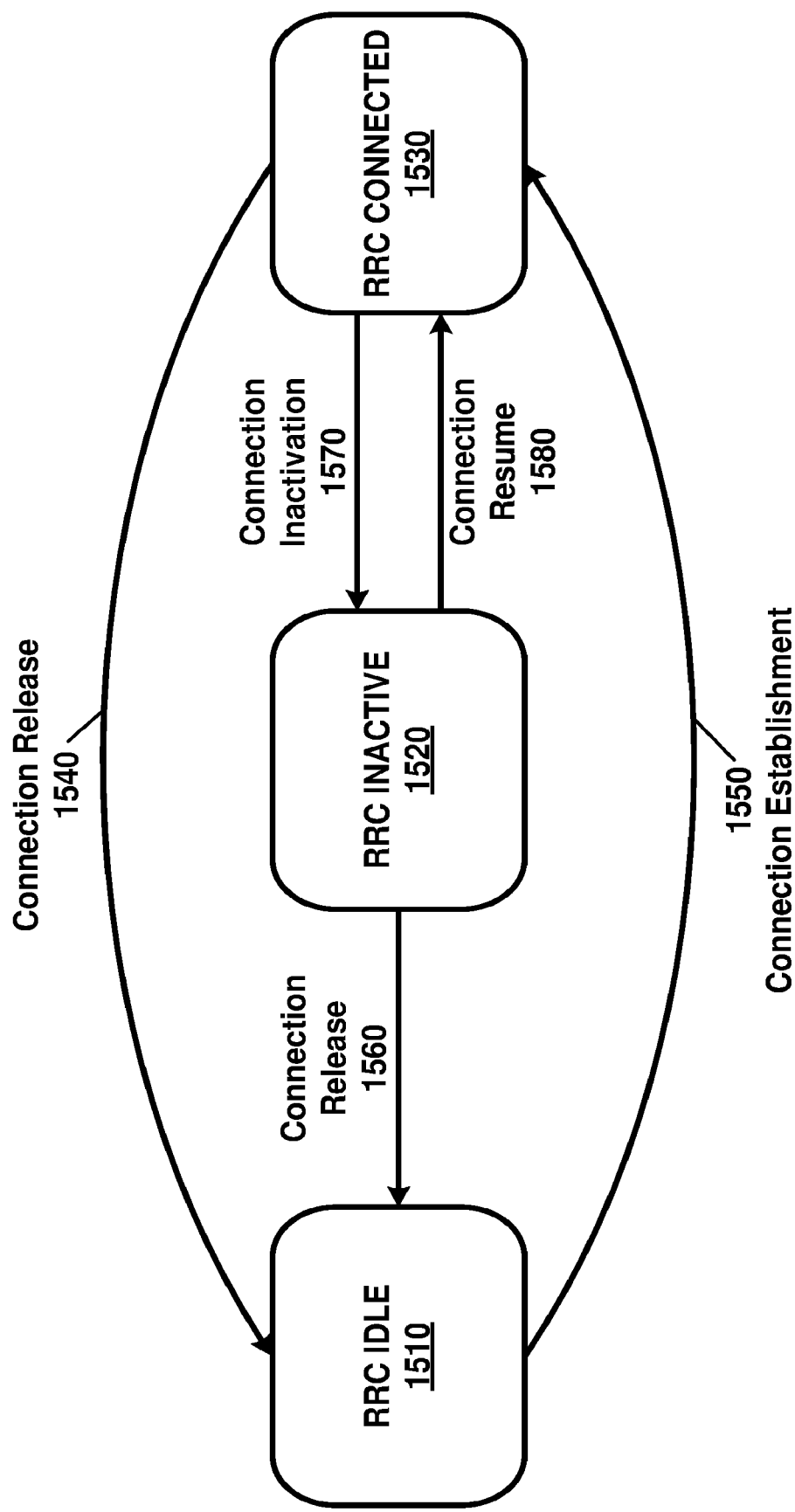
FIG. 15 is a diagram of example RRC states as per an aspect of an embodiment of the present disclosure.
Figure 16:
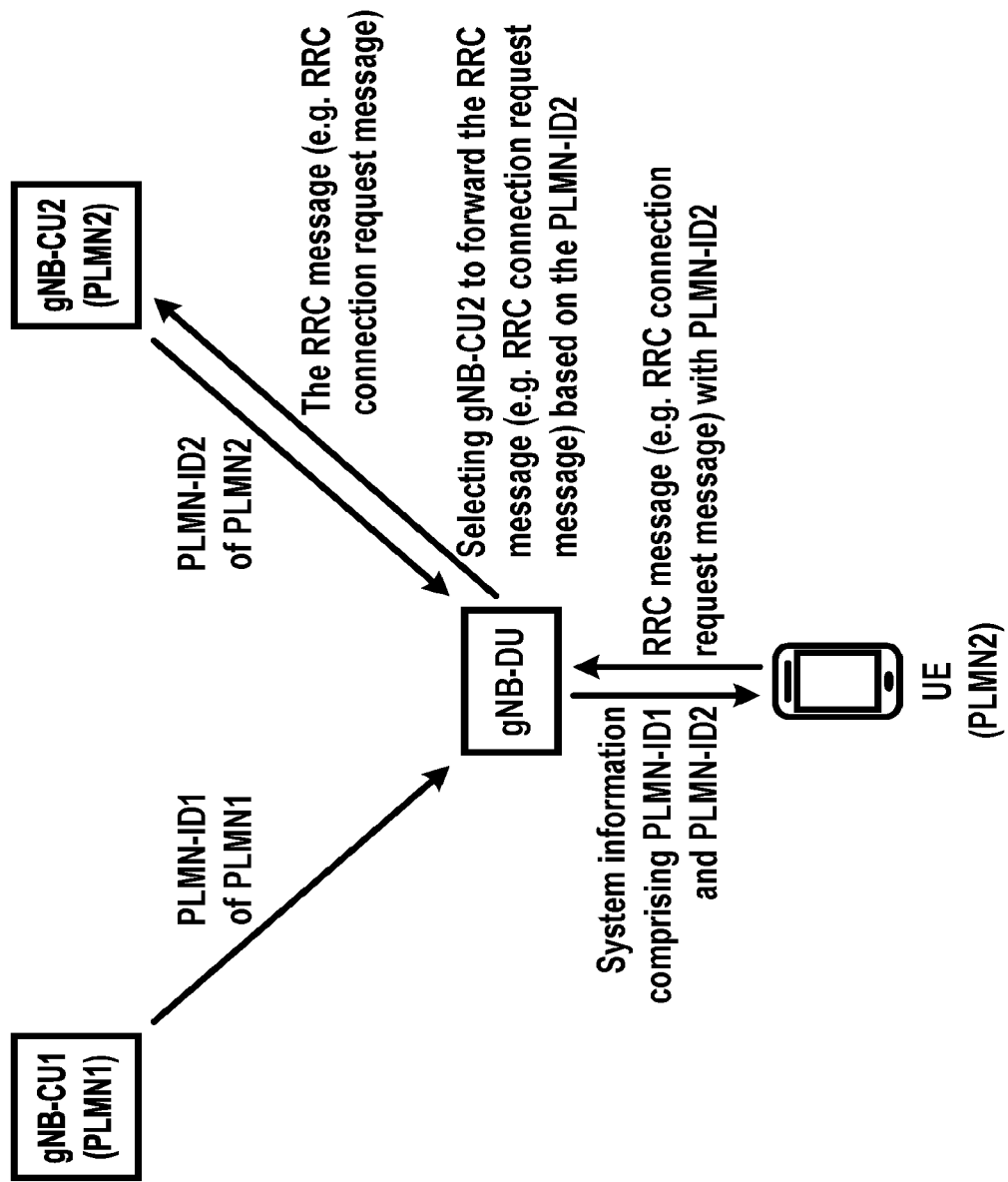
FIG. 16 is an example diagram of an aspect of an embodiment of the present disclosure.
Figure 17:
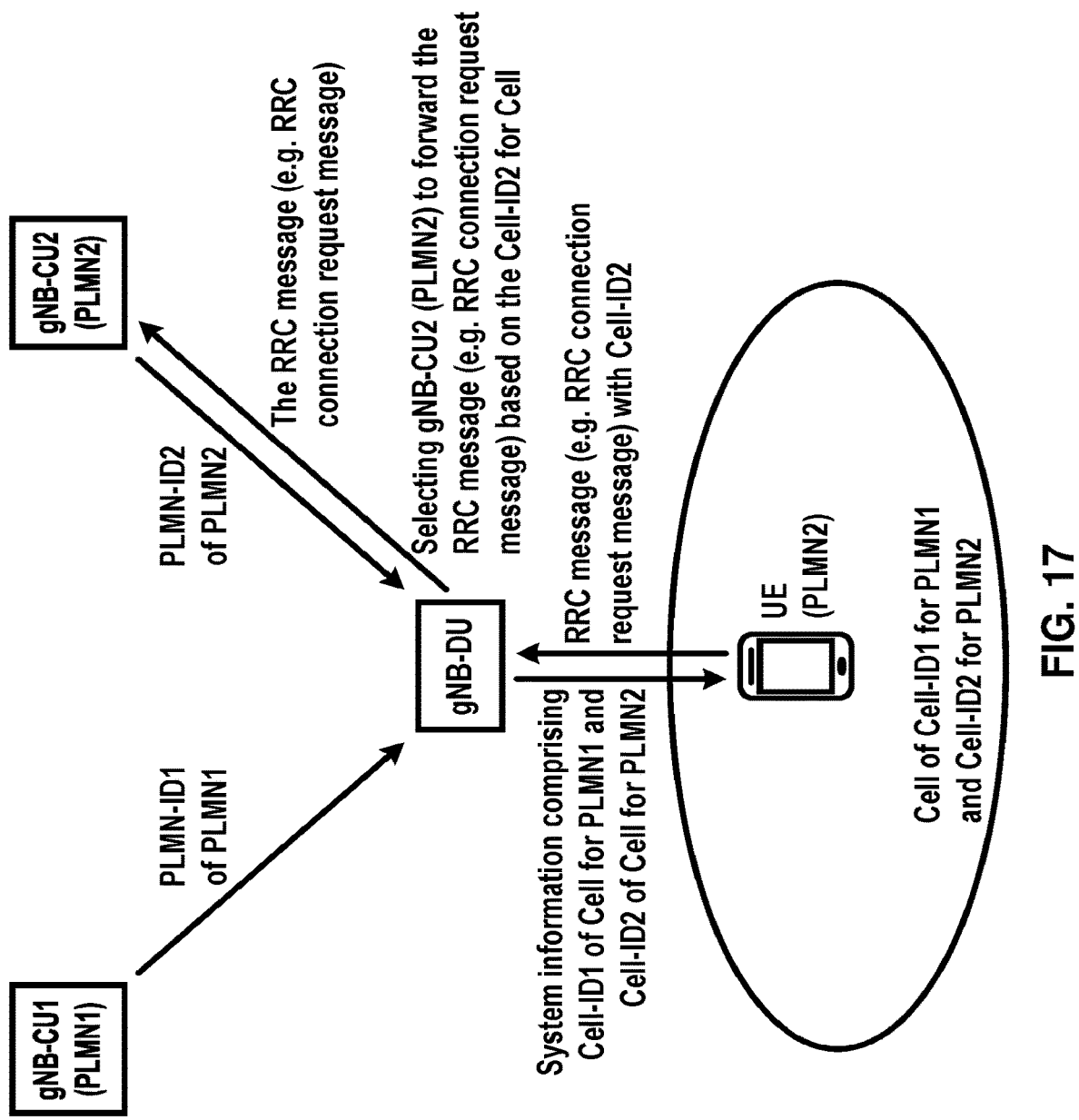
FIG. 17 is an example diagram of an aspect of an embodiment of the present disclosure.
Figure 18:
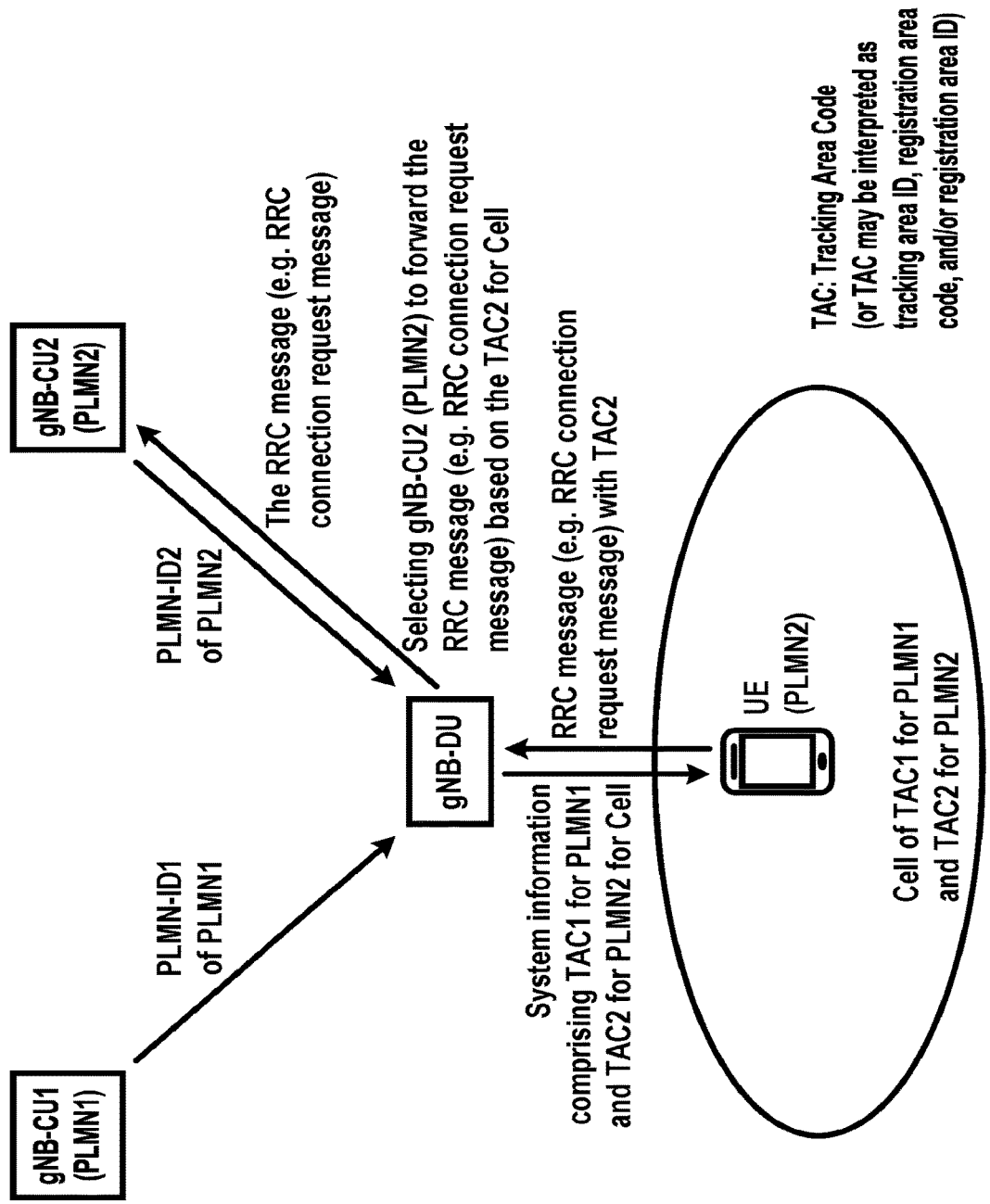
FIG. 18 is an example diagram of an aspect of an embodiment of the present disclosure.
Figure 19:
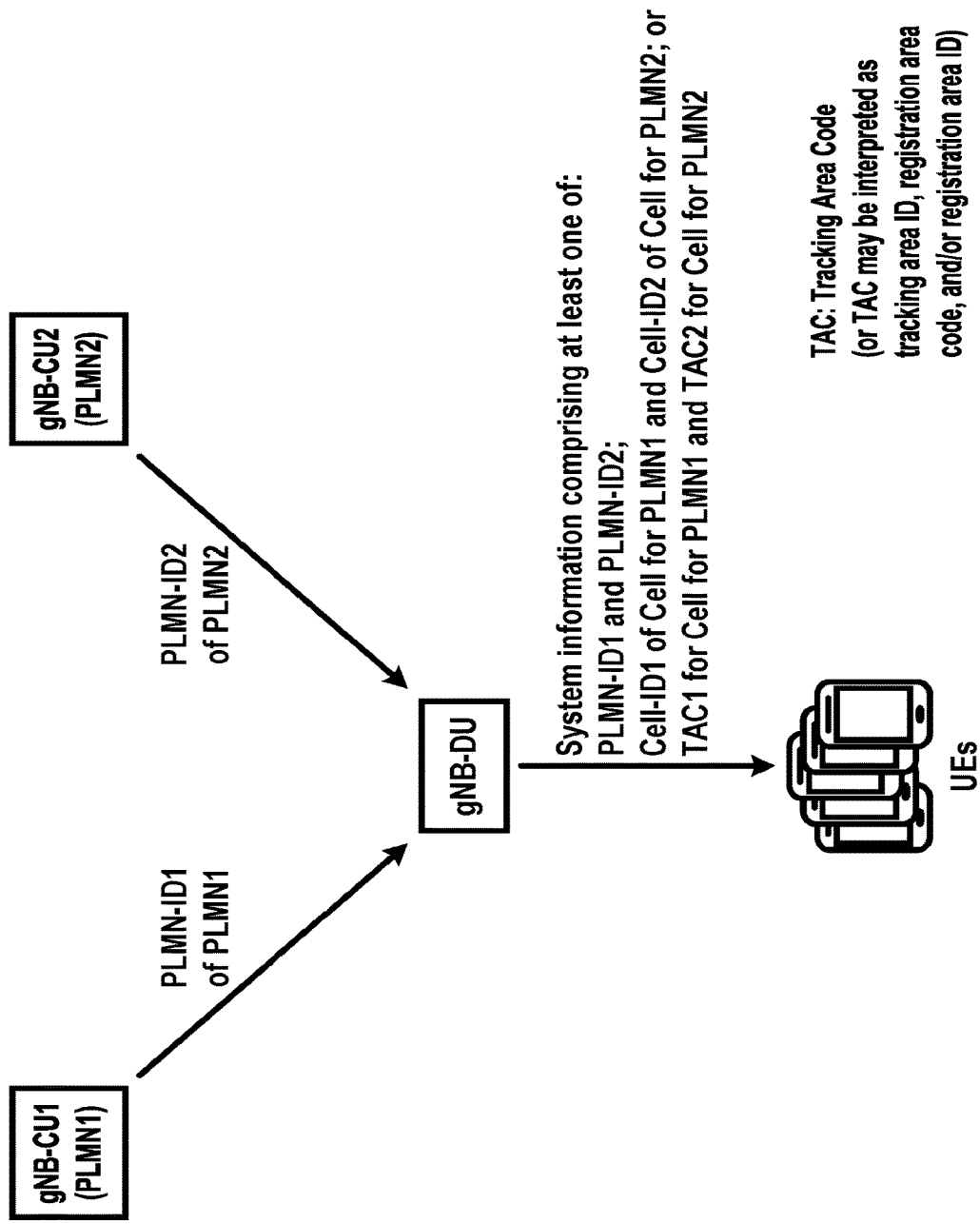
FIG. 19 is an example diagram of an aspect of an embodiment of the present disclosure.
Figure 20:
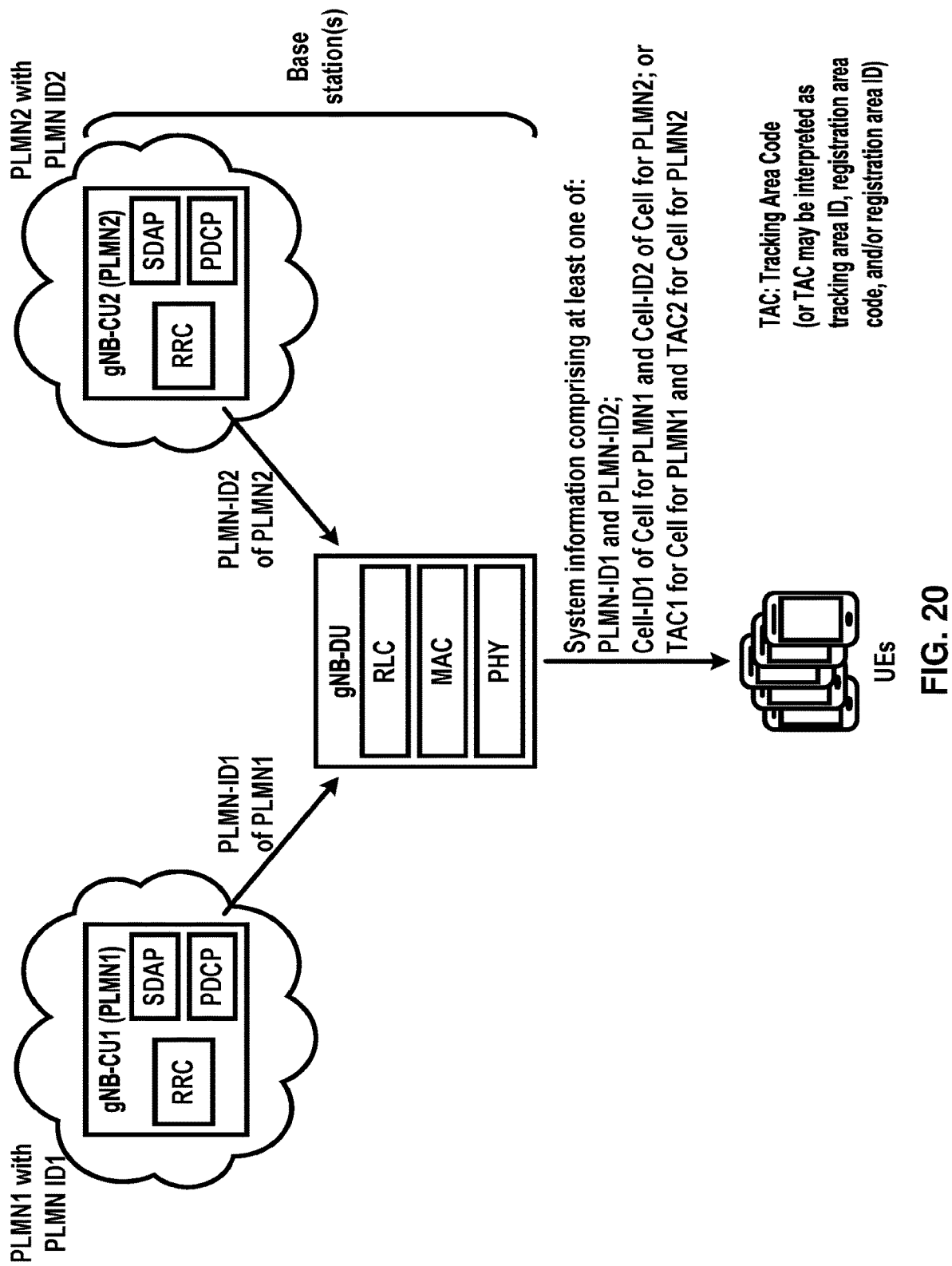
FIG. 20 is an example diagram of an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

In an example, there may be many network-sharing scenarios depending on different operator strategies but also on rules and legislation in different countries. The equivalent PLMN feature may allow operators to share a common base station, with certain parts of the core networks shared between the operators.

In an example, network-sharing scenario may allow operators to share the network and/or supply its customers with wireless services. For example, an operator may supply its subscribers with services using another operator's allocated spectrum. A geographically split network, e.g. a scenario in which cooperating operators cover different parts of a country, may be possible. One operator's core network may also be connected to several base stations.

In an example, it may not only the sharing solution at a certain time that is important, but also how it is possible for the sharing partners to evolve either to a more dedicated network or to a more joint network. A set of infrastructure sharing solutions and scenarios that is discussed in the industry may cover alternatives that together comprise: solution alternatives targeting at dedicated networks in the near future; solutions for infrastructure sharing not targeting at immediate exit, but at exit when for example the network capacity demand so requires; and/or infrastructure sharing targeting at long term sharing, which for example may be the case when one of the operators lacks a frequency license. In an example, identifying, changing, and adding appropriate functionality in the network may lead to a better shared-network operation.

In an example, for operators that have multiple frequency allocations it may be possible to share the RAN elements, but not to share the radio frequencies. In this case the operators may connect directly to their own dedicated carrier layer in the shared base station.

In an example, in this scenario, two (or more) operators with individual licenses may with their respective radio access networks cover different parts of a country but together provide coverage of the entire country.

In an example, when two (or more operators) employ national roaming for the users (e.g. UEs), which may imply that one core network may be associated with radio access network. Care may be needed when coverage regions overlap, which may make this a valid shared-networks scenario.

In an example, the operators may have their individual core networks connected to both radio access networks throughout the entire coverage area, e.g. utilizing the different operator's allocated spectrum in different parts of the coverage area. There may be multiple core network operators in the shared radio access networks. The connection of the core networks to the radio access networks (e.g. base stations) may either be done by connecting the radio network controllers to both operators' core network elements or by sharing parts of the core network. It may be possible to introduce interface flex functionality between the common core network parts and the radio access network for purely load-sharing purposes.

In an example, in areas where more than one of the operators provide coverage, it may be possible to restrict the access rights so that the users may be allowed to use the radio access network provided by their home operator.

In an example, one operator may deploy coverage in a specific geographical area, and other operators may be allowed to use this coverage for their subscribers. Outside this geographical area, coverage may be provided by the operators.

For example, in the case of two operators, a third-party could provide RAN coverage to operators A and B' subscribers in areas with high population density. In less dense areas, other RAN coverage is provided by operator A and operator B and in these areas the subscribers may connect to the access network of their operator.

In an example, common spectrum network sharing may be applicable when: one operator has a license and/or shares the allocated spectrum with other operators; and/or a number of operators decide to pool their allocated spectrums and share the total spectrum (operators without allocated spectrum may also share this pooled spectrum).

In an example, connecting operator's core networks and/or the shared radio access network(s) (1 radio network controller for simplicity). In this case, it may be possible that one or more of the core network operators use interface Flex between their core network and the shared radio access network. Operators A and C may not be using multiple core network nodes (CN) and therefore may not need to use interface flex. Operator B may be using multiple CNs and/or may have decided to use interface flex to enable the intra-domain sharing of CNs.

In an example, the core network entities connected to radio access network may be shared. The work on shared networks may be the choice of the operator which one is implemented.

In network sharing scenario multiple radio access networks may share a common network. The multiple RANs may belong to different PLMNs and network operators. Due to operators' deployment different nodes or part of the common core network may be shared.

In an example, to fully support for handover, service differentiation and access rights in shared networks, it may be necessary to identify to which operator that a user (e.g. UE) belongs to and possibly group the users according to this information. To avoid complicated operation and maintenance procedures, such user classification may be general for the functions in the shared network that needs information about the user identity. Network sharing may be an agreement between network operators and/or may be transparent to the user.

In an example, when network sharing exists between different operators and a user roams into the shared network, it may be possible for that user to register with a core network operator (among the network sharing partners) that either: the user has a subscription with; or the user's home operator has a roaming agreement with, even if the operator is not offering radio coverage. The selection of a core network operator among those connected to the shared radio access network may either be manual (i.e. performed by the user after receiving a list of available core network operators) or automatic (i.e. performed by the UE according to user and operator preferred settings).

In an example, the terminal may display the name of the core network operator (e.g. PLMN) that the user has registered with. A network sharing solution may support legacy UEs. In an example, the following two cases may be identified: Manual network selection for roaming users; and/or Network name display for roaming users. The service capabilities and requirements may not be restricted by network sharing scenarios. It may be possible for a network operator to differentiate its service offering from other network operators within shared network.

In an example, the services and service capabilities offered may not be restricted by the existence of network sharing. It may be possible for a network operator to differentiate its service offering from other network operators within shared network. The provision of services and service capabilities that is possible to offer in a network may not be restricted by the existence of the network sharing It may be possible for a core network operator to differentiate its service offering from other core network operators within the shared network. It may be possible to control the access to service capabilities offered by a shared network according to the core network operator the user is subscribed to. The mobility in a shared network, both when controlled by the UE and when controlled by the network may not cause undue interruption of service.

In an example, it may be possible for a subscriber to roam between the different parts of a shared network without requiring the user intervention. The user experience while roaming in a shared network may be no worse than the user experiences in a non-shared network. In some instances, the user intervention may be required, for example it may be required in cases where the change to a different part of the shared network causes a change in the service tariff.

In an example, seamless handover may be supported between a shared network and a non-shared network. The user (e.g. UE) may be able to receive the same service level during and after a handover between the networks.

In an example, the network may be able to access the relevant subscriber information in order to determine the appropriate candidate for handover. Examples of information that may be required in order to take the decision on the candidate could include (non-exhaustive list): type of subscription (e.g. prepay/postpay); home network of the subscriber (for roaming subscribers); service(s) to be handed over; subscribed quality of service.

In an example, when the user is registered on a shared network, the control of the PLMN and radio access technology employed within that shared network is under the sole control of the network operator. This may not imply any limitation on the manual or automatic selection of a PLMN that does not belong to the shared network where the user is registered.

In an example, the standards may specify mechanisms necessary to enable flexible allocation of inbound roamers among core network operators that have roaming agreements with the same roaming partners. The core network operators may be able to pre-define their relative share of inbound roamers and the network may distribute the inbound roamers that apply automatic network selection to different core networks connected to the radio access network accordingly. It may also be possible for the core network operator to allow or force the subscribers to reselect to another part of the shared network so that the relative share of inbound roamers is maintained.

In an example, in case the mobility in the shared network is controlled by the UE (e.g. cell reselection) the operator may be able to set parameters, other than radio parameters that determine the most appropriate candidate. Examples of these parameters are: subscription information, requested service, network load and so on. Charging solutions may support the shared network architecture so that both end users and network sharing partners may be correctly charged for their usage of the shared network.

In an example, a UE may apply a system information acquisition procedure to acquire AS- and/or NAS-system information that may be broadcasted by E-UTRAN and/or net radio (NR). Procedures may apply to UEs in RRC_IDLE, RRC_INACTIVE, and/or in RRC_CONNECTED.

In an example, a UE may apply a system information acquisition procedure upon selecting (e.g. upon power on) and/or upon re-selecting a cell, after handover completion, after entering E-UTRA/NR from another radio access technology (RAT), upon return from out of coverage, upon receiving a notification that system information has changed, upon receiving an indication about a presence of an ETWS notification, upon receiving an indication about a presence of a CMAS notification, upon receiving a notification that a EAB parameters have changed, upon receiving a request from CDMA2000 upper layers and/or upon exceeding a maximum validity duration. In an example, a system information acquisition procedure may overwrite stored system information, e.g. delta configuration may not be applicable for system information and/or a UE discontinues using a field if it is absent in system information unless explicitly specified otherwise.

In an example, in RRC_CONNECTED, BL UEs and/or UEs in CE may be required to acquire system information when T311 is running and/or upon handover where a UE may be required to acquire a MasterInformationBlock in a target PCell. Upon handover, E-UTRAN/NR may provide system information required by a UE in RRC_CONNECTED (e.g. except MIB) with RRC signaling, e.g. systemInformationBlockType1Dedicated and/or mobilityControlInfo.

In an example, a UE may: 1> ensure having a valid version, as defined below, of (at least) a following system information, also referred to as a 'required' system information: 2> if in RRC_IDLE/RRC_INACTIVE: 3> if a UE is a NB-IoT UE: 4> a MasterInformationBlock-NB and SystemInformationBlockType1-NB as well as SystemInformationBlockType2-NB through SystemInformationBlockType5-NB, SystemInformationBlockType22-NB; 3> else: 4> a MasterInformationBlock and/or SystemInformationBlockType1 (or SystemInformationBlockType1-BR depending on whether a UE is a BL UE or a UE in CE) as well as SystemInformationBlockType2 through SystemInformationBlockType8 (depending on support of a concerned RATs), SystemInformationBlockType17 (depending on support of RAN-assisted WLAN interworking); 2> if in RRC_CONNECTED; and/or 2> a UE is not a BL UE; and/or 2> a UE is not in CE; and/or 2> a UE is not a NB-IoT UE: 3> a MasterInformationBlock, SystemInformationBlockType1 and/or SystemInformationBlockType2 as well as SystemInformationBlockType8 (depending on support of CDMA2000), SystemInformationBlockType17 (depending on support of RAN-assisted WLAN interworking); 2> if in RRC_CONNECTED and/or T311 is running; and/or 2> a UE is a BL UE or a UE is in CE or a UE is a NB-IoT UE; 3> a MasterInformationBlock (or MasterInformationBlock-NB in NB-IoT), SystemInformationBlockType1-BR (or SystemInformationBlockType1-NB in NB-IoT) and/or SystemInformationBlockType2 (or SystemInformationBlockType2-NB in NB-IoT), and/or for NB-IoT SystemInformationBlockType22-NB; 1> delete stored system information after 3 hours or 24 hours from a moment it was confirmed to be valid, unless specified otherwise; 1> consider stored system information except SystemInformationBlockType10, SystemInformationBlockType11, systemInformationBlockType12 and/or systemInformationBlockType14 (systemInformationBlockType14-NB in NB-IoT) to be invalid if systemInfoValueTag included in SystemInformationBlockType1 (MasterInformationBlock-NB in NB-IoT) may be different from one of stored system information and/or in case of NB-IoT UEs, BL UEs and UEs in CE, systemInfoValueTagSI is not broadcasted;

In an example, a UE may: 1> apply a specified BCCH configuration or BR-BCCH configuration; 1> if a procedure is triggered by a system information change notification: 2> if a UE uses an idle/inactive DRX cycle longer than a modification period: 3> start acquiring required system information from a next eDRX acquisition period boundary; 2> else 3> start acquiring a required system information from a beginning of a modification period following one in which a change notification was received; (a UE may continue using previously received system information until new system information has been acquired) 1> if a UE is in RRC_IDLE/RRC_INACTIVE and/or enters a cell for which a UE does not have stored a valid version of system information required in RRC_IDLE/RRC_INACTIVE: 2> acquire, using a system information acquisition procedure, system information required in RRC_IDLE/RRC_INACTIVE; 1> following successful handover completion to a PCell for which a UE does not have stored a valid version of system information required in RRC_CONNECTED: 2> acquire, using a system information acquisition procedure, system information required in RRC_CONNECTED; 2> upon acquiring concerned system information: 3> discard corresponding radio resource configuration information included in a radioResourceConfigCommon previously received in a dedicated message, if any; 1> following a request from CDMA2000 upper layers: 2> acquire SystemInformationBlockType8; 1> neither initiate an RRC connection establishment/resume procedure nor initiate transmission of an RRCConnectionReestablishmentRequest message until a UE has a valid version of a MasterInformationBlock (MasterInformationBlock-NB in NB-IoT) and/or SystemInformationBlockType1 (SystemInformationBlockType1-NB in NB-IoT) messages as well as SystemInformationBlockType2 (SystemInformationBlockType2-NB in NB-IoT), and/or for NB-IoT, SystemInformationBlockType22-NB; 1> not initiate an RRC connection establishment/resume procedure subject to EAB until a UE has a valid version of SystemInformationBlockType14, if broadcast; 1> if a UE is ETWS capable: 2> upon entering a cell during RRC_IDLE/RRC_INACTIVE, following successful handover or upon connection re-establishment: 3> discard previously buffered warningMessageSegment; 3> clear, if any, a current values of messageIdentifier and serialNumber for SystemInformationBlockType11; 2> when a UE acquires SystemInformationBlockType1 following ETWS indication, upon entering a cell during RRC_IDLE, following successful handover or upon connection re-establishment: 3> if schedulingInfoList indicates that SystemInformationBlockType10 is present: 4> if a UE is in CE: 5> start acquiring SystemInformationBlockType10; 4> else 5> start acquiring SystemInformationBlockType10 immediately; 3> if schedulingInfoList indicates that SystemInformationBlockType11 is present: 4> start acquiring SystemInformationBlockType11 immediately; (UEs may start acquiring SystemInformationBlockType10 and SystemInformationBlockType11 as described above even when systemInfoValueTag in SystemInformationBlockType1 has not changed)

1> if a UE is CMAS capable: 2> upon entering a cell during RRC_IDLE/RRC_INACTIVE, following successful handover or upon connection re-establishment: 3> discard previously buffered warningMessageSegment; 3> clear, if any, stored values of messageIdentifier and serialNumber for SystemInformationBlockType12 associated with a discarded warningMessageSegment; 2> when a UE acquires SystemInformationBlockType1 following CMAS indication, upon entering a cell during RRC_IDLE/RRC_INACTIVE, following successful handover and upon connection re-establishment: 3> if schedulingInfoList indicates that SystemInformationBlockType12 is present: 4> acquire SystemInformationBlockType12; (UEs may start acquiring SystemInformationBlockType12 as described above even when systemInfoValueTag in SystemInformationBlockType1 has not changed)

1> if a UE is interested to receive MBMS services: 2> if a UE is capable of MBMS reception: 3> if schedulingInfoList indicates that SystemInformationBlockType13 is present and a UE does not have stored a valid version of this system information block: 4> acquire SystemInformationBlockType13; 3> else if SystemInformationBlockType13 is present in SystemInformationBlockType1-MBMS and a UE does not have stored a valid version of this system information block: 4> acquire SystemInformationBlockType13 from SystemInformationBlockType1-MBMS; 2> if a UE is capable of SC-PTM reception: 3> if schedulingInfoList indicates that SystemInformationBlockType20 (SystemInformationBlockType20-NB in NB-IoT) is present and/or a UE does not have stored a valid version of this system information block: 4> acquire SystemInformationBlockType20 (SystemInformationBlockType20-NB in NB-IoT); 2> if a UE is capable of MBMS Service Continuity: 3> if schedulingInfoList indicates that SystemInformationBlockType15 (SystemInformationBlockType15-NB in NB-IoT) is present and/or a UE does not have stored a valid version of this system information block: 4> acquire SystemInformationBlockType15 (SystemInformationBlockType15-NB in NB-IoT);

1> if a UE is EAB capable: 2> when a UE does not have stored a valid version of SystemInformationBlockType14 upon entering RRC_IDLE/RRC_INACTIVE, and/or when a UE acquires SystemInformationBlockType1 following EAB parameters change notification, and/or upon entering a cell during RRC_IDLE/RRC_INACTIVE, or before establishing an RRC connection if using eDRX with DRX cycle longer than a modification period: 3> if schedulingInfoList indicates that SystemInformationBlockType14 is present: 4> start acquiring SystemInformationBlockType14 immediately; 3> else: 4> discard SystemInformationBlockType14, if previously received; (EAB capable UEs may start acquiring SystemInformationBlockType14 as described above even when systemInfoValueTag in SystemInformationBlockType1 has not changed) (EAB capable UEs may maintain an up to date SystemInformationBlockType14 in RRC_IDLE/RRC_INACTIVE)

1> if a UE is capable of sidelink communication and/or is configured by upper layers to receive or transmit sidelink communication: 2> if a cell used for sidelink communication meets an S-criteria; and/or 2> if schedulingInfoList indicates that SystemInformationBlockType18 is present and/or a UE does not have stored a valid version of this system information block: 3> acquire SystemInformationBlockType18; 1> if a UE is capable of sidelink discovery and/or is configured by upper layers to receive or transmit sidelink discovery announcements on a primary frequency: 2> if schedulingInfoList of a serving cell/PCell indicates that SystemInformationBlockType19 is present and/or a UE does not have stored a valid version of this system information block: 3> acquire SystemInformationBlockType19; 1> if a UE is capable of sidelink discovery and/or, for one or more frequencies included in discInterFreqList, if included in SystemInformationBlockType19 and/or for which a UE is configured by upper layers to receive sidelink discovery announcements on: 2> if SystemInformationBlockType19 of a serving cell/PCell does not provide corresponding reception resources; and/or 2> if schedulingInfoList of a cell on a concerned frequency indicates that SystemInformationBlockType19 is present and/or a UE does not have stored a valid version of this system information block: 3> acquire SystemInformationBlockType19; 1> if a UE is capable of sidelink discovery and/or, for one or more frequencies included in discInterFreqList, if included in SystemInformationBlockType19 and/or for which a UE is configured by upper layers to transmit sidelink discovery announcements on: 2> if SystemInformationBlockType19 of a serving cell/PCell includes discTxResourcesInterFreq which may be set to acquireSIFromCarrier; and/or 2> if schedulingInfoList of a cell on a concerned frequency indicates that SystemInformationBlockType19 is present and a UE does not have stored a valid version of this system information block: 3> acquire SystemInformationBlockType19; 1> if a UE is a NB-IoT UE and/or if ab-Enabled included in MasterInformationBlock-NB is set to TRUE: 2> not initiate a RRC connection establishment/resume procedure for access causes (e.g. except mobile terminating calls) until a UE has acquired a SystemInformationBlockType14-NB; 1> if a UE is capable of V2X sidelink communication and/or is configured by upper layers to receive or transmit V2X sidelink communication on a frequency: 2> if schedulingInfoList on a serving cell/PCell indicates that SystemInformationBlockType21 is present and/or a UE does not have stored valid version of this system information block; 3> acquire SystemInformationBlockType21 from serving cell/PCell; 1> if a UE is capable of V2X sidelink communication and is configured by upper layers to receive V2X sidelink communication on a frequency, which may not be primary frequency: 2> if SystemInformationBlockType21 of a serving cell/PCell does not provide reception resource pool for V2X sidelink communication for a concerned frequency; and/or 2> if a cell used for V2X sidelink communication on a concerned frequency meets an S-criteria; and/or 2> if schedulingInfoList on a concerned frequency indicates that SystemInformationBlockType21 is present and a UE does not have stored a valid version of this system information block: 3> acquire SystemInformationBlockType21 from a concerned frequency; 1> if a UE is capable of V2X sidelink communication and/or is configured by upper layers to transmit V2X sidelink communication on a frequency, which may not primary frequency and/or may not be included in v2x-InterFreqInfoList in SystemInformationBlockType21 of a serving cell/PCell: 2> if a cell used for V2X sidelink communication on a concerned frequency meets an S-criteria; and/or 2> if schedulingInfoList on a concerned frequency indicates that SystemInformationBlockType21 is present and/or a UE does not have stored a valid version of this system information block: 3> acquire SystemInformationBlockType21 from a concerned frequency; a UE may apply received SIBs immediately, e.g. a UE may not need to delay using a SIB until SI messages have been received. A UE may delay applying received SIBs until completing lower layer procedures associated with a received and/or a UE originated RRC message, e.g. an ongoing random access procedure. While attempting to acquire a particular SIB, if a UE detects from schedulingInfoList that it may be no longer present, a UE may stop trying to acquire a particular SIB.

In an example, a UE may: 1> if in RRC_IDLE/RRC_INACTIVE or in RRC_CONNECTED while T311 is running: 2> if a UE is unable to acquire a MasterInformationBlock (MasterInformationBlock-NB in NB-IoT); and/or 2> if a UE is neither a BL UE nor in CE nor in NB-IoT and a UE is unable to acquire a SystemInformationBlockType1; and/or 2> if a BL UE or UE in CE is unable to acquire SystemInformationBlockType1-BR and/or SystemInformationBlockType1-BR is not scheduled; and/or 2> if a NB-IoT UE is unable to acquire a SystemInformationBlockType1-NB: 3> consider a cell as barred; and/or 3> perform barring as if intraFreqReselection is set to allowed, and/or as if a csg-Indication is set to FALSE; 2> else if a UE is unable to acquire a SystemInformationBlockType2 (or SystemInformationBlockType2-NB in NB-IoT) and/or for NB-IoT, SystemInformationBlockType22-NB if scheduled: 3> treat a cell as barred.

In an example, upon receiving a MasterInformationBlock message, a UE may: 1> apply a radio resource configuration included in a phich-Config; 1> if a UE is in RRC_IDLE/RRC_INACTIVE or if a UE is in RRC_CONNECTED while T311 is running: 2> if a UE has no valid system information stored for a concerned cell: 3> apply a received value of dl-Bandwidth to a ul-Bandwidth until SystemInformationBlockType2 is received. In an example, upon receiving a MasterInformationBlock-NB message, a UE may: 1> apply a radio resource configuration included in accordance with an operationModeInfo. In an example, UE requirements related to contents of MasterInformationBlock-MBMS may not apply other than those specified elsewhere e.g. within procedures using concerned system information, and/or within corresponding field descriptions.

In an example, upon receiving a SystemInformationBlockType1 or SystemInformationBlockType1-BR either via broadcast and/or via dedicated signaling, a UE may: 1> if a cellAccessRelatedInfoList contains an entry with a PLMN-Identity of a selected PLMN: 2> in a remainder of procedures use plmn-IdentityList, trackingAreaCode, and/or cellIdentity for a cell as received in a corresponding cellAccessRelatedInfoList containing a selected PLMN; 1> if in RRC_IDLE/RRC_INACTIVE or in RRC_CONNECTED while T311 is running; and/or 1> if a UE is a category 0 UE; and/or 1> if category0Allowed is not included in SystemInformationBlockType1: 2> consider a cell as barred; 1> if in RRC_CONNECTED while T311 is not running, and/or a UE supports multi-band cells as defined by bit 31 in featureGroupIndicators: 2> disregard a freqBandIndicator and/or multiBandInfoList, if received, while in RRC_CONNECTED; 2> forward a cellIdentity to upper layers; 2> forward a trackingAreaCode to upper layers; 1> else: 2> if a frequency band indicated in a freqBandIndicator is part of frequency bands supported by a UE and it is not a downlink band; and/or 2> if a UE supports multiBandInfoList, and/or if one or more of frequency bands indicated in a multiBandInfoList are part of frequency bands supported by a UE and they are not downlink bands: 3> forward a cellIdentity to upper layers; 3> forward a trackingAreaCode to upper layers; 3> forward an ims-EmergencySupport to upper layers, if present; 3> forward eCallOverIMS-Support to upper layers, if present; 3> if, for a frequency band selected by a UE (from freqBandIndicator or multiBandInfoList), a freqBandInfo and/or a multiBandInfoList-v10j0 is present and a UE capable of multiNS-Pmax supports at least one additionalSpectrumEmission in a NS-PmaxList within a freqBandInfo or multiBandInfoList-v10j0: 4> apply a first listed additionalSpectrumEmission which it may support among values included in NS-PmaxList within freqBandInfo or multiBandInfolist-v10j0; 4> if an additionalPmax is present in a same entry of a selected additionalSpectrumEmission within NS-PmaxList: 5> apply an additionalPmax; 4> else: 5> apply a p-Max; 3> else: 4> apply a additionalSpectrumEmission in SystemInformationBlockType2 and/or a p-Max; 2> else: 3> consider a cell as barred; and/or 3> perform barring as if intraFreqReselection is set to notAllowed, and/or as if a csg-Indication is set to FALSE.

In an example, upon receiving a SystemInformationBlockType1-NB, a UE may: 1> if a frequency band indicated in a freqBandIndicator is part of frequency bands supported by a UE; and/or 1> if one or more of frequency bands indicated in a multiBandInfoList are part of frequency bands supported by a UE: 2> forward a cellIdentity to upper layers; 2> forward a trackingAreaCode to upper layers; 2> if attachWithoutPDN-Connectivity is received for a selected PLMN: 3> forward an attachWithoutPDN-Connectivity to upper layers; 2> else 3> indicate to upper layers that attachWithoutPDN-Connectivity is not present; 2> if, for a frequency band selected by a UE (from freqBandIndicator or multiBandInfoList), a freqBandInfo is present and a UE capable of multiNS-Pmax supports at least one additionalSpectrumEmission in a NS-PmaxList within a freqBandInfo: 3> apply a first listed additionalSpectrumEmission which it may support among values included in NS-PmaxList within freqBandInfo; 3> if an additionalPmax is present in a same entry of a selected additionalSpectrumEmission within NS-PmaxList: 4> apply an additionalPmax; 3> else: 4> apply a p-Max; 2> else: 3> apply an additionalSpectrumEmission in SystemInformationBlockType2-NB and a p-Max; 1> else: 2> consider a cell as barred; and/or 2> perform barring as if intraFreqReselection is set to notAllowed. In an example, UE requirements related to contents of SystemInformationBlockType1-MBMS may not apply other than those specified elsewhere e.g. within procedures using concerned system information, and/or within corresponding field descriptions.

In an example, upon reception of SystemInformation messages, UE requirements related to contents of SystemInformation messages may not apply other than those specified elsewhere e.g. within procedures using concerned system information, and/or within corresponding field descriptions.

In an example, upon receiving SystemInformationBlockType2, a UE may: 1> apply a configuration included in a radioResourceConfigCommon; 1> if upper layers indicate that a (UE specific) paging cycle is configured: 2> apply a shortest of a (UE specific) paging cycle and a defaultPagingCycle included in a radioResourceConfigCommon; 1> if a mbsfn-SubframeConfigList is included: 2> consider that DL assignments may occur in a MBSFN subframes indicated in a mbsfn-SubframeConfigList; 1> apply a specified PCCH configuration; 1> not apply a timeAlignmentTimer-Common; 1> if in RRC_CONNECTED and UE is configured with RLF timers and constants values received within rlf-TimersAndConstants: 2> not update its values of timers and constants in ue-TimersAndConstants except for a value of timer T300; 1> if in RRC_CONNECTED while T311 is not running; and/or a UE supports multi-band cells as defined by bit 31 in featureGroupIndicators or multipleNS-Pmax: 2> disregard an additionalSpectrumEmission and/or ul-CarrierFreq, if received, while in RRC_CONNECTED; 1> if attachWithoutPDN-Connectivity is received for a selected PLMN: 2> forward attachWithoutPDN-Connectivity to upper layers; 1> else: 2> indicate to upper layers that attachWithoutPDN-Connectivity is not present; 1> if cp-CIoT-EPS-Optimization is received for a selected PLMN: 2> forward cp-CIoT-EPS-Optimization to upper layers; 1> else: 2> indicate to upper layers that cp-CIoT-EPS-Optimization is not present; 1> if up-CIoT-EPS-Optimization is received for a selected PLMN: 2> forward up-CIoT-EPS-Optimization to upper layers; 1> else: 2> indicate to upper layers that up-CIoT-EPS-Optimization is not present; 1> to upper layers either forward upperLayerIndication, if present for a selected PLMN, or otherwise indicate absence of this field; Upon receiving SystemInformationBlockType2-NB, a UE may: 1> apply a configuration included in a radioResourceConfigCommon; 1> apply a defaultPagingCycle included in a radioResourceConfigCommon; 1> if SystemInformationBlockType22-NB is scheduled: 2> read and act on information sent in SystemInformationBlockType22-NB; 1> apply a specified PCCH configuration. 1> if in RRC_CONNECTED and UE is configured with RLF timers and constants values received within rlf-TimersAndConstants: 2> not update its values of timers and constants in ue-TimersAndConstants except for a value of timer T300;

In an example, upon receiving SystemInformationBlockType3, a UE may: 1> if in RRC_IDLE/RRC_INACTIVE, a redistributionServingInfo is included and a UE is redistribution capable: 2> perform E-UTRAN inter-frequency redistribution procedure; 1> if in RRC_IDLE/RRC_INACTIVE, or in RRC_CONNECTED while T311 is running: 2> if, for a frequency band selected by a UE to represent serving cell's carrier frequency, a freqBandInfo or a multiBandInfoList-v10j0 is present in SystemInformationBlockType3 and/or a UE capable of multiNS-Pmax supports at least one additionalSpectrumEmission in a NS-PmaxList within a freqBandInfo or multiBandInfoList-v10j0: 3> apply a first listed additionalSpectrumEmission which it may support among values included in NS-PmaxList within freqBandInfo or multiBandInfoList-v10j0; 3> if an additionalPmax is present in a same entry of a selected additionalSpectrumEmission within NS-PmaxList: 4> apply an additionalPmax; 3> else: 4> apply a p-Max; 2> else: 3> apply a p-Max;

In an example, upon receiving SystemInformationBlockType3-NB, a UE may: 1> if in RRC_IDLE, or in RRC_CONNECTED while T311 is running: 2> if, for a frequency band selected by a UE to represent a serving cell's carrier frequency, a freqBandInfo or a multiBandInfoList is present in SystemInformationBlockType3-NB and/or a UE capable of multiNS-Pmax supports at least one additionalSpectrumEmission in a NS-PmaxList within a freqBandInfo or multiBandInfoList: 3> apply a first listed additionalSpectrumEmission which it may support among values included in NS-PmaxList within freqBandInfo or multiBandInfoList; 3> if an additionalPmax is present in a same entry of a selected additionalSpectrumEmission within NS-PmaxList: 4> apply an additionalPmax; 3> else: 4> apply a p-Max; 2> else: 3> apply a p-Max.

In an example, upon reception of SystemInformationBlockType4, UE requirements related to contents of this SystemInformationBlock (SystemInformationBlockType4 or SystemInformationBlockType4-NB) may not apply other than those specified elsewhere e.g. within procedures using concerned system information, and/or within corresponding field descriptions.

In an example, upon receiving SystemInformationBlockType5, a UE may: 1> if in RRC_IDLE/RRC_INACTIVE, a redistributionInterFreqInfo is included and a UE is redistribution capable: 2> perform E-UTRAN inter-frequency redistribution procedure; 1> if in RRC_IDLE/RRC_INACTIVE, or in RRC_CONNECTED while T311 is running: 2> if a frequency band selected by a UE to represent a non-serving E UTRA carrier frequency is not a downlink band: 3> if, for a selected frequency band, a freqBandInfo or a multiBandInfoList-v10j0 is present and/or a UE capable of multiNS-Pmax supports at least one additionalSpectrumEmission in a NS-PmaxList within freqBandInfo or multiBandInfoList-v10j0: 4> apply a first listed additionalSpectrumEmission which it may support among values included in NS-PmaxList within freqBandInfo or multiBandInfoList-v10j0; 4> if an additionalPmax is present in a same entry of a selected additionalSpectrumEmission within NS-PmaxList: 5> apply an additionalPmax; 4> else: 5> apply a p-Max; 3> else: 4> apply a p-Max;

In an example, upon receiving SystemInformationBlockType5-NB, a UE may: 1> if in RRC_IDLE/RRC_INACTIVE, or in RRC_CONNECTED while T311 is running: 2> if, for a frequency band selected by a UE (from multiBandInfoList) to represent a non-serving NB-IoT carrier frequency, a freqBandInfo is present and/or a UE capable of multiNS-Pmax supports at least one additionalSpectrumEmission in a NS-PmaxList within a freqBandInfo: 3> apply a first listed additionalSpectrumEmission which it may support among values included in NS-PmaxList within freqBandInfo; 3> if an additionalPmax is present in a same entry of a selected additionalSpectrumEmission within NS-PmaxList: 4> apply an additionalPmax; 3> else: 4> apply a p-Max; 2> else: 3> apply a p-Max;

In an example, upon reception of SystemInformationBlockType6, UE requirements related to contents of this SystemInformationBlock may not apply other than those specified elsewhere e.g. within procedures using concerned system information, and/or within corresponding field descriptions.

In an example, UE requirements related to contents of this SystemInformationBlock may not apply other than those specified elsewhere e.g. within procedures using concerned system information, and/or within corresponding field descriptions.

In an example, upon receiving SystemInformationBlockType8, a UE may: 1> if sib8-PerPLMN-List is included and a UE is capable of network sharing for CDMA2000: 2> apply CDMA2000 parameters below corresponding to an RPLMN; 1> if a systemTimeInfo is included: 2> forward a systemTimeInfo to CDMA2000 upper layers; 1> if a UE is in RRC_IDLE and if searchWindowSize is included: 2> forward a searchWindowSize to CDMA2000 upper layers; 1> if parametersHRPD is included: 2> forward a preRegistrationInfoHRPD to CDMA2000 upper layers if a UE has not received a preRegistrationInfoHRPD within an RRC-ConnectionReconfiguration message after entering this cell; 2> if a cellReselectionParametersHRPD is included: 3> forward a neighCellList to a CDMA2000 upper layers; 1> if a parameters1xRTT is included: 2> if a csfb-RegistrationParam1xRTT is included: 3> forward a csfb-RegistrationParam1xRTT to CDMA2000 upper layers which may use this information to determine if a CS registration/re-registration towards CDMA2000 1xRTT in a EUTRA cell is required; 2> else: 3> indicate to CDMA2000 upper layers that CSFB Registration to CDMA2000 1xRTT may not be allowed; 2> if a longCodeState1xRTT is included: 3> forward a longCodeState1xRTT to CDMA2000 upper layers; 2> if a cellReselectionParameters1xRTT is included: 3> forward a neighCellList to CDMA2000 upper layers; 2> if csfb-SupportForDualRxUEs is included: 3> forward csfb-SupportForDualRxUEs to CDMA2000 upper layers; 2> else: 3> forward csfb-SupportForDualRxUEs, with its value set to FALSE, to CDMA2000 upper layers; 2> if ac-BarringConfig1xRTT is included: 3> forward ac-BarringConfig1xRTT to CDMA2000 upper layers; 2> if a csfb-DualRxTxSupport is included: 3> forward csfb-DualRxTxSupport to CDMA2000 upper layers; 2> else: 3> forward csfb-DualRxTxSupport, with its value set to FALSE, to CDMA2000 upper layers.

In an example, upon receiving SystemInformationBlockType9, a UE may: 1> if hnb-Name is included, forward a hnb-Name to upper layers. In an example, upon receiving SystemInformationBlockType10, a UE may: 1> forward a received warningType, messageIdentifier and serialNumber to upper layers. In an example, upon receiving SystemInformationBlockType11, a UE may: 1> if there is no current value for messageIdentifier and serialNumber for SystemInformationBlockType11; and/or 1> if either a received value of messageIdentifier or of serialNumber or of both are different from current values of messageIdentifier and serialNumber for SystemInformationBlockType11: 2> use received values of messageIdentifier and serialNumber for SystemInformationBlockType11 as current values of messageIdentifier and serialNumber for SystemInformationBlockType11; 2> discard previously buffered warningMessageSegment; 2> if segments of a warning message have been received: 3> assemble a warning message from a received warningMessageSegment; 3> forward a received warning message, messageIdentifier, serialNumber and dataCodingScheme to upper layers; 3> stop reception of SystemInformationBlockType11; 3> discard current values of messageIdentifier and serialNumber for SystemInformationBlockType11; 2> else: 3> store a received warningMessageSegment; 3> continue reception of SystemInformationBlockType11; 1> else if segments of a warning message have been received: 2> assemble a warning message from a received warningMessageSegment; 2> forward a received complete warning message, messageIdentifier, serialNumber and/or dataCodingScheme to upper layers; 2> stop reception of SystemInformationBlockType11; 2> discard current values of messageIdentifier and/or serialNumber for SystemInformationBlockType11; 1> else: 2> store a received warningMessageSegment; 2> continue reception of SystemInformationBlockType11; a UE may discard stored warningMessageSegment and/or a current value of messageIdentifier and/or serialNumber for SystemInformationBlockType11 if a complete warning message has not been assembled within a period of 3 hours.

In an example, upon receiving SystemInformationBlockType12, a UE may: 1> if a SystemInformationBlockType12 contains a complete warning message: 2> forward a received warning message, messageIdentifier, serialNumber and dataCodingScheme to upper layers; 2> continue reception of SystemInformationBlockType12; 1> else: 2> if received values of messageIdentifier and serialNumber are a same (value is a same) as a pair for which a warning message may be currently being assembled: 3> store a received warningMessageSegment; 3> if segments of a warning message have been received: 4> assemble a warning message from a received warningMessageSegment; 4> forward a received warning message, messageIdentifier, serialNumber and/or dataCodingScheme to upper layers; 4> stop assembling a warning message for this messageIdentifier and/or serialNumber and/or delete stored information held for it; 3> continue reception of SystemInformationBlockType12; 2> else if received values of messageIdentifier and/or serialNumber may not be the same as at least one of pairs for which a warning message may be currently being assembled: 3> start assembling a warning message for this messageIdentifier and/or serialNumber pair; 3> store a received warningMessageSegment; 3> continue reception of SystemInformationBlockType12; a UE may discard warningMessageSegment and/or associated values of messageIdentifier and/or serialNumber for SystemInformationBlockType12 if a complete warning message has not been assembled within a period of 3 hours. The number of warning messages that a UE may re-assemble simultaneously may be a function of UE implementation.

In an example, upon reception of SystemInformationBlockType13, UE requirements related to contents of this SystemInformationBlock may not apply other than those specified elsewhere e.g. within procedures using concerned system information, and/or within corresponding field descriptions.

In an example, upon reception of SystemInformationBlockType14, UE requirements related to contents of this SystemInformationBlock (SystemInformationBlockType14 or SystemInformationBlockType14-NB) may not apply other than those specified elsewhere e.g. within procedures using concerned system information, and/or within corresponding field descriptions.

In an example, upon reception of SystemInformationBlockType15, UE requirements related to contents of this SystemInformationBlock (SystemInformationBlockType15 or SystemInformationBlockType15-NB) may not apply other than those specified elsewhere e.g. within procedures using concerned system information, and/or within corresponding field descriptions.

In an example, upon reception of SystemInformationBlockType16, UE requirements related to contents of this SystemInformationBlock (SystemInformationBlockType16 or SystemInformationBlockType16-NB) may not apply other than those specified elsewhere e.g. within procedures using concerned system information, and/or within corresponding field descriptions.

In an example, upon receiving SystemInformationBlockType17, a UE may: 1> if wlan-OffloadConfigCommon corresponding to a RPLMN is included: 2> if a UE is not configured with rclwi-Configuration with command set to steerToWLAN: 3> apply a wlan-Id-List corresponding to a RPLMN; 2> if not configured with a wlan-OffloadConfigDedicated: 3> apply a wlan-OffloadConfigCommon corresponding to a RPLMN;

In an example, upon receiving SystemInformationBlockType18, a UE may: 1> if SystemInformationBlockType18 message includes a commConfig: 2> if configured to receive sidelink communication: 3> from a next SC period, as defined by sc-Period, use a resource pool indicated by commRxPool for sidelink communication monitoring; 2> if configured to transmit sidelink communication: 3> from a next SC period, as defined by sc-Period, use a resource pool indicated by commTxPoolNormalCommon, commTxPoolNormalCommonExt or by commTxPoolExceptional for sidelink communication transmission.

In an example, upon receiving SystemInformationBlockType19, a UE may: 1> if SystemInformationBlockType19 message includes a discConfig or discConfigPS: 2> from a next discovery period, as defined by discPeriod, use resources indicated by discRxPool, discRxResourcesInterFreq or discRxPoolPS for sidelink discovery monitoring; 2> if SystemInformationBlockType19 message includes a discTxPoolCommon or discTxPoolPSCommon; and a UE is in RRC_IDLE/RRC_INACTIVE: 3> from a next discovery period, as defined by discPeriod, use resources indicated by discTxPoolCommon or discTxPoolPSCommon for sidelink discovery announcement; 2> if a SystemInformationBlockType19 message includes a discTxPowerInfo: 3> use a power information included in discTxPowerInfo for sidelink discovery transmission on a serving frequency; 1> if SystemInformationBlockType19 message includes a discConfigRelay: 2> if a SystemInformationBlockType19 message includes a txPowerInfo: 3> use power information included in txPowerInfo for sidelink discovery transmission on a corresponding non-serving frequency.

In an example, upon reception of SystemInformationBlockType20, UE requirements related to contents of this SystemInformationBlock (SystemInformationBlockType20 or SystemInformationBlockType20-NB) may not apply other than those specified elsewhere e.g. within procedures using concerned system information, and/or within corresponding field descriptions.

In an example, upon receiving SystemInformationBlockType21, a UE may: 1> if SystemInformationBlockType21 message includes sl-V2X-ConfigCommon: 2> if configured to receive V2X sidelink communication: 3> use a resource pool indicated by v2x-CommRxPool in sl-V2X-ConfigCommon for V2X sidelink communication monitoring; 2> if configured to transmit V2X sidelink communication: 3> use a resource pool indicated by v2x-CommTxPoolNormalCommon, p2x-CommTxPoolNormalCommon, v2x-CommTxPoolNormal, p2x-CommTxPoolNormal or by v2x-CommTxPoolExceptional for V2X sidelink communication transmission; 3> perform CBR measurement on a transmission resource pool(s) indicated by v2x-CommTxPoolNormalCommon, v2x-CommTxPoolNormal and v2x-CommTxPoolExceptional for V2X sidelink communication transmission.

In an example, upon reception of SystemInformationBlockType22-NB, UE requirements related to contents of this SystemInformationBlock may not apply other than those specified elsewhere e.g. within procedures using concerned system information, and/or within corresponding field descriptions.

In an example, when acquiring an SI message, a UE may: 1> determine a start of a SI-window for a concerned SI message as follows: 2> for a concerned SI message, determine a number n which corresponds to an order of entry in a list of SI messages configured by schedulingInfoList in SystemInformationBlockType1; 2> determine a integer value x=(n−1)*w, where w may be a si-WindowLength; 2> a SI-window may start at a subframe # a, where a=x mod 10, in a radio frame for which SFN mod T=FLOOR(x/10), where T may be a si-Periodicity of a concerned SI message; (E-UTRAN (e.g. NR, base station) may configure an SI-window of 1 ms if SIs are scheduled before subframe #5 in radio frames for which SFN mod 2=0) 1> receive DL-SCH using a SI-RNTI from a start of a SI-window and/or continue until an end of a SI-window whose absolute length in time may be given by si-WindowLength, and/or until a SI message was received, excluding following subframes: 2> subframe #5 in radio frames for which SFN mod 2=0; 2> MBSFN subframes; 2> uplink subframes in TDD; 1> if a SI message was not received by an end of a SI-window, repeat reception at a next SI-window occasion for a concerned SI message.

In an example, when acquiring an SI message, a BL UE or UE in CE or NB-IoT UE may: 1> determine a start of a SI-window for a concerned SI message as follows: 2> for a concerned SI message, determine the number n which may correspond to an order of entry in a list of SI messages configured by schedulingInfoList in SystemInformationBlockType1-BR (or SystemInformationBlockType1-NB in NB-IoT); 2> determine an integer value x=(n−1)*w, where w may be a si-WindowLength-BR (or si-WindowLength in NB-IoT); 2> if a UE is a NB-IoT UE: 3> a SI-window starts at a subframe #0 in a radio frame for which (H-SFN*1024+SFN) mod T=FLOOR(x/10)+Offset, where T may be a si-Periodicity of a concerned SI message and, Offset may be an offset of a start of a SI-Window (si-RadioFrameOffset); 2> else: 3> a SI-window starts at a subframe #0 in a radio frame for which SFN mod T=FLOOR(x/10), where T may be a si-Periodicity of a concerned SI message; 1> if a UE is a NB-IoT UE: 2> receive and accumulate SI message transmissions on DL-SCH from a start of a SI-window and/or continue until an end of a SI-window whose absolute length in time may be given by si-WindowLength, starting from radio frames as provided in si-RepetitionPattern and/or in subframes as provided in downlinkBitmap, or until successful decoding of an accumulated SI message transmissions excluding subframes used for transmission of NPSS, NSSS, MasterInformationBlock-NB and/or SystemInformationBlockType1-NB. If there are not enough subframes for one SI message transmission in radio frames as provided in si-RepetitionPattern, a UE may continue to receive a SI message transmission in radio frames following a radio frame indicated in si-RepetitionPattern; 1> else: 2> receive and/or accumulate SI message transmissions on DL-SCH on narrowband provided by si-Narrowband, from a start of a SI-window and/or continue until an end of a SI-window whose absolute length in time may be given by si-WindowLength-BR, in radio frames as provided in si-RepetitionPattern and subframes as provided in fdd-DownlinkOrTddSubframeBitmapBR in bandwidthReducedAccessRelatedInfo, or until successful decoding of an accumulated SI message transmissions; 1> if a SI message was not possible to decode from accumulated SI message transmissions by an end of a SI-window, continue reception and/or accumulation of SI message transmissions on DL-SCH in a next SI-window occasion for a concerned SI message.

In an example, when acquiring an SI message from MBMS-dedicated cell, a UE may: 1> determine a start of a SI-window for a concerned SI message as follows: 2> for a concerned SI message, determine a number n which may correspond to an order of entry in a list of SI messages configured by schedulingInfoList in SystemInformation-BlockType1-MBMS; 2> determine an integer value x=(n−1)*w, where w is a si-WindowLength; 2> a SI-window may start at a subframe # a, where a=x mod 10, in a radio frame for which SFN mod T=FLOOR(x/10), where T may be a si-Periodicity of a concerned SI message; 1> receive DL-SCH using SI-RNTI with value from a start of a SI-window and/or continue until an end of a SI-window whose absolute length in time may be given by si-WindowLength, or until a SI message was received, excluding following subframes: 2> MBSFN subframes; 1> if a SI message was not received by an end of a SI-window, repeat reception at a next SI-window occasion for a concerned SI message.

Figure 21:
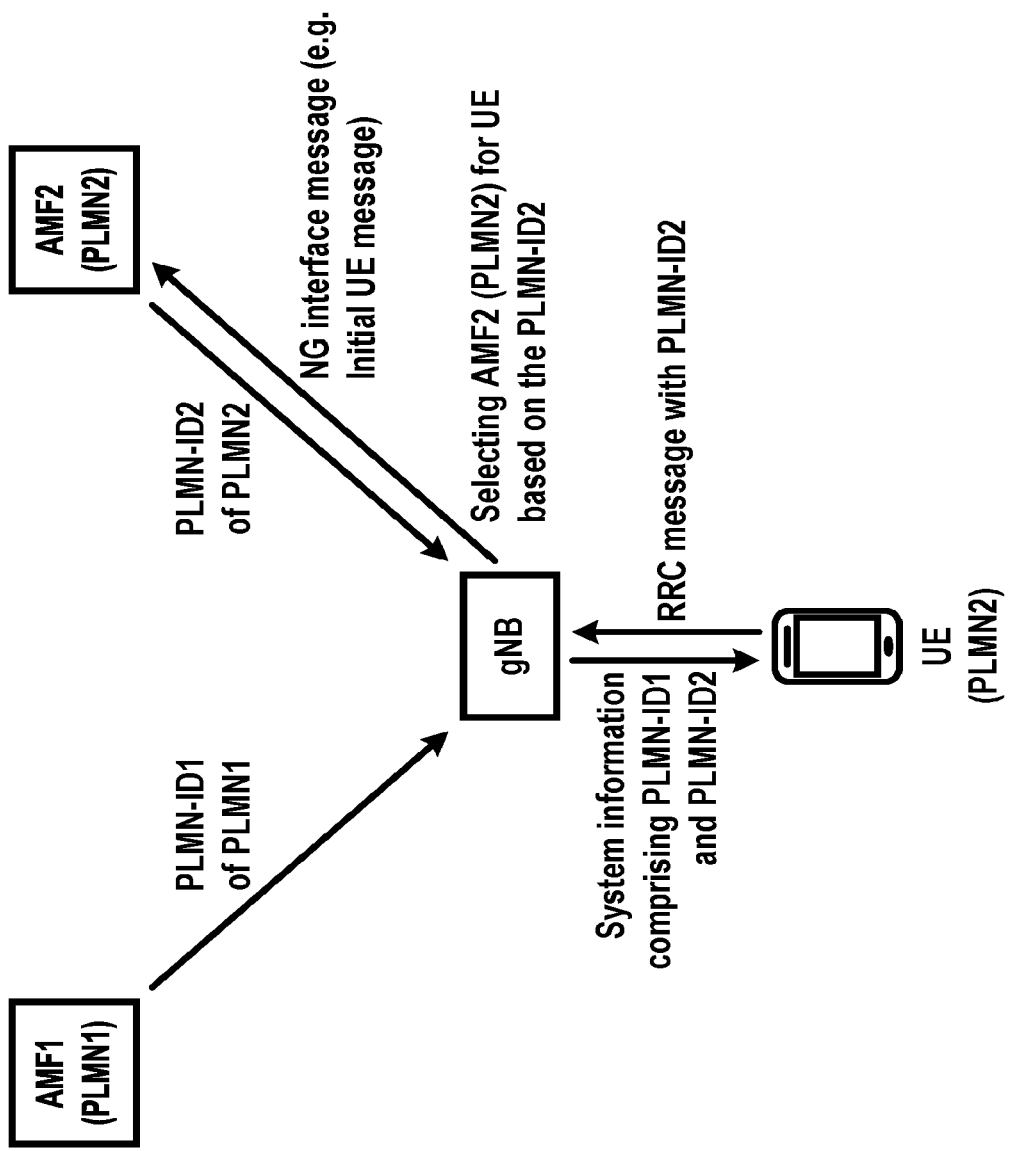
FIG. 21 is an example diagram illustrating a legacy base station sharing network architecture.
Figure 22:
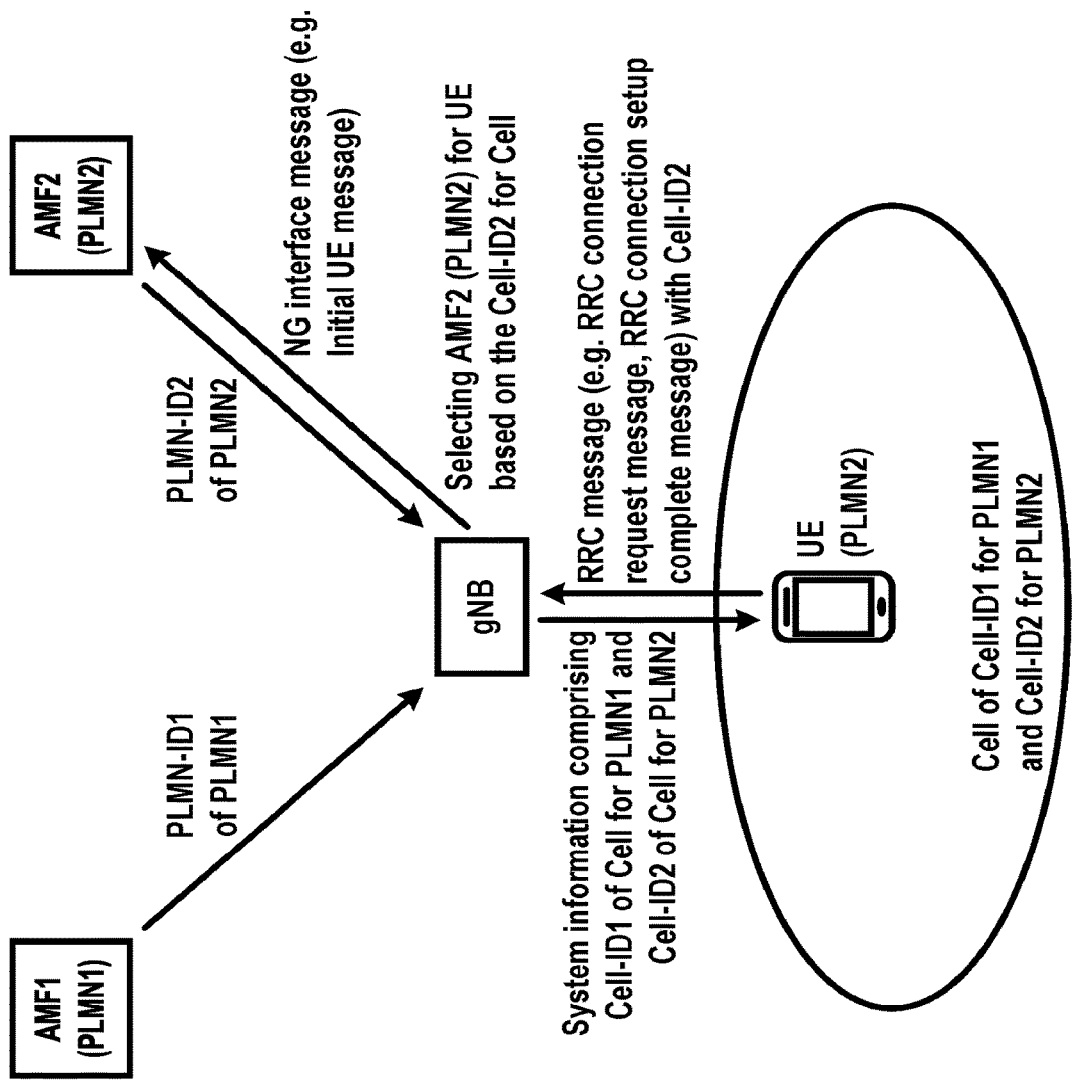
FIG. 22 is an example diagram of an aspect of an embodiment of the present disclosure.

In existing wireless technologies as shown in FIG. 21, a base station may be shared by multiple network operators (e.g. multiple PLMNs). When a base station is shared by multiple operators, protocol layers of the base station (e.g. Physical, MAC, RLC, PDCP, RRC, SDAP) are shared by multiple operators sharing the base station. In example FIG. 21, a gNB is shared by PLMN1 and PLMN2. The gNB communicates with AMF in 5G core network of PLMN1 and AMF in 5G core of PLMN2. The gNB uses the radio protocols layers for transmission of packets and control signaling of both PLMN1 and PLMN2.

For example, when a base station (e.g. gNB, eNB, BS) is utilized by multiple network operators (e.g. multiple PLMNs), radio resource control parameters of serving cells and/or wireless devices (e.g. UEs) may be commonly configured for the multiple operators. In an example, when a base station is utilized by multiple operators, the multiple operators may configure common cell radio resource control parameters for the base station. In existing technologies, when a base station is shared by multiple operators, PHY/MAC/RLC/PDCP/RRC protocol layers are shared by multiple operators. In existing network sharing technologies, common configuration parameters and decision-making policies of serving cells for multiple operators may increase inefficient parameter settings and inappropriate decisions when serving wireless devices of different operators, which may have different network control policies. Implementation of existing parameter configuration mechanism of a base station shared by multiple operators may not be efficient. The existing network sharing technologies (e.g. base station sharing) may decrease resource utilization and mobility performance of wireless devices associated with different operators. The existing network sharing technologies may increase call dropping rate and packet transmission delay when multiple operators share a base station. There is a need for development of enhanced base station sharing architecture and processes to enhance network performance when radio access network is shared.

Example embodiments provide enhanced network architecture for network sharing by implementing an enhanced base station sharing architecture and call/signaling processes. In an example embodiment, a base station central unit (e.g. comprising RRC, PDCP, and/or SDAP layers) may be a non-shared node controlled by a network operator, and a base station distributed unit (e.g. comprising PHY, MAC, and/or RLC layers) may be a shared node shared by multiple network operators. Example embodiments implement decision making processes of a base station when multiple network operators share a base station distributed unit while implementing their own non-shared base station central units. Example embodiment introduces a new network architecture comprising a shared base station distributed unit communicating with one or more non-shared base station central unit. This new architecture introduces new challenges requiring implementation of enhanced call/signaling processes. The new network architecture and enhanced call/signaling processes improve communication reliability and configuration flexibility of the wireless network. Example embodiments enable multiple operators to apply separate parameters configured based on their separate policies, by supporting different base station central units determining their configuration parameters separately for a shared base station distributed unit. Example embodiments may reduce connection failure rate and/or radio quality degradation issues by introducing a shared base station distributed unit and separate non-shared base station central units for multiple operators. Example embodiments may improve communication reliability by supporting base station distributed unit sharing for multiple base station central units of multiple operators.

Example embodiments provide enhanced network architecture for network sharing, for example, base station sharing architecture and processes. In an example embodiment, a base station central unit comprising RRC, PDCP, and/or SDAP may be shared by a first set of one or more network operators, and a base station distributed unit may be a shared node shared by a second set of one or more network operators different from the first set of network operators. Implementation of such a complex network architecture requires implementation of an enhanced call/signaling flow. Example embodiment implement enhanced call/signaling processes to enable this now network architecture.

A radio access network may be shared (e.g. utilized, used) by multiple operators (e.g. multiple PLMNs, multiple service operators, and/or the like). In an example, when a functional split of a gNB (e.g. base station, eNB, RNC, and/or the like) onto multiple units (e.g. at least one base station central unit (e.g. gNB-CU) and/or at least one base station distributed unit (e.g. gNB-DU)) is configured, one of split units (e.g. at least one of gNB-CUs and/or gNB-DUs) may be shared by multiple operators. In an example, when a gNB-DU is connected to multiple gNB-CUs (e.g. base station central unit; a first gNB-CU and a second gNB-CU), the gNB-DU may select a gNB-CU for a wireless device accessing the gNB-DU and/or may select a gNB-CU based on load status of gNB-CUs. In existing wireless technologies, a wireless device may transmit an RRC message. A gNB-DU receiving an RRC message may forward the RRC message to a gNB-CU that may be inappropriate to the wireless device (e.g. gNB-CU that may not support the wireless device). Implementation of existing RRC message forwarding mechanisms of a gNB-DU may not be efficient. The existing technology may increase connection latency and packet transmission delay of wireless devices, and/or may decrease access reliability and mobility performance of wireless devices. The existing technology may increase call dropping rate and/or packet transmission delay when multiple gNB-CUs (e.g. multiple gNB-CUs operated by a different operator each) are connected to a gNB-DU (e.g. shared gNB-DU).

Example embodiments enhance network node selection mechanism of a gNB-DU when multiple gNB-CUs are connected to a gNB-DU (e.g. when multiple gNB-CUs share a gNB-DU, when multiple operators share a base station and/or serving cells, when multiple operators share a gNB-DU, and/or the like). Example embodiments enhance a gNB-DU to support multiple gNB-CUs (e.g. multiple service operators, multiple operators, multiple PLMNs) by providing gNB-CU selection mechanism of a gNB-DU for a wireless device. Example embodiments enhance a wireless device to provide gNB-CU information (e.g. gNB-CU identifier, gNB-identifier, gNB-CU address, gNB address, tracking area identifier, registration area identifier, and/or the like) via an uplink message (e.g. RRC message) for gNB-CU selection of a gNB-DU. Example embodiments enhance a wireless device to provide service operator information (e.g. PLMN identifier, operator identifier, service operator identifier, cell identifier for a service operator, and/or the like) via an uplink message (e.g. RRC message) for gNB-CU selection of a gNB-DU. Example embodiments enhance a wireless device to provide a cell identifier for a service operator (e.g. when multiple cell identifiers are configured for a cell shared by multiple service operators) via an uplink message (e.g. RRC message) for core-node (e.g. AMF) selection of a gNB and/or for gNB-CU selection of a gNB-DU.

Example embodiments may decrease connection latency and packet transmission delay of wireless devices, and/or may increase access reliability and mobility performance of wireless devices by introducing gNB-CU (or core node, AMF) selection mechanism of a gNB-DU (or base station, gNB) for a wireless device. Example embodiments may improve access latency and communication reliability by supporting gNB-CU selection mechanism of a gNB-DU for a wireless device when a gNB-DU connected to multiple gNB-CUs (e.g. of multiple service operators). Example embodiments may improve access latency and communication reliability by supporting core node (AMF) selection mechanism of a base station (gNB) for a wireless device when a gNB connected to multiple AMFs (e.g. of multiple service operators).

In an example embodiment, a gNB may be interpreted as an eNB, an RNC, a home eNB, a home gNB, and/or any type of base stations or access points. In an example embodiment, a gNB-CU may be interpreted as a centralized base station (e.g. eNB-CU, RNC, access point central unit, and/or the like). In an example embodiment, a gNB-DU may be interpreted as a distributed base station (e.g. eNB-DU, RRH, transmission and reception point (TRP), access point distributed unit, and/or the like).

Figure 23:
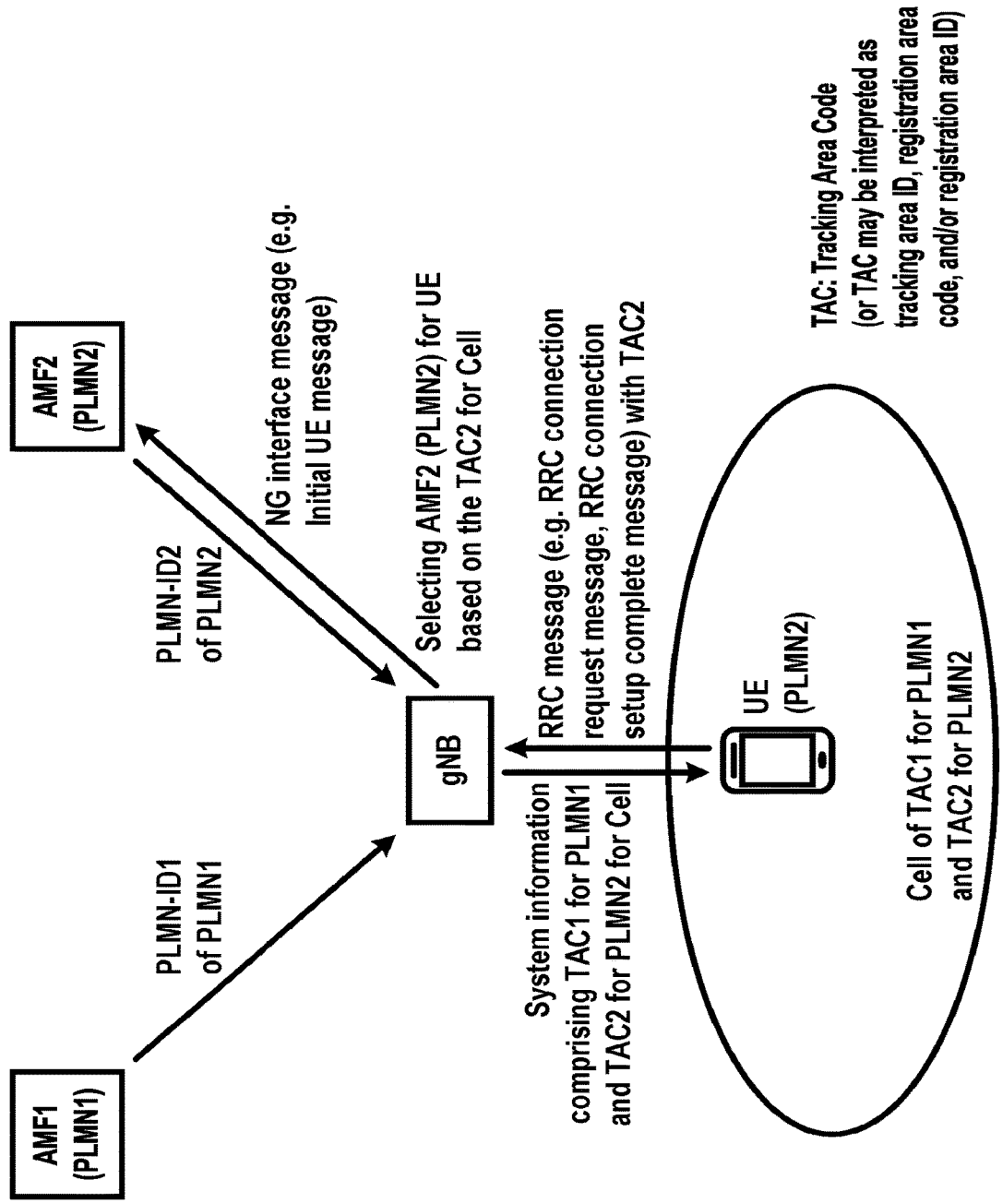
FIG. 23 is an example diagram of an aspect of an embodiment of the present disclosure.
Figure 24:
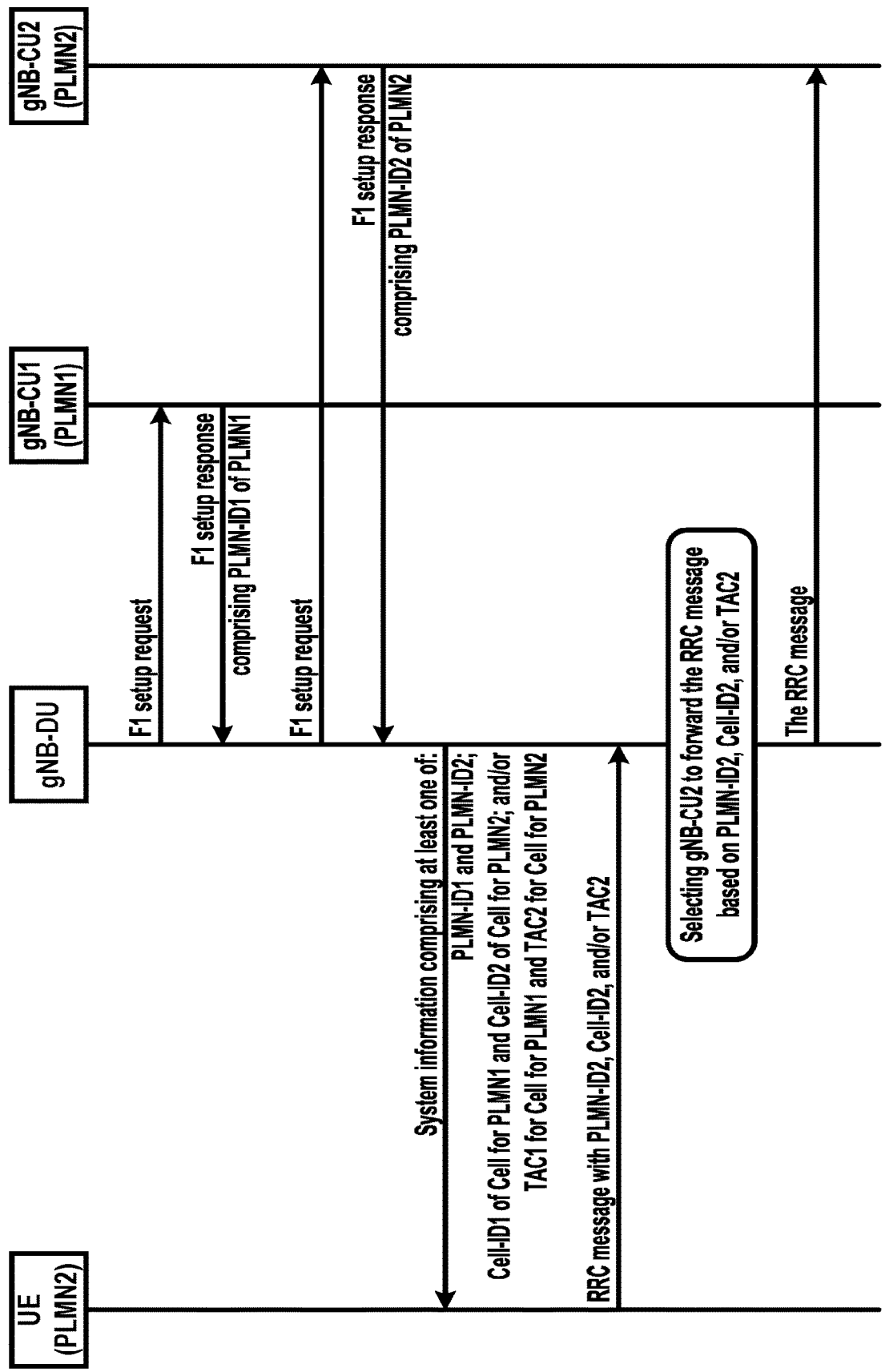
FIG. 24 is an example diagram of an aspect of an embodiment of the present disclosure.
Figure 25:
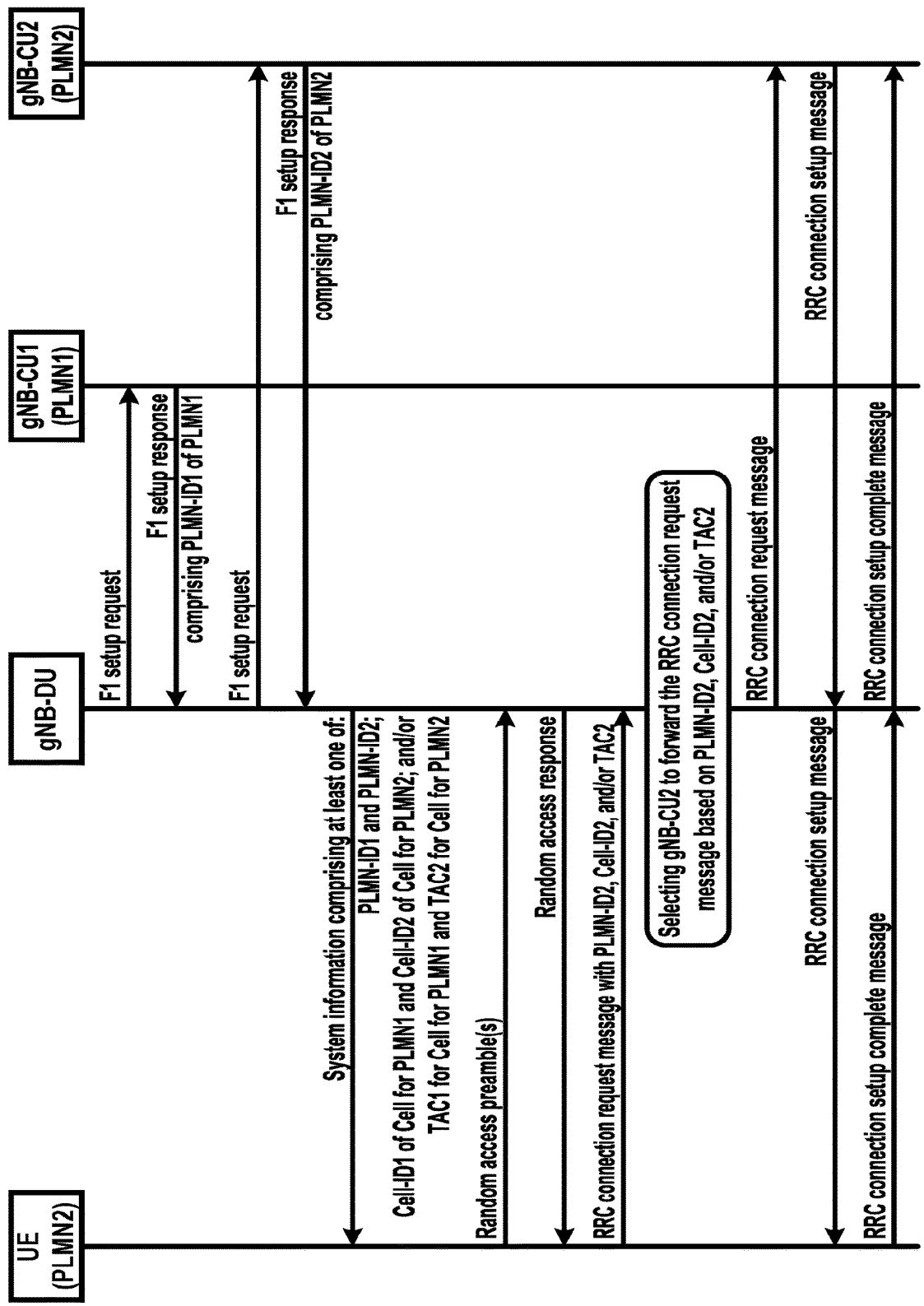
FIG. 25 is an example diagram of an aspect of an embodiment of the present disclosure.
Figure 26:
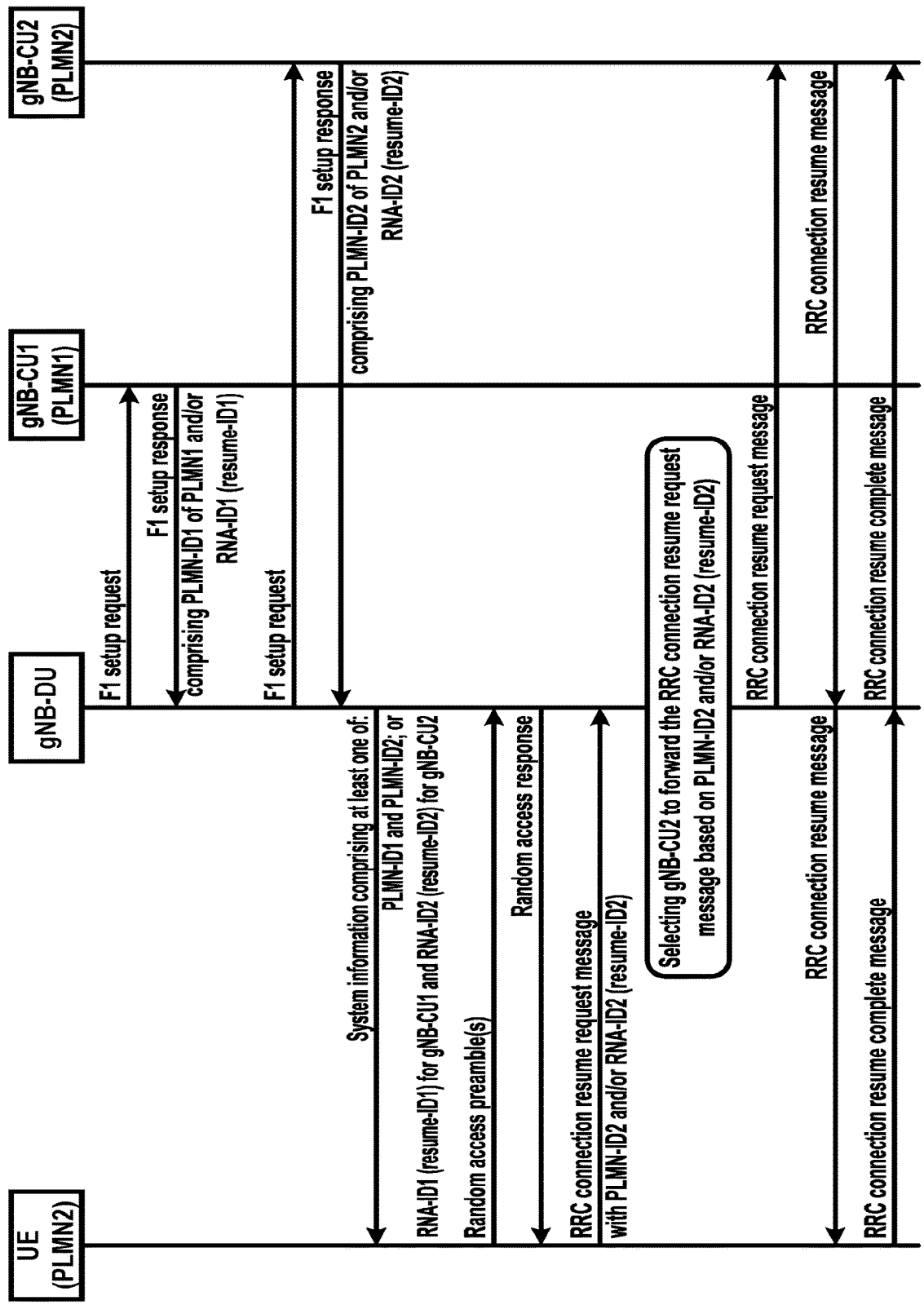
FIG. 26 is an example diagram of an aspect of an embodiment of the present disclosure.
Figure 27:
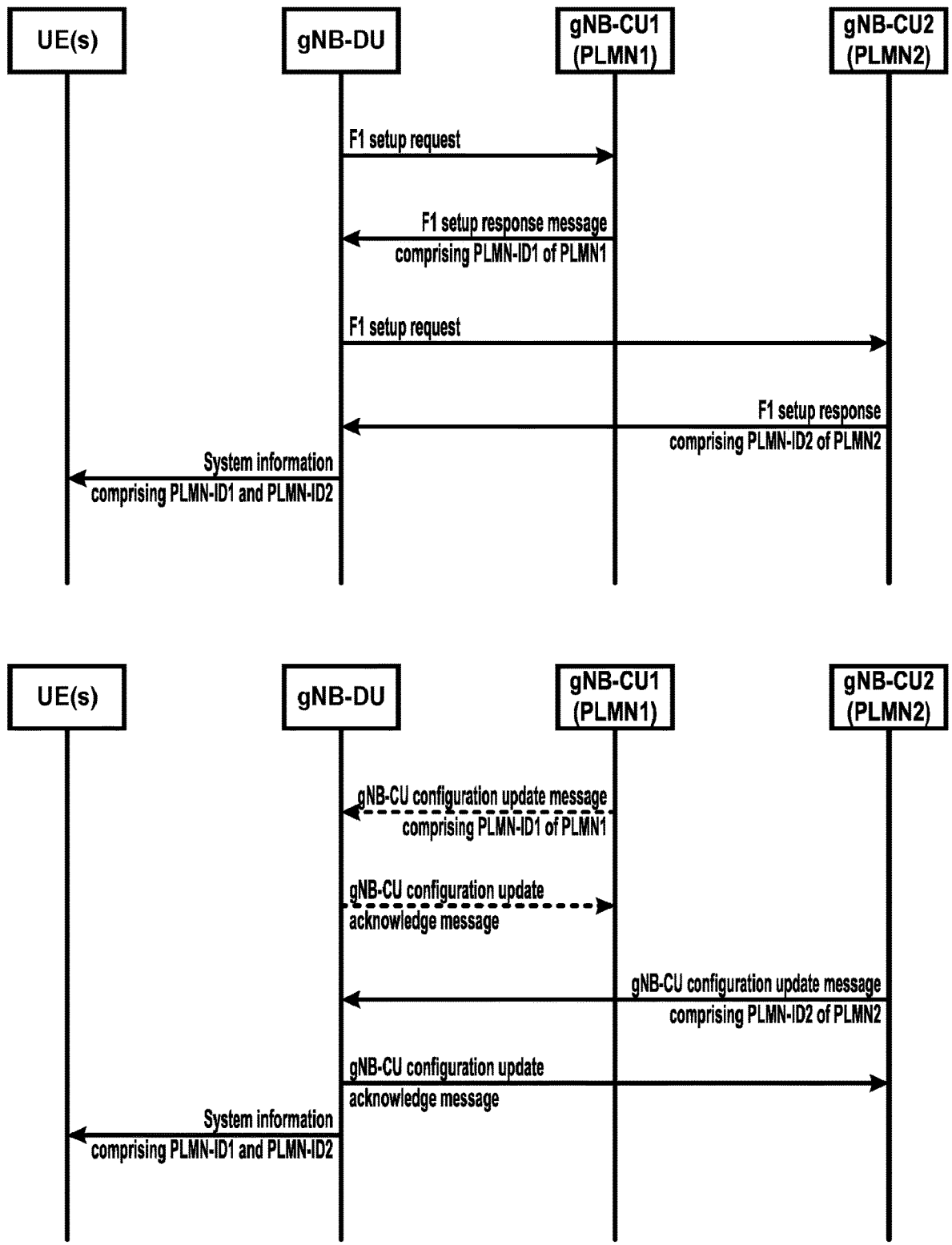
FIG. 27 is an example diagram of an aspect of an embodiment of the present disclosure.
Figure 28:
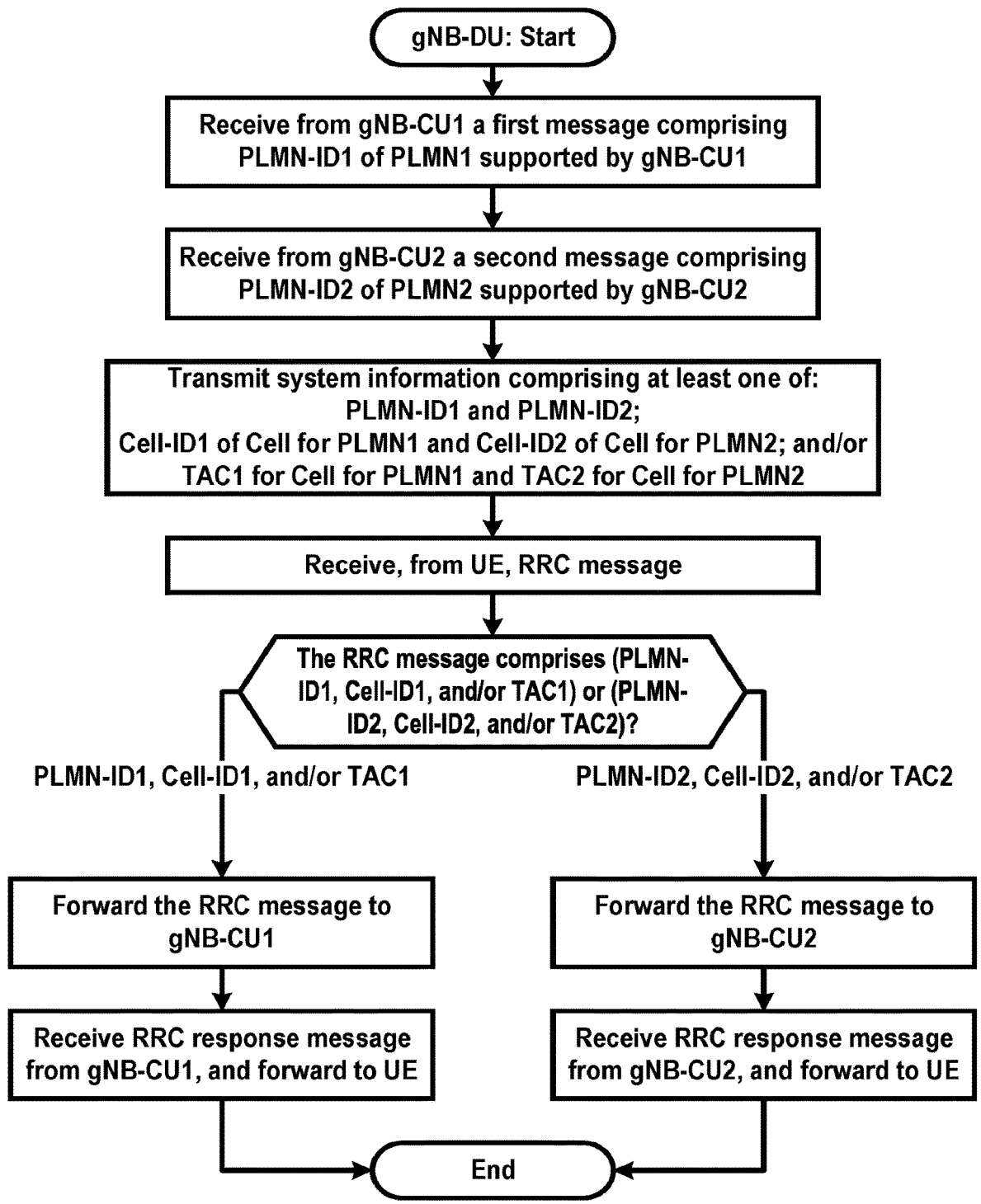
FIG. 28 is an example diagram of an aspect of an embodiment of the present disclosure.
Figure 29:
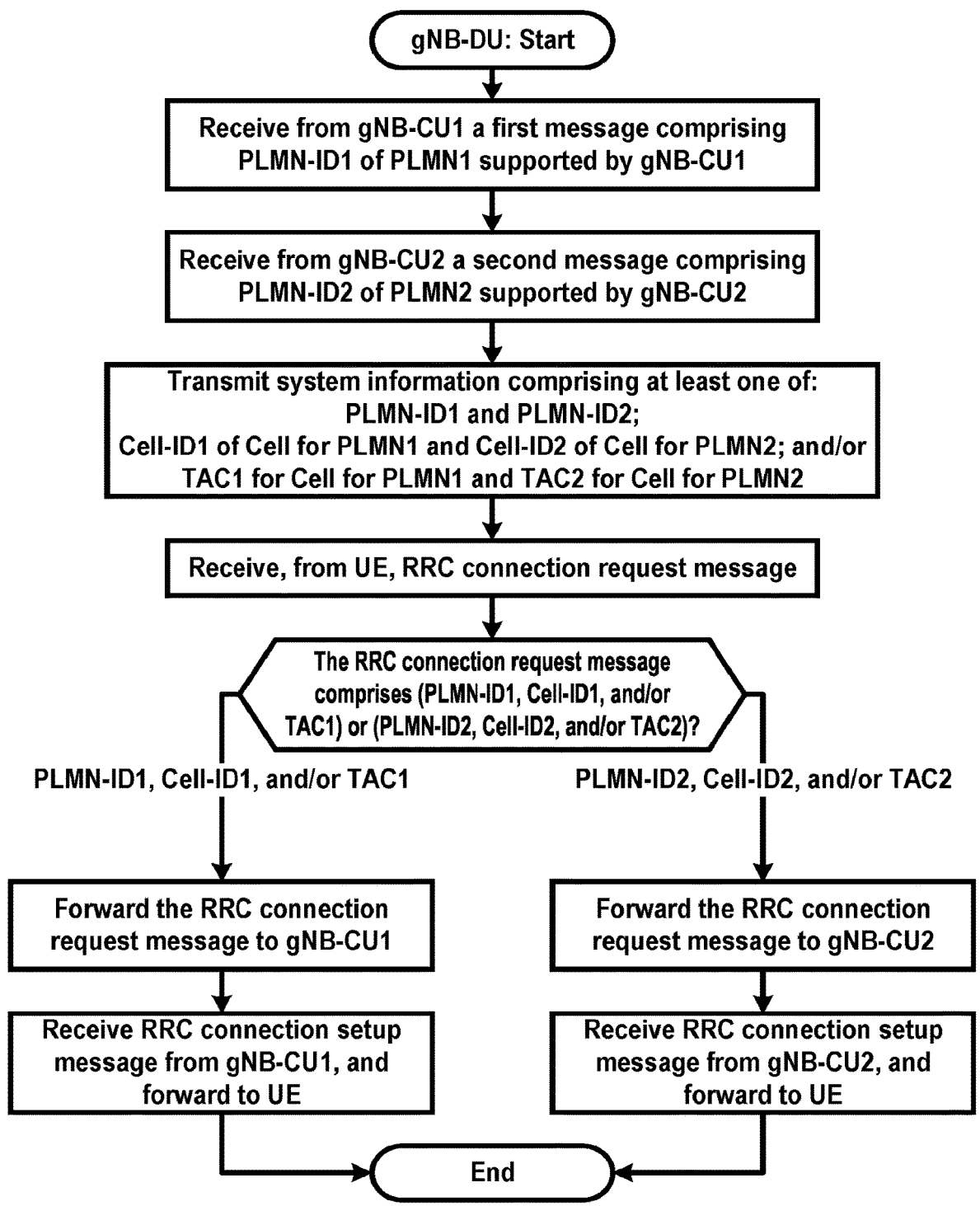
FIG. 29 is an example diagram of an aspect of an embodiment of the present disclosure.
Figure 30:
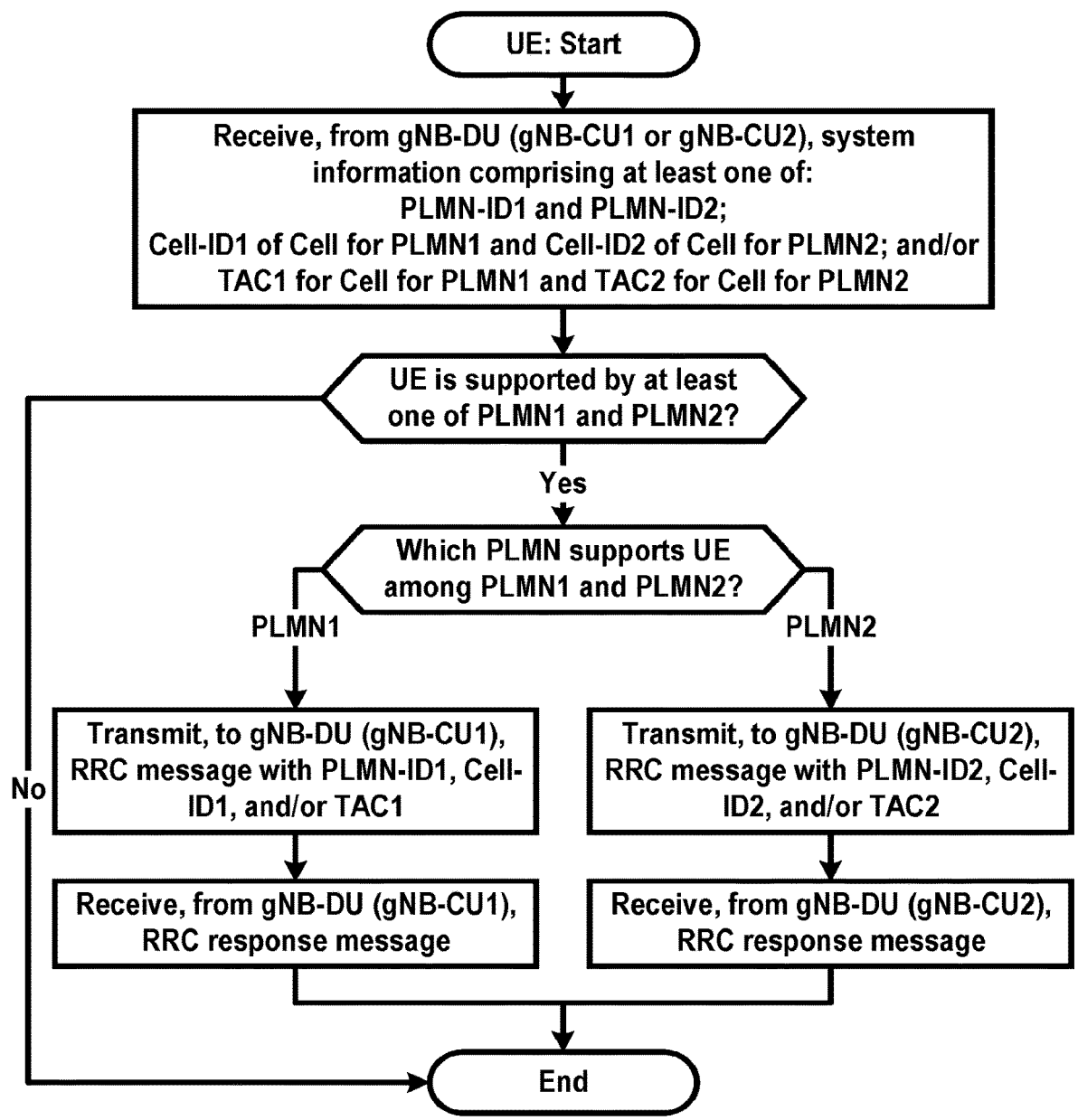
FIG. 30 is an example diagram of an aspect of an embodiment of the present disclosure.

In an example, as shown in example figures: FIG. 16, FIG. 17, FIG. 18, FIG. 19, FIG. 20, FIG. 21, FIG. 22, and/or FIG. 23, one or more base station central units (e.g. gNB-CUs, central units, CUs, and/or the like) may be connected to one or more base station distributed units (e.g. gNB-DU, distributed unit, DU, and/or the like) via one or more interfaces (e.g. F1 interface). In an example, a base station may comprise one or more base station central units and one or more base station distributed units. In an example, a first base station central unit (e.g. first gNB-CU, first central unit, first CU, first access point CU, and/or the like) may be connected to a base station distributed unit (e.g. gNB-DU, distributed unit, DU, access point DU, and/or the like) via at least one first F1 interface (e.g. F1 user plane (F1-U), F1 control plane (F1-C)), and a second base station central unit (e.g. second gNB-CU, second central unit, second CU, second access point CU, and/or the like) may be connected to the base station distributed unit (e.g. which is connected to the first base station control unit) via at least one second F1 interface. In an example, a base station (e.g. a gNB) may comprise the first gNB-CU, the second gNB-CU, and/or the gNB-DU. In an example, a first base station may comprise the first gNB-CU and/or the gNB-DU. In an example, a second base station may comprise the second gNB-CU and/or the gNB-DU.

In an example, the first gNB-CU and/or the second gNB-CU may comprise upper layer control plane functions (e.g. RRC and/or the like) and/or upper layer user plane functions (e.g. SDAP, PDCP, and/or the like). The gNB-DU may comprise lower layer functions (e.g. RLC, MAC, PHY, and/or the like). In an example, the first gNB-CU and/or the second gNB-CU may comprise at least RRC sublayer function. In an example, the gNB-DU may comprise at least wireless transmitter and/or receiver for communication with wireless devices. In an example, the first gNB-CU and/or the second gNB-CU may comprise upper layer functions (e.g., at least one of RRC, PDCP, SDAP, RLC, MAC, etc.). In an example, the gNB-DU may comprise lower layer functions (e.g., at least one of PHY, MAC, etc.).

In an example, the first gNB-CU and/or the second gNB-CU may transmit/receive PDCP packets (e.g. PDCP PDUs and/or PDCP SDUs) to/from the gNB-DU via an F1 interface (e.g. the at least one first F1 interface and/or the at least one second F1 interface). The gNB-DU may forward (transmit)/receive the PDCP packets to/from a wireless device via air interface (e.g. Uu interface, radio). The gNB-DU may forward packets (e.g. PDCP packets, RLC packets, MAC packets) from a wireless device to a gNB-CU (e.g. the first gNB-CU or the second gNB-CU) and/or may forward packets (e.g. PDCP packets, RLC packets, MAC packets) from a gNB-CU (e.g. the first gNB-CU or the second gNB-CU) to a wireless device. In an example, PDCP packets may be generated and transmitted by a wireless device and/or may be generated and transmitted by a gNB-CU (e.g. the first gNB-CU and/or the second gNB-CU).

In an example, the first gNB-CU and/or the second gNB-CU may comprise a base station central unit control plane (e.g. gNB-CU-CP) and/or a base station central unit user plane (e.g. gNB-CU-UP). In an example, a gNB-CU-CP may comprise at least an RRC sublayer function. A gNB-CU-UP may comprise an SDAP sublayer function, PDCP sublayer function, and/or the like. A gNB-CU-CP and a gNB-CU-UP may be connected to each other via an interface (e.g. E1 interface, E1-U, E1-C, and/or the like). In an example, a gNB-CU-CP (e.g. a first gNB-CU-CP of the first gNB-CU and/or a second gNB-CU-CP of the second gNB-CU) may be connected with the gNB-DU via a F1 control plane interface (F1-CP) (e.g. a first F1-CP of the at least one first F1 interface and/or a second F1-CP of the at least one second F1 interface). In an example, a gNB-CU-UP (e.g. a first gNB-CU-UP of the first gNB-CU and/or a second gNB-CU-UP of the second gNB-CU) may be connected with the gNB-DU via a F1 user plane interface (F1-UP) (e.g. a first F1-UP of the at least one first F1 interface and/or a second F1-UP of the at least one second F1 interface).

In an example, the gNB-DU may establish interface connections (e.g. F1 connection, F1 control plane connection, F1 user plane connection) with a plurality of gNB-CUs. The plurality of gNB-CUs may comprise the first gNB-CU and the second gNB-CU. In an example, the first gNB-CU may support (e.g. serve, be for, belong to, provide, and/or the like) a first public land mobile network (PLMN). In an example, the second gNB-CU may support (e.g. serve, be for, belong to, provide, and/or the like) a second PLMN. In an example embodiment, supporting a PLMN (e.g. first PLMN, second PLMN) may be interpreted as being allowed/configured to employ a corresponding network node (e.g. first gNB-CU, second gNB-CU), corresponding resources, and/or a corresponding cell for the PLMN. That a network node supports a PLMN may be interpreted as resources of the network node is allowed to be used to operate the PLMN and/or serve wireless devices of the PLMN. That a network node supports a PLMN may be interpreted as the PLMN comprises the network node.

A PLMN may be a combination of wireless communication services offered by at least one operator in at least one country. A PLMN may comprise one or more cellular technologies such as GSM/2G, UMTS/3G, LTE/4G, 5G, and/or etc. offered by at least one operator within at least one country. A PLMN may be referred to as a cellular network.

Figure 41:
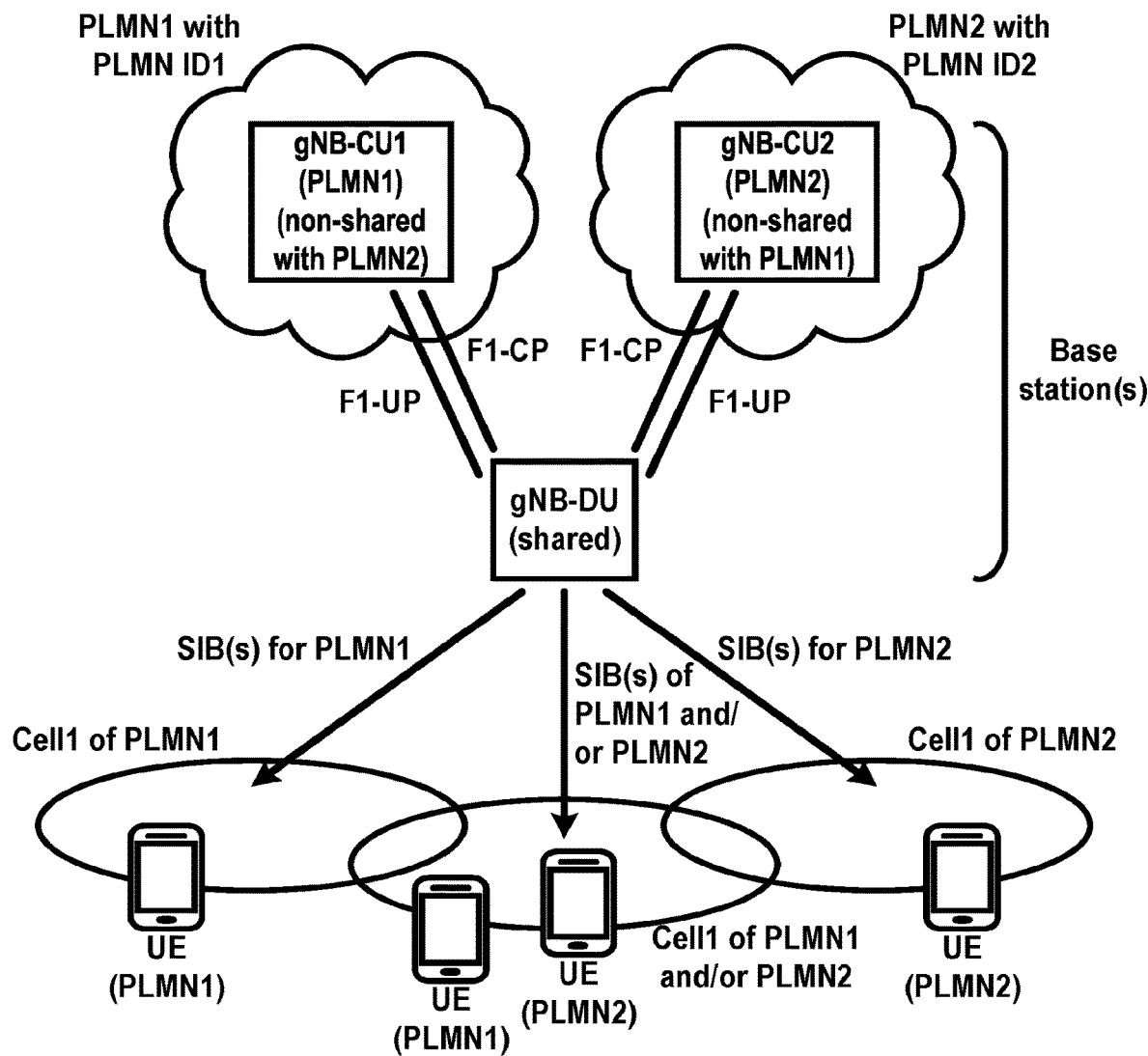
FIG. 41 is an example diagram of an aspect of an embodiment of the present disclosure.

In an example, as shown in FIG. 41, the gNB-DU may be shared by the first PLMN and the second PLMN. The first gNB-CU and/or the second gNB-CU may be a non-shared gNB-CU. The first gNB-CU may be non-shared with the second PLMN. The second gNB-CU may be non-shared with the first PLMN. Sharing a network node (e.g., gNB, gNB-CU, gNB-DU, etc.) with PLMNs may interpreted as sharing/using resources of the network node with the PLMNs.

In an example, the first gNB-CU may be shared by the first PLMN and at least one third PLMN. In an example, the second gNB-CU may be shared by the second PLMN and at least one fourth PLMN. In an example, the gNB-DU may be shared by multiple PLMNs (e.g., multiple operators) comprising at least one of the first PLMN, the second PLMN, the at least one third PLMN, and/or the at least one fourth PLMN.

Figure 31:
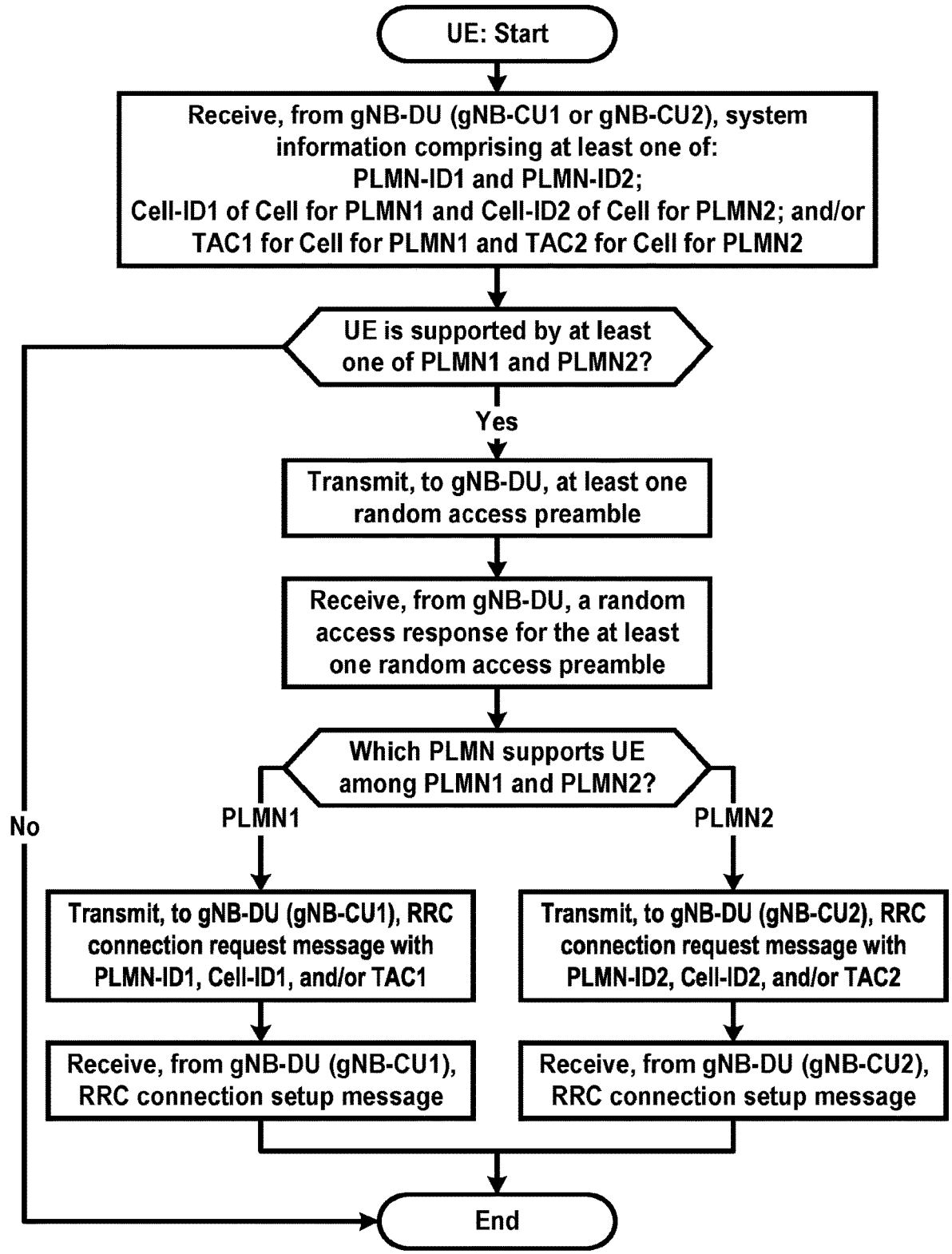
FIG. 31 is an example diagram of an aspect of an embodiment of the present disclosure.

In an example, as shown in example figures: FIG. 24, FIG. 25, FIG. 26, FIG. 27, FIG. 28, FIG. 29, FIG. 30, and/or FIG. 31, the first gNB-CU may transmit (or send) a first connection message to the gNB-DU. The first connection message may comprise an F1 setup response message in response to an F1 setup request message, which is transmitted by the gNB-DU to the first gNB-CU. The F1 setup request message and the F1 setup response message may be messages for an F1 setup procedure to establish an F1 interface (e.g. the at least one first F1 interface) between the first gNB-CU and the gNB-DU. In an example, the first connection message may comprise a gNB-CU configuration update message for configuration updates (e.g. configurations of a gNB-CU and/or a gNB-DU) by a gNB-CU (e.g. the first gNB-CU). In response to receiving the gNB-CU configuration update message, the gNB-DU may transmit, to the first gNB-CU, a gNB-CU configuration update acknowledge message (or a gNB-CU configuration update failure message), which may indicate that one or more configurations of the gNB-CU configuration update message (e.g. the first connection message) are applied (accepted) or failed (rejected) at the gNB-DU. The gNB-CU configuration update message and the gNB-CU configuration update acknowledge message (and/or the gNB-CU configuration update failure message) may be messages for a gNB-CU configuration update procedure. In an example, the first connection message may comprise a gNB-DU configuration update acknowledge message (or a gNB-DU configuration update failure message) in response to a gNB-DU configuration update message, which may be transmitted by the gNB-DU to the first gNB-CU. The gNB-DU configuration updated message and the gNB-DU configuration update acknowledge message (and/or the gNB-DU configuration update failure message) may be messages for a gNB-DU configuration update procedure to update configurations (e.g. configurations of a gNB-CU and/or a gNB-DU) by a gNB-DU.

In an example, as shown in example figure, FIG. 32, FIG. 34, and/or FIG. 35, the first connection message may comprise a first PLMN identifier of a first PLMN supported (e.g. served) by the first gNB-CU. In an example embodiment, supporting a PLMN (e.g. first PLMN) may be interpreted as being allowed/configured to employ a corresponding network node (e.g. first gNB-CU), corresponding resources, and/or a corresponding cell for the PLMN. In an example, the first PLMN may comprise the first gNB-CU. In an example, the first PLMN identifier may identify (or indicate) a PLMN (e.g. the first PLMN) of an operator (e.g. first service operator), an operator (e.g. first service operator), and/or a network served by an operator (e.g. first service operator). An operator may be interpreted as a service operator/provider and/or a network operator/provider. In an example, the first connection message may further comprise at least one of a message type of the first connection message, a transaction identifier (e.g. transaction ID) of a corresponding procedure (e.g. F1 setup procedure, gNB-CU configuration update procedure, gNB-DU configuration update procedure, and/or the like), a gNB-CU identifier of the first gNB-CU, a gNB-CU name of the first gNB-CU, one or more first cell identifiers (e.g. cell global identifier (NR CGI), physical cell identifier (NR PCI)) of one or more first cells to be activated, one or more second cell identifiers (e.g. cell global identifier (NR CGI), physical cell identifier (NR PCI)) of one or more second cells to be deactivated, and/or the like. In an example, the first connection message may further comprise one or more serving cell identifiers of one or more serving cells associated with the first PLMN (e.g. one or more cells supporting the first PLMN, and/or one or more cells employed for the first PLMN). In an example, the one or more serving cells may be cells of the gNB-DU.

In an example, as shown in example figure FIG. 33, a first procedure initiation message (e.g. the first connection message may be a response message for the first procedure initiation message), e.g. the F1 setup request message and/or the gNB-DU configuration update message, may comprise at least one of a message type of the first procedure initiation message, a transaction identifier (e.g. transaction ID) of a corresponding procedure (e.g. F1 setup procedure, gNB-DU configuration update procedure, and/or the like), a gNB-DU identifier of the gNB-DU, a gNB-DU name of the gNB-DU, served cell configuration parameters of one or more served cells (e.g. to add/modify/delete/activate) of the gNB-DU, and/or the like. In an example, the served cell configuration parameters may comprise at least one of served cell information of a served cell, gNB-DU system information of a served cell, and/or the like. The served cell information may comprise at least one of a cell identifier (e.g. NR CGI, NR PCI, old NR CGI, old NR PCI), a tracking area code, a tracking area identifier, one or more PLMN identifiers of one or more PLMNs supported by a served cell, FDD configuration parameters (e.g. uplink frequency band (UL ARFCN), downlink frequency band (DL ARFCN), UL transmission bandwidth, DL transmission bandwidth, and/or the like), TDD configuration parameters (e.g. frequency band (ARFCN), transmission bandwidth, and/or the like), LAA configuration parameters (e.g. subframe type3 configuration parameters), supplementary uplink (SUL) information, measurement timing configuration parameters, and/or the like. In an example the gNB-DU system information may comprise at least one of a master information block (MIB) message of a served cell, system information block type 1 (SIB1) message of a served cell, and/or the like.

In an example, as shown in example figure FIG. 36, a first procedure response message (e.g. a response message for the first connection message), e.g. the gNB-CU configuration update acknowledge message and/or the gNB-CU configuration update failure message, may comprise at least one of a message type of the first procedure response message, a transaction identifier (e.g. transaction ID) of a corresponding procedure (e.g. gNB-CU configuration update procedure, and/or the like), a gNB-DU identifier of the gNB-DU, a gNB-DU name of the gNB-DU, one or more cell identifiers (e.g. NR CGI, NR PCI) of one or more cells succeeded/failed to activate or modified/added/deleted, a cause of success/failure to activate or modification/addition/deletion, and/or the like.

In an example, based on the first connection message, the gNB-DU may configure one or more system parameters comprising at least one of F1 interface configuration parameters (e.g. one or more tunnel identifier configurations of one or more tunnels to the first gNB-CU), cell configuration parameters of one or more serving cells associated with the first gNB-CU (e.g. one or more serving cells employed for the first gNB-CU and/or the first PLMN), resource configuration parameters (e.g. radio resource configuration parameters), hardware configuration parameters (e.g. CPU, RAM, bus resources for the first gNB-CU and/or the first PLMN), one or more configuration parameters for one or more wireless devices, and/or the like.

In an example, the second gNB-CU may transmit(send) a second connection message to the gNB-DU. The second connection message may comprise an F1 setup response message in response to an F1 setup request message, which is transmitted by the gNB-DU to the second gNB-CU. The F1 setup request message and the F1 setup response message may be messages for an F1 setup procedure to establish an F1 interface (e.g. the at least one second F1 interface) between the second gNB-CU and the gNB-DU. In an example, the second connection message may comprise a gNB-CU configuration update message for configuration updates (e.g. configurations of a gNB-CU and/or a gNB-DU) by a gNB-CU (e.g. the second gNB-CU). In response to receiving the gNB-CU configuration update message, the gNB-DU may transmit, to the second gNB-CU, a gNB-CU configuration update acknowledge message (or a gNB-CU configuration update failure message), which may indicate that one or more configurations of the gNB-CU configuration update message (e.g. the second connection message) are applied (accepted) or failed (rejected) at the gNB-DU. The gNB-CU configuration update message and the gNB-CU configuration update acknowledge message (and/or the gNB-CU configuration update failure message) may be messages for a gNB-CU configuration update procedure. In an example, the second connection message may comprise a gNB-DU configuration update acknowledge message (or a gNB-DU configuration update failure message) in response to a gNB-DU configuration update message, which may be transmitted by the gNB-DU to the second gNB-CU. The gNB-DU configuration updated message and the gNB-DU configuration update acknowledge message (and/or the gNB-DU configuration update failure message) may be messages for a gNB-DU configuration update procedure to update configurations (e.g. configurations of a gNB-CU and/or a gNB-DU) by a gNB-DU.

In an example, the second connection message may comprise a second PLMN identifier of a second PLMN supported (e.g. served) by the second gNB-CU. In an example embodiment, supporting a PLMN (e.g. second PLMN) may be interpreted as being allowed/configured to employ a corresponding network node (e.g. second gNB-CU), corresponding resources, and/or a corresponding cell for the PLMN. In an example, the second PLMN may comprise the second gNB-CU. In an example, the second PLMN identifier may identify (or indicate) a PLMN (e.g. the second PLMN) of an operator (e.g. second service operator), an operator (e.g. second service operator), and/or a network served by an operator (e.g. second service operator). In an example, the second connection message may further comprise at least one of a message type of the second connection message, a transaction identifier (e.g. transaction ID) of a corresponding procedure (e.g. F1 setup procedure, gNB-CU configuration update procedure, gNB-DU configuration update procedure, and/or the like), a gNB-CU identifier of the second gNB-CU, a gNB-CU name of the second gNB-CU, one or more third cell identifiers (e.g. cell global identifier (NR CGI), physical cell identifier (NR PCI)) of one or more third cells to be activated, one or more fourth cell identifiers (e.g. cell global identifier (NR CGI), physical cell identifier (NR PCI)) of one or more fourth cells to be deactivated, and/or the like. In an example, the second connection message may further comprise one or more serving cell identifiers of one or more serving cells associated with the second PLMN (e.g. one or more cells supporting the second PLMN, and/or one or more cells employed for the second PLMN). In an example, the one or more serving cells may be cells of the gNB-DU.

In an example, a second procedure initiation message (e.g. the second connection message may be a response message for the second procedure initiation message), e.g. the F1 setup request message and/or the gNB-DU configuration update message, may comprise at least one of a message type of the second procedure initiation message, a transaction identifier (e.g. transaction ID) of a corresponding procedure (e.g. F1 setup procedure, gNB-DU configuration update procedure, and/or the like), a gNB-DU identifier of the gNB-DU, a gNB-DU name of the gNB-DU, served cell configuration parameters of one or more served cells (e.g. to add/modify/delete/activate) of the gNB-DU, and/or the like. In an example, the served cell configuration parameters may comprise at least one of served cell information of a served cell, gNB-DU system information of a served cell, and/or the like. The served cell information may comprise at least one of a cell identifier (e.g. NR CGI, NR PCI, old NR CGI, old NR PCI), a tracking area code, a tracking area identifier, one or more PLMN identifiers of one or more PLMNs supported by a served cell, FDD configuration parameters (e.g. uplink frequency band (UL ARFCN), downlink frequency band (DL ARFCN), UL transmission bandwidth, DL transmission bandwidth, and/or the like), TDD configuration parameters (e.g. frequency band (ARFCN), transmission bandwidth, and/or the like), LAA configuration parameters (e.g. subframe type3 configuration parameters), supplementary uplink (SUL) information, measurement timing configuration parameters, and/or the like. In an example the gNB-DU system information may comprise at least one of a master information block (MIB) message of a served cell, system information block type 1 (SIB1) message of a served cell, and/or the like.

In an example, a second procedure response message (a response message for the second connection message), e.g. the gNB-CU configuration acknowledge message and/or the gNB-CU configuration failure message, may comprise at least one of a message type of the second procedure response message, a transaction identifier (e.g. transaction ID) of a corresponding procedure (e.g. gNB-CU configuration update procedure, and/or the like), a gNB-DU identifier of the gNB-DU, a gNB-DU name of the gNB-DU, one or more cell identifiers (e.g. NR CGI, NR PCI) of one or more cells succeeded/failed to activate or modified/added/deleted, a cause of success/failure to activate or modification/addition/deletion, and/or the like.

In an example, based on the second connection message, the gNB-DU may configure one or more system parameters comprising at least one of F1 interface configuration parameters (e.g. one or more tunnel identifier configurations of one or more tunnels to the second gNB-CU), cell configuration parameters of one or more serving cells associated with the second gNB-CU (e.g. one or more serving cells employed for the second gNB-CU and/or the second PLMN), resource configuration parameters (e.g. radio resource configuration parameters), hardware configuration parameters (e.g. CPU, RAM, bus resources for the second gNB-CU and/or the second PLMN), and/or the like.

In an example, based on the first connection message and/or the second connection message, the gNB-DU may support (e.g. serve, be part of, provide resources for, and/or the like) the first PLMN and the second PLMN via serving cell(s) of the gNB-DU. In an example, one or more first cells of the serving cells of the gNB-DU may support the first PLMN (and/or the first gNB-CU), and/or one or more second cells of the serving cells of the gNB-DU may support the second PLMN (and/or the second gNB-CU). In an example, one or more third cells of the gNB-DU may support both the first PLMN and the second PLMN. In an example, in response to receiving the first connection message, the gNB-DU may transmit, to the first gNB-CU, one or more first cell identifiers of the one or more first cells supporting the first PLMN and/or one or more third cell identifiers of the one or more third cells supporting the first PLMN and the second PLMN. In an example, in response to receiving the second connection message, the gNB-DU may transmit, to the second gNB-CU, one or more second cell identifiers of the one or more second cells supporting the second PLMN and/or one or more third cell identifiers of the one or more third cells supporting the first PLMN and the second PLMN.

In an example, a PLMN identifier (e.g. the first PLMN identifier and/or the second PLMN identifier) may comprise at least one of an operator identifier of a service operator, a network identifier of a network served by a service operator, a service area identifier of a service area served by a service operator, an identifier (identity) identifying a PLMN/operator/service operator/network/network area/group of infrastructures, and/or the like. In an example, a PLMN (e.g. the first PLMN and/or the second PLMN) may be interpreted at least one of an operator, a service operator, a network served by a service operator, a network area, a service area served by a service operator, a group of infrastructures, and/or the like.

In an example, in response to receiving the second connection message, the gNB-DU may transmit (send), to the first gNB-CU, the second PLMN identifier of the second PLMN that the gNB-DU (and/or a serving cell of the gNB-DU) supports (or serves), and/or may transmits, to the first gNB-CU, a second gNB-CU identifier (e.g. a second gNB-CU name, second gNB-CU IP address, and/or the like) of the second gNB-CU (e.g. the second gNB-CU identifier may indicate that the gNB-DU (and/or a serving cell of the gNB-DU) serves for the second gNB-CU). In an example, in response to receiving the second connection message, the gNB-DU may transmit (send), to the first gNB-CU, the one or more first cell identifiers of the one or more first cells supporting the first PLMN, the one or more second cell identifiers of the one or more second cells supporting the second PLMN, and/or one or more third cell identifiers of the one or more third cells supporting the first PLMN and the second PLMN.

In an example, in response to receiving the second connection message and/or based on the first connection message, the gNB-DU may transmit (send), to the second gNB-CU, the first PLMN identifier of the first PLMN that the gNB-DU (and/or a serving cell of the gNB-DU) supports (or serves) and/or may transmits, to the second gNB-CU, a first gNB-CU identifier (and/or a first gNB-CU name, first gNB-CU IP address, and/or the like) of the first gNB-CU (e.g. the first gNB-CU identifier may indicate that the gNB-DU (and/or a serving cell of the gNB-DU) serves for the first gNB-CU). In an example, in response to receiving the second connection message, the gNB-DU may transmit (send), to the second gNB-CU, the one or more first cell identifiers of the one or more first cells supporting the first PLMN, the one or more second cell identifiers of the one or more second cells supporting the second PLMN, and/or one or more third cell identifiers of the one or more third cells supporting the first PLMN and the second PLMN.

In an example, based on the first connection message and/or the second connection message, the gNB-DU may transmit (e.g. broadcast) at least one third message (e.g. one or more system information block, at least one system information block) comprising at least one of the first PLMN identifier and/or the second PLMN identifier. The at least one third message may be transmitted via air interface (e.g. via serving cells of the gNB-DU, and/or radio interface). In an example, the at least one third message may be (and/or comprise) one or more system information blocks (e.g. master information block, system information block type 1, system information block type 2, system information block type 3, and/or the like). In an example, the at least one third message may be (and/or comprise) one or more radio resource control (RRC) messages (e.g. RRC connection setup message, RRC connection resume message, RRC connection reconfiguration message, RRC connection reestablishment message, and/or the like) for a wireless device. In an example, the at least one third message may be transmitted via serving cells of the gNB-DU. In an example, the at least one third message may be transmitted via at least one of the one or more first cells supporting the first PLMN, the one or more second cells supporting the second PLMN, and/or the one or more third cells supporting the first PLMN and the second PLMN.

In an example, one or more of the at least one third message transmitted via the one or more third cells may comprise the first PLMN identifier and/or the second PLMN identifier (e.g. both the first PLMN identifier and the second PLMN identifier, or either the first PLMN identifier or the second PLMN identifier) indicating that the one or more third cells support (e.g. serve, are part of, provide resources for, and/or the like) the first PLMN (e.g. the first gNB-CU) and/or the second PLMN (e.g. the second gNB-CU).

In an example, first one of the at least one third message transmitted via the one or more first cells may comprise the first PLMN identifier indicating that the one or more first cells support (e.g. serve, are part of, provide resources for, and/or the like) the first PLMN (e.g. the first gNB-CU). In an example, second one of the at least one third message transmitted via the one or more second cells may comprise the second PLMN identifier indicating that the one or more second cells support (e.g. serve, are part of, provide resources for, and/or the like) the second PLMN (e.g. the second gNB-CU).

In an example, separate messages (e.g. separate system information blocks, RRC messages) for different PLMNs (and/or different gNB-CUs) may be transmitted as the at least one third message. In an example, a first separate message of the at least one third message may comprise the first PLMN identifier and/or a first serving cell identifier of a serving cell via which the first separate message (and/or the second separate message) is transmitted. In an example, a second separate message of the at least one third message may comprise the second PLMN identifier and/or a second serving cell identifier of the serving cell via which the second separate message (and/or the first separate message) is transmitted.

In an example, different cell identifiers (e.g. a first cell identifier and a second cell identifier) for a serving cell (e.g. physically single cell; e.g., having different global cell identifiers for multiple PLMNs) may be configured for different PLMNs (e.g. the first PLMN and the second PLMN) (e.g. when the serving cell is employed to support/serve the first PLMN and the second PLMN). In an example, the different cell identifiers may comprise a global cell identifier (GCI) and/or a cell global identifier (CGI), and/or the like. In an example, different cell identifiers (e.g. a third cell identifier and a fourth cell identifier) for a serving cell (e.g. physically single cell) may be configured for different gNB-CUs and/or for different gNBs (e.g. the first gNB-CU and the second gNB-CU; and/or the first gNB of the first gNB-CU and the second gNB of the second gNB-CU) (e.g. when the serving cell is employed by the first gNB-CU and the second gNB-CU). In an example, the at least one third message may comprise at least one cell identifier (e.g. comprising the first cell identifier for the first PLMN and/or the second cell identifier for the second PLMN) of the serving cell via which the at least one third message is transmitted. In an example, the at least one third message may comprise at least one cell identifier (e.g. comprising the third cell identifier for the first gNB-CU/the first gNB and/or the fourth cell identifier for the second gNB-CU/the second gNB) of the serving cell via which the at least one third message is transmitted. In an example, the at least one cell identifier may comprise at least one of a cell identity, a cell ID, a physical cell identifier, a global cell identifier, and/or the like.

In an example, the at least one third message may comprise at least one tracking area code (TAC) of (and/or associated with) a serving cell via which the at least one third message may be transmitted. In an example, the at least one TAC may be configured for different PLMNs (e.g. a first TAC of the at least one TAC may be configured for the first PLMN; and/or a second TAC of the at least one TAC may be configured for the second PLMN). In an example, the at least one TAC may be configured for different gNB-CUs (e.g. a third TAC of the at least one TAC may be configured for the first gNB-CU; and/or a fourth TAC of the at least one TAC may be configured for the second gNB-CU). In an example, the at least one TAC may comprise at least one of the first TAC, the second TAC, the third TAC, and/or the fourth TAC.

In an example, the at least one third message may comprise at least one tracking area identifier (TAI) of (and/or associated with) a serving cell via which the at least one third message may be transmitted. In an example, the at least one TAI may be configured for different PLMNs (e.g. a first TAI of the at least one TAI may be configured for the first PLMN; and/or a second TAI of the at least one TAI may be configured for the second PLMN). In an example, the at least one TAI may be configured for different gNB-CUs (e.g. a third TAI of the at least one TAI may be configured for the first gNB-CU; and/or a fourth TAI of the at least one TAI may be configured for the second gNB-CU). In an example, the at least one TAI may comprise at least one of the first TAI, the second TAI, the third TAI, and/or the fourth TAI.

In an example, the at least one third message may comprise at least one registration area code (RAC) of (and/or associated with) a serving cell via which the at least one third message may be transmitted. In an example, the at least one RAC may be configured for different PLMNs (e.g. a first RAC of the at least one RAC may be configured for the first PLMN; and/or a second RAC of the at least one TAC may be configured for the second PLMN). In an example, the at least one RAC may be configured for different gNB-CUs (e.g. a third RAC of the at least one RAC may be configured for the first gNB-CU; and/or a fourth RAC of the at least one RAC may be configured for the second gNB-CU). In an example, the at least one RAC may comprise at least one of the first RAC, the second RAC, the third RAC, and/or the fourth RAC.

In an example, the at least one third message may comprise at least one registration area identifier (RAI) of (and/or associated with) a serving cell via which the at least one third message may be transmitted. In an example, the at least one RAI may be configured for different PLMNs (e.g. a first RAI of the at least one RAI may be configured for the first PLMN; and/or a second RAI of the at least one RAI may be configured for the second PLMN). In an example, the at least one RAI may be configured for different gNB-CUs (e.g. a third RAI of the at least one RAI may be configured for the first gNB-CU; and/or a fourth RAI of the at least one RAI may be configured for the second gNB-CU). In an example, the at least one RAI may comprise at least one of the first RAI, the second RAI, the third RAI, and/or the fourth RAI.

In an example, the at least one third message may comprise a first gNB-CU identifier of the first gNB-CU and/or a second gNB-CU identifier of the second gNB-CU. The first gNB-CU identifier may indicate that a serving cell via which the at least one third message is transmitted serves for the first gNB-CU. The second gNB-CU identifier may indicate that a serving cell via which the at least one third message is transmitted serves for the second gNB-CU.

In an example, the at least one third message may comprise a first gNB identifier (e.g. a first base station identifier) of a first gNB (e.g. a first base station) comprising the first gNB-CU and the gNB-DU. In an example, the at least one third message may comprise a second gNB identifier (e.g. a second base station identifier) of a second gNB (e.g. a second base station) comprising the second gNB-CU and the gNB-DU. In an example, the first gNB identifier (e.g. associated with the first gNB-CU and/or the first PLMN) and the second gNB identifier (e.g. associated with the second gNB-CU and/or the second PLMN) may be for a gNB (e.g. a base station; the first gNB and the second gNB are the same gNB) comprising the first gNB-CU, the second gNB-CU, and the gNB-DU. The first gNB identifier may be for the first gNB-CU and/or the first PLMN. The second gNB identifier may be for the second gNB-CU and/or the second PLMN. The first gNB identifier may indicate that a serving cell via which the at least one third message is transmitted serves for the first gNB, the first gNB-CU, and/or the first PLMN. The second gNB identifier may indicate that a serving cell via which the at least one third message is transmitted serves for the second gNB, the second gNB-CU, and/or the second PLMN.

In an example, the at least one third message may comprise at least one RAN notification area (RNA) identifier (e.g. for a wireless device in RRC inactive state) of (and/or associated with) a serving cell via which the at least one third message may be transmitted. In an example, the at least one RNA identifier may be configured for different PLMNs (e.g. a first RNA identifier of the at least one RNA identifier may be configured for the first PLMN; and/or a second RNA identifier of the at least one RNA identifier may be configured for the second PLMN). In an example, the at least one RNA identifier may be configured for different gNB-CUs (e.g. a third RNA identifier of the at least one RNA identifier may be configured for the first gNB-CU; and/or a fourth RNA identifier of the at least one RNA identifier may be configured for the second gNB-CU). In an example, the at least one RNA identifier may comprise at least one of the first RNA identifier, the second RNA identifier, the third RNA identifier, and/or the fourth RNA identifier.

In an example, the at least one third message may comprise at least one RAN area identifier (e.g. for a wireless device in RRC inactive state) of (and/or associated with) a serving cell via which the at least one third message may be transmitted. In an example, the at least one RAN area identifier may be configured for different PLMNs (e.g. a first RAN area identifier of the at least one RAN area identifier may be configured for the first PLMN; and/or a second RAN area identifier of the at least one RAN area identifier may be configured for the second PLMN). In an example, the at least one RAN area identifier may be configured for different gNB-CUs (e.g. a third RAN area identifier of the at least one RAN area identifier may be configured for the first gNB-CU; and/or a fourth RAN area identifier of the at least one RAN area identifier may be configured for the second gNB-CU). In an example, the at least one RAN area identifier may comprise at least one of the first RAN area identifier, the second RAN area identifier, the third RAN area identifier, and/or the fourth RAN area identifier.

In an example, the at least one third message may comprise at least one resume identifier (e.g. for a wireless device in RRC inactive state) for (and/or associated with) a serving cell via which the at least one third message may be transmitted. In an example, the at least one resume identifier may be configured for different PLMNs (e.g. a first resume identifier of the at least one resume identifier may be for the first PLMN; and/or a second resume identifier of the at least one resume identifier may be for the second PLMN). In an example, the at least one resume identifier may be configured for different gNB-CUs (e.g. a third resume identifier of the at least one resume identifier may be for the first gNB-CU; and/or a fourth resume identifier of the at least one resume identifier may be for the second gNB-CU). In an example, the at least one resume identifier may comprise at least one of the first resume identifier, the second resume identifier, the third resume identifier, and/or the fourth resume identifier.

In an example, the at least one third message may comprise at least one of a cell barred information element (IE), intra frequency IE, closed subscriber group (CSG) indication, a CSG identifier (e.g. CSG identity), a cell selection IE comprising q-RxLevMin and/or q-RxLevMinOffset, a p-Max, frequency band information comprising additionalPmax value and/or additionalSpectrumEmission value, scheduling information, TDD configuration information, a system information window length, a system information value tag, and/or the like for a serving cell via which the at least one third message is transmitted.

In an example, the gNB-DU may configure the at least one third message, and/or may transmit (e.g. broadcast) the at least one third message via air interface (e.g. via serving cells of the gNB-DU, and/or radio interface).

In an example, the gNB-DU may configure the at least one third message, and/or may transmit the at least one third message to the first gNB-CU and/or the second gNB-CU via an F1 interface (e.g. the at least one first F1 interface and/or the at least one second F1 interface; e.g. via a gNB-DU configuration update message, an F1 setup request message, a gNB-CU configuration update acknowledge message, an UL RRC message transfer message, a system information transfer message, and/or the like) (if the first gNB-CU is a master CU, the gNB-DU transmit the at least one third message to the first gNB-CU). Based on the at least one third message received from the gNB-DU, the first gNB-CU and/or the second gNB-CU may transmit, to the gNB-DU, the at least one third message via the F1 interface (e.g. the at least one first F1 interface and/or the at least one second F1 interface; e.g. via a gNB-CU configuration update message, an F1 setup response message, a gNB-DU configuration update acknowledge message, an DL RRC message transfer message, a system information transfer message, and/or the like) (if the first gNB-CU is a master CU, the first gNB-CU transmit the at least one third message to the gNB-DU). In an example, in response to receiving the at least one third message from the first gNB-CU and/or the second gNB-CU, the gNB-DU may transmit (and/or broadcast) the at least one third message via air interface (e.g. via the serving cells of the gNB-DU, and/or radio interface).

In an example, the gNB-DU may configure one or more parameters of the at least one third message, and/or may transmit the one or more parameters of the at least one third message to the first gNB-CU and/or the second gNB-CU via an F1 interface (e.g. the at least one first F1 interface and/or the at least one second F1 interface; e.g. via a gNB-DU configuration update message, an F1 setup request message, a gNB-CU configuration update acknowledge message, an UL RRC message transfer message, a system information transfer message, and/or the like) (if the first gNB-CU is a master CU, the gNB-DU transmit the one or more parameters of the at least one third message to the first gNB-CU). Based on the one or more parameters of the at least one third message, the first gNB-CU and/or the second gNB-CU may transmit, to the gNB-DU, the at least one third message via the F1 interface (e.g. the at least one first F1 interface and/or the at least one second F1 interface; e.g. via a gNB-CU configuration update message, an F1 setup response message, a gNB-DU configuration update acknowledge message, an DL RRC message transfer message, a system information transfer message, and/or the like) (if the first gNB-CU is a master CU, the first gNB-CU transmit the at least one third message to the gNB-DU). In an example, in response to receiving the at least one third message from the first gNB-CU and/or the second gNB-CU, the gNB-DU may transmit (and/or broadcast) the at least one third message via air interface (e.g. via the serving cells of the gNB-DU, and/or radio interface).

In an example, the gNB-DU may configure at least one system information block (e.g. the at least one third message, one or more elements of the at least one third message, system information block type 1, and/or other types of system information block: for example, SIB2, SIB3, etc.) for a serving cell of the gNB-DU based on the first connection message and/or the second connection message. In an example, the at least one system information block may comprise at least one of the first PLMN identifier, the second PLMN identifier, a first parameter indicating that the serving cell supports the first PLMN (e.g. first service operator, first operator, first network, and/or the like), a second parameter indicating that the serving cell supports the second PLMN (e.g. second service operator, second operator, second network, and/or the like), a third parameter indicating that the serving cell is employed by the first gNB-CU and/or the first gNB, a fourth parameter indicating that the serving cell is employed by the second gNB-CU and/or the second gNB, and/or the like. The at least one system information block may further comprise at least one of a cell identifier of a serving cell via which the at least one system information block is transmitted, the first cell identifier of the serving cell for the first PLMN, the second cell identifier of the serving cell for the second PLMN, the third cell identifier of the serving cell for the first gNB-CU/the first gNB, the fourth cell identifier of the serving cell for the second gNB-CU/the second gNB, and/or the like. The first parameter may comprise at least one of the first TAC, the first TAI, the first RAC, the first RAI, the first cell identifier, the first gNB-CU identifier, the first gNB identifier, the first RNA identifier, the first RAN area identifier, the first resume identifier, and/or the like. The second parameter may comprise at least one of the second TAC, the second TAI, the second RAC, the second RAI, the second cell identifier, the second gNB-CU identifier, the second gNB identifier, the second RNA identifier, the second RAN area identifier, the second resume identifier, and/or the like. The third parameter may comprise at least one of the third TAC, the third TAI, the third RAC, the third RAI, the third cell identifier, the first gNB-CU identifier, the first gNB identifier, the third RNA identifier, the third RAN area identifier, the third resume identifier, and/or the like. The fourth parameter may comprise at least one of the fourth TAC, the fourth TAI, the fourth RAC, the fourth RAI, the fourth cell identifier, the second gNB-CU identifier, the second gNB identifier, the fourth RNA identifier, the fourth RAN area identifier, the fourth resume identifier, and/or the like.

In an example, based on the first PLMN identifier of the first PLMN and/or the second PLMN identifier of the second PLMN supported by a serving cell of the gNB-DU (e.g. received from the gNB-DU) and/or based on the first parameter, the second parameter, the third parameter, and/or the fourth parameter, the first gNB-CU may configure at least one system information block (e.g. system information block type 1, and/or other types of system information block: for example, SIB2, SIB3, etc.) for the serving cell of the gNB-DU. In an example, the first gNB-CU may receive the first PLMN identifier and/or the second PLMN identifier from the gNB-DU and/or from the second gNB-CU. In an example, the first gNB-CU may receive the first parameter, the second parameter, the third parameter, and/or the fourth parameter from the gNB-DU and/or from the second gNB-CU. In an example, the at least one system information block may comprise the first PLMN identifier, the second PLMN identifier, the first parameter indicating that the serving cell supports the first PLMN (e.g. first service operator, first operator, first network, and/or the like), the second parameter indicating that the serving cell supports the second PLMN (e.g. second service operator, second operator, second network, and/or the like), the third parameter indicating that the serving cell is employed by the first gNB-CU and/or the first gNB, the fourth parameter indicating that the serving cell is employed by the second gNB-CU and/or the second gNB, and/or the like. The at least one system information block may further comprise at least one of a cell identifier of a serving cell via which the at least one system information block is transmitted, the first cell identifier of the serving cell for the first PLMN, the second cell identifier of the serving cell for the second PLMN, the third cell identifier of the serving cell for the first gNB-CU/the first gNB, the fourth cell identifier of the serving cell for the second gNB-CU/the second gNB, and/or the like. The first parameter may comprise at least one of the first TAC, the first TAI, the first RAC, the first RAI, the first cell identifier, the first gNB-CU identifier, the first gNB identifier, the first RNA identifier, the first RAN area identifier, the first resume identifier, and/or the like. The second parameter may comprise at least one of the second TAC, the second TAI, the second RAC, the second RAI, the second cell identifier, the second gNB-CU identifier, the second gNB identifier, the second RNA identifier, the second RAN area identifier, the second resume identifier, and/or the like. The third parameter may comprise at least one of the third TAC, the third TAI, the third RAC, the third RAI, the third cell identifier, the first gNB-CU identifier, the first gNB identifier, the third RNA identifier, the third RAN area identifier, the third resume identifier, and/or the like. The fourth parameter may comprise at least one of the fourth TAC, the fourth TAI, the fourth RAC, the fourth RAI, the fourth cell identifier, the second gNB-CU identifier, the second gNB identifier, the fourth RNA identifier, the fourth RAN area identifier, the fourth resume identifier, and/or the like.

In an example, the gNB-DU may transmit/broadcast the at least one system information block configured by the gNB-DU and/or received from the first gNB-CU and/or the second gNB-CU (e.g. configured by the first gNB-CU and/or the second gNB-CU). The at least one system information block may be transmitted/broadcasted via radio interface to a plurality of wireless devices.

Figure 42:
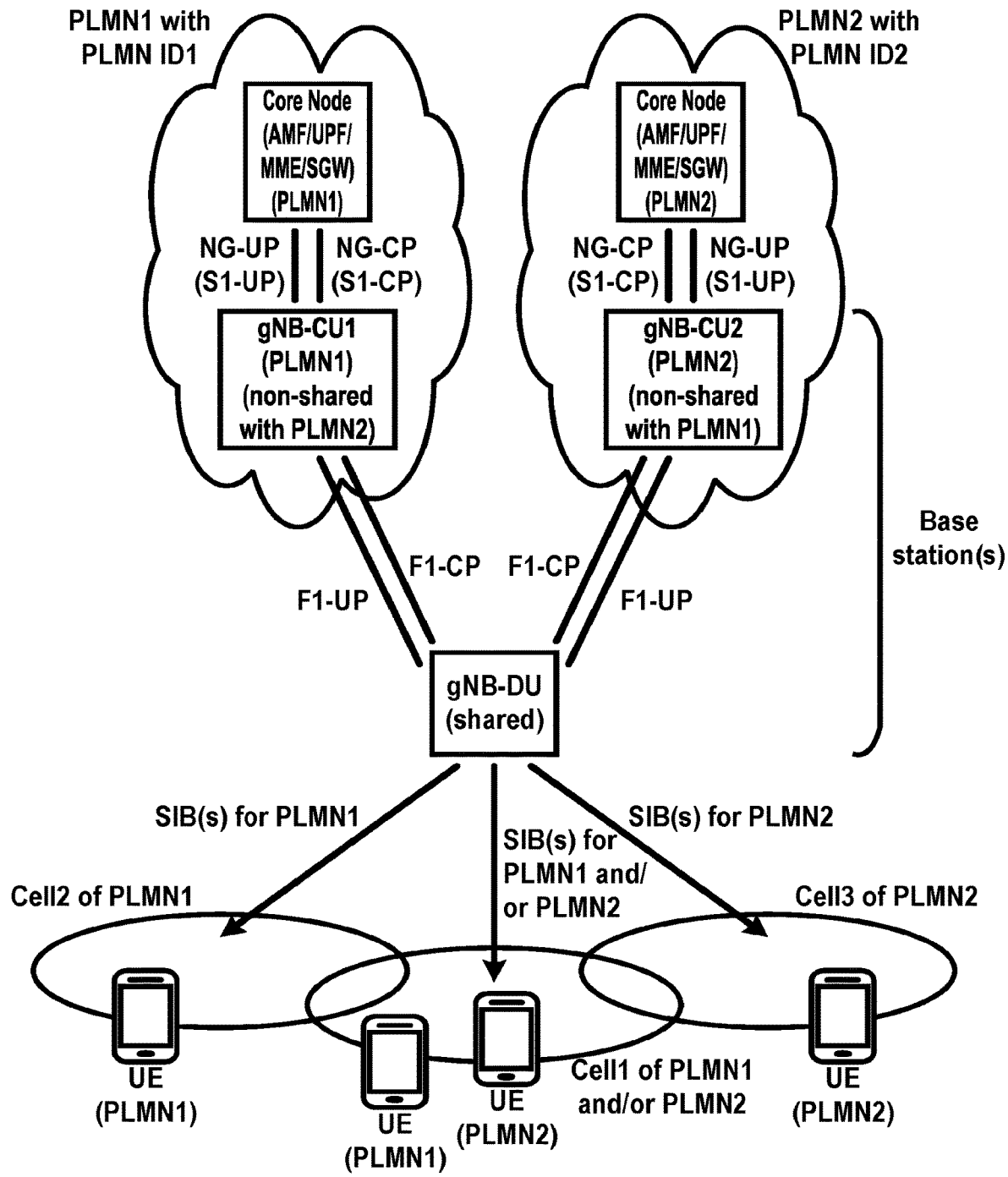
FIG. 42 is an example diagram of an aspect of an embodiment of the present disclosure.

In an example, as shown in example figures, FIG. 41 and/or FIG. 42, separate cells of the gNB-DU may be configured for different PLMNs. In an example, one or more first serving cells of serving cells of the gNB-DU may support (e.g. serve, be part of, provide resources for, and/or the like) the first PLMN (and/or the first gNB-CU and/or the first gNB). At least one message (transmitted/broadcasted via the one or more first cells by the gNB-DU to wireless devices) of the at least one third message may comprise the first PLMN identifier, a first gNB-CU identifier of the first gNB-CU, a first gNB identifier of a first gNB associated with the first gNB-CU, one or more first serving cell identifiers of the one or more first serving cells, and/or the like. In an example, the one or more first serving cell identifiers may be transmitted from the gNB-DU to the first gNB-CU. In an example, one or more second serving cells of serving cells of the gNB-DU may support (e.g. serve, be part of, provide resources for, and/or the like) the second PLMN (and/or the second gNB-CU and/or the second gNB). At least one message (transmitted/broadcasted via the one or more second cells by the gNB-DU to wireless devices) of the at least one third message may comprise the second PLMN identifier, a second gNB-CU identifier of the second gNB-CU, a second gNB identifier of a second gNB associated with the second gNB-CU, one or more second serving cell identifiers of the one or more second serving cells, and/or the like. In an example, the one or more second serving cell identifiers may be transmitted from the gNB-DU to the second gNB-CU.

In an example, as shown in example figures, FIG. 41 and/or FIG. 42, common cells of the gNB-DU may be configured for multiple PLMNs (e.g. the first PLMN and/or the second PLMN; the first gNB-CU and/or the second gNB-CU; and/or the first gNB and/or the second gNB). In an example, one or more third serving cells of serving cells of the gNB-DU may support (e.g. serve, be part of, provide resources for, and/or the like) the first PLMN and the second PLMN (and/or the first gNB-CU and the second gNB-CU). At least one message (transmitted/broadcasted via the one or more third serving cells by the gNB-DU to wireless devices) of the at least one third message may comprise the first PLMN identifier and the second PLMN identifier, a first gNB-CU identifier of the first gNB-CU and a second gNB-CU identifier of the second gNB-CU, a first gNB identifier of the first gNB associated with the first gNB-CU and a second gNB identifier of the second gNB associated with the second gNB-CU, one or more third serving cell identifiers of the one or more third serving cells, (e.g. if different (multiple) cell identifiers for a serving cell are configured for different PLMNs) one or more fourth serving cell identifiers (associated with the first PLMN, the first gNB-CU, and/or the first gNB) of (or for) the one or more third serving cells, (e.g. if different (multiple) cell identifiers for a serving cell are configured for different PLMNs) one or more fifth serving cell identifiers (associated with the second PLMN, the second gNB-CU, and/or the second gNB) of (or for) the one or more third serving cells, and/or the like. In an example, the one or more third serving cell identifiers, the one or more fourth serving cell identifiers, and/or the one or more fifth serving cell identifiers may be transmitted from the gNB-DU to the first gNB-CU. In an example, the one or more third serving cell identifiers, the one or more fourth serving cell identifiers, and/or the one or more fifth serving cell identifiers may be transmitted from the gNB-DU to the second gNB-CU. In an example, the first gNB-CU may configure the one or more fourth serving cell identifiers, and may transmit to the gNB-DU. In an example, the second gNB-CU may configure the one or more fifth serving cell identifiers, and may transmit to the gNB-DU.

In an example, as shown in example figure FIG. 37, at least one system information block (e.g. SIB1, SIB2, SIB3, SIB4, SIB5, and/or the like) may comprise multiple configuration parameters or multiple configured system information blocks for multiple PLMNs (and/or for multiple gNB-CUs). At least one of the first gNB-CU and/or the second gNB-CU may receive parameters of other gNB-CU (e.g. the second gNB-CU or the first gNB-CU respectively) via the gNB-DU, and/or may configure the at least one system information block. In an example, the base station distributed unit may receive, from the second base station central unit, one or more second configuration parameters associated with the second base station central unit and/or the second PLMN. The base station distributed unit may transmit, to the first base station central unit, the one or more second configuration parameters. The base station distributed unit may receive, from the first base station central unit, at least one system information block comprising at least one of: one or more first configuration parameters (e.g. and/or a first system information block) associated with the first base station central unit and/or the first PLMN; and/or the one or more second configuration parameters (e.g. and/or a second system information block) associated with the second base station central unit and/or the second PLMN. The base station distributed unit may transmit (forward/ broadcast) the at least one system information block. The base station distributed unit may transmit, to the second base station central unit, the at least one system information block.

In an example, as shown in example figure FIG. 37, at least one system information block (e.g. SIB1, SIB2, SIB3, SIB4, SIB5, and/or the like) may comprise multiple configuration parameters or multiple configured system information blocks for multiple PLMNs (and/or for multiple gNB-CUs). At least one of the first gNB-CU and/or the second gNB-CU may receive parameters of other gNB-CU (e.g. the second gNB-CU or the first gNB-CU respectively) via an interface between the first gNB-CU and the second gNB-CU, and/or may configure the at least one system information block. In an example, the base station distributed unit may receive, from the first base station central unit, at least one system information block comprising at least one of: one or more first configuration parameters (e.g. and/or a first system information block) associated with the first base station central unit and/or the first PLMN; and/or one or more second configuration parameters (e.g. and/or a second system information block) associated with the second base station central unit and/or the second PLMN. The first base station central unit may receive the one or more second configuration parameters from the second base station central unit (e.g. via an interface between the first gNB-CU and the second gNB-CU). The base station distributed unit may transmit (forward/broadcast) the at least one system information block. In an example, the base station distributed unit may transmit, to the second base station central unit, the at least one system information block.

Figure 38:
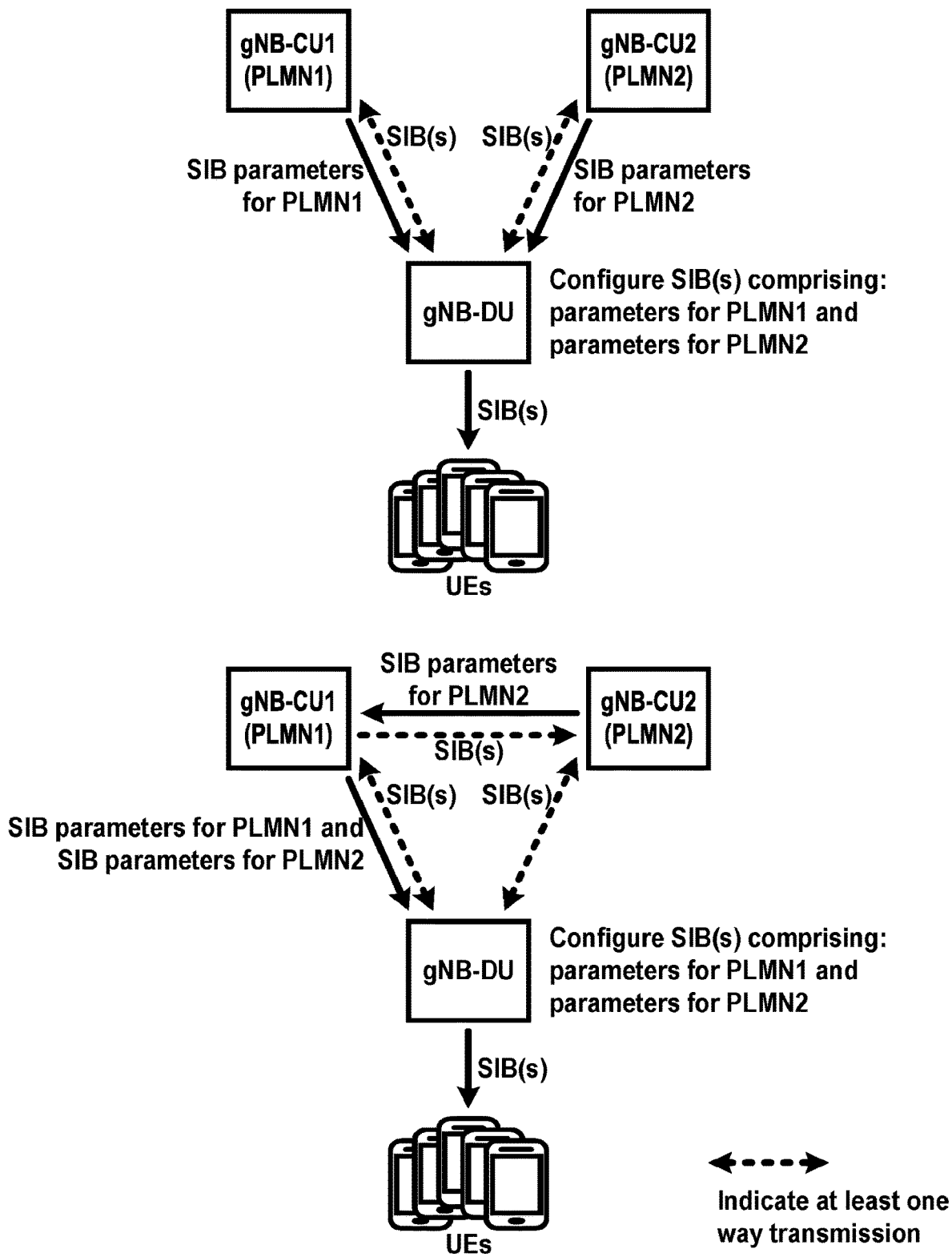
FIG. 38 is an example diagram of an aspect of an embodiment of the present disclosure.

In an example, as shown in example figure FIG. 38, at least one system information block (e.g. SIB1, SIB2, SIB3, SIB4, SIB5, and/or the like) may comprise multiple configuration parameters or multiple configured system information blocks for multiple PLMNs (and/or for multiple gNB-CUs). The gNB-DU may receive, from the first gNB-CU and/or the second gNB-CU, parameters of the first gNB-CU (e.g. the first PLMN) and/or of second gNB-CU (e.g. the second PLMN), and/or may configure the at least one system information block. In an example, the base station distributed unit may receive, from the first base station central unit, one or more first configuration parameters associated with the first base station central unit and/or the first PLMN. The base station distributed unit may receive, from the second base station central unit, one or more second configuration parameters associated with the second base station central unit and/or the second PLMN. The base station distributed unit may determine at least one system information block comprising at least one of: the one or more first configuration parameters (e.g. and/or a first system information block) associated with the first gNB-CU and/or the first PLMN; and/or the one or more second configuration parameters (e.g. and/or a second system information block) associated with the second base station central unit and/or the second PLMN. (In an example, the base station distributed unit may transmit, to the first base station central unit and/or the second base station central unit, the at least one system information block. The base station distributed unit may receive, from the first base station central unit and/or the second base station central unit, the at least one system information block.) In an example, the base station distributed unit may transmit (forward/broadcast) the at least one system information block.

In an example, as shown in example figure FIG. 38, at least one system information block (e.g. SIB1, SIB2, SIB3, SIB4, SIB5, and/or the like) may comprise multiple configuration parameters or multiple configured system information blocks for multiple PLMNs (and/or for multiple gNB-CUs). The gNB-DU may receive, from the first gNB-CU and/or the second gNB-CU, parameters of the first gNB-CU (e.g. the first PLMN) and/or the second gNB-CU (e.g. the second PLMN). In an example, one of the first gNB-CU and the second gNB-CU may receive parameters of other gNB-CU (e.g. the second gNB-CU or the first gNB-CU respectively) via an interface between the first gNB-CU and the second gNB-CU, and/or may transmit to the gNB-DU. The gNB-DU may configure the at least one system information block based on the parameters. In an example, the base station distributed unit may receive, from the first base station central unit, at least one of: one or more first configuration parameters associated with the first base station central unit and/or the first PLMN; and/or one or more second configuration parameters associated with the second base station central unit and/or the second PLMN. The first base station central unit may receive the one or more second configuration parameters from the second base station central unit. The base station distributed unit may determine at least one system information block comprising the one or more first configuration parameters (e.g. and/or a first system information block) associated with the first base station central unit and/or the first PLMN and/or the one or more second configuration parameters (e.g. and/or a second system information block) associated with the second base station central unit and/or the second PLMN. (In an example, the base station distributed unit may transmit, to the first base station central unit and/or the second base station central unit, the at least one system information block. The base station distributed unit may receive, from the first base station central unit and/or the second base station central unit, the at least one system information block.) In an example, the base station distributed unit may transmit (forward/broadcast) the at least one system information block.

In an example, as shown in example figure FIG. 39, at least one system information block (e.g. SIB1, SIB2, SIB3, SIB4, SIB5, and/or the like) may comprise configuration parameters (e.g. (partially) common and/or (partially) separated) for multiple PLMNs (and/or for multiple gNB-CUs). At least one of the first gNB-CU and/or the second gNB-CU may receive parameters of other gNB-CU (e.g. the second gNB-CU or the first gNB-CU respectively) via the gNB-DU, and/or may configure the at least one system information block. In an example, the base station distributed unit may receive, from the second base station central unit, one or more second configuration parameters associated with the second base station central unit and/or the second PLMN. The base station distributed unit may transmit, to the first base station central unit, the one or more second configuration parameters. The base station distributed unit may receive, from the first base station central unit, at least one system information block comprising one or more configuration parameters associated with the first PLMN and/or the second PLMN (and/or associated with the first base station central unit and/or the second base station central unit). The base station distributed unit may transmit (forward/broadcast) the at least one system information block. The base station distributed unit may transmit, to the second base station central unit, the at least one system information block.

In an example, as shown in example figure FIG. 39, at least one system information block (e.g. SIB1, SIB2, SIB3, SIB4, SIB5, and/or the like) may comprise configuration parameters (e.g. (partially) common and/or (partially) separated) for multiple PLMNs (and/or for multiple gNB-CUs). At least one of the first gNB-CU and/or the second gNB-CU may receive parameters of other gNB-CU (e.g. the second gNB-CU or the first gNB-CU respectively) via an interface between the first gNB-CU and the second gNB-CU, and/or may configure the at least one system information block. In an example, the base station distributed unit may receive, from the first base station central unit, at least one system information block comprising one or more configuration parameters associated with the first PLMN and/or the second PLMN (and/or associated with the first base station central unit and/or the second base station central unit). The base station distributed unit may transmit (forward/broadcast) the at least one system information block. The base station distributed unit may transmit, to the second base station central unit, the at least one system information block.

Figure 40:
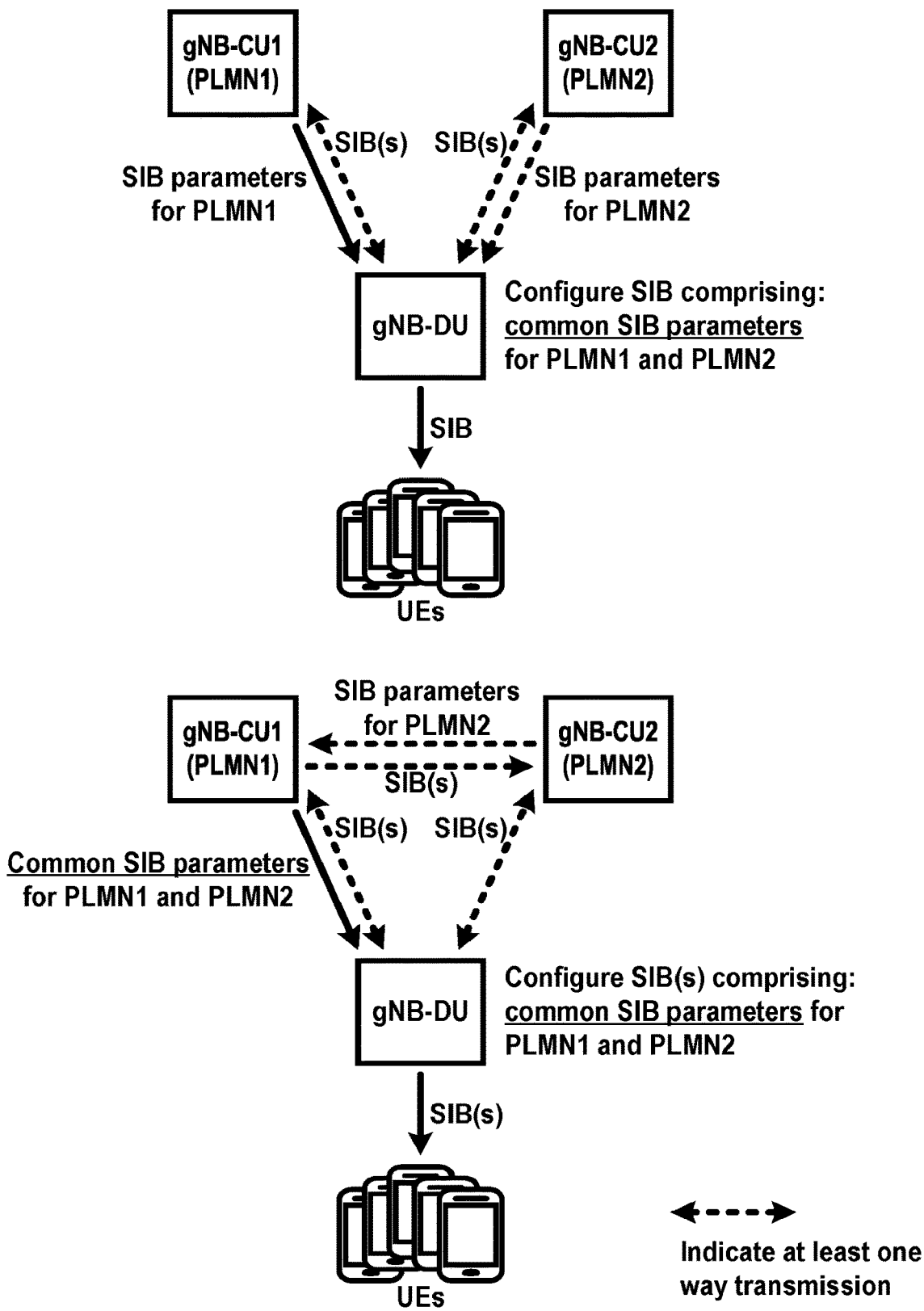
FIG. 40 is an example diagram of an aspect of an embodiment of the present disclosure.

In an example, as shown in example figure FIG. 40, at least one system information block (e.g. SIB1, SIB2, SIB3, SIB4, SIB5, and/or the like) may comprise configuration parameters (e.g. (partially) common and/or (partially) separated) for multiple PLMNs (and/or for multiple gNB-CUs). The gNB-DU may receive, from the first gNB-CU and/or the second gNB-CU, parameters of the first gNB-CU (e.g. the first PLMN) and/or of second gNB-CU (e.g. the second PLMN), and/or may configure the at least one system information block. In an example, the base station distributed unit may receive, from the first base station central unit, one or more first configuration parameters associated with the first base station central unit and/or the first PLMN, and/or may receive, from the second base station central unit, one or more second configuration parameters associated with the second base station central unit and/or the second PLMN. In an example, the base station distributed unit may determine, based on the one or more first configuration parameters and/or the one or more second configuration parameters, at least one system information block comprising one or more configuration parameters associated with the first PLMN and/or the second PLMN (and/or associated with the first base station central unit and/or the second base station central unit). (In an example, the base station distributed unit may transmit, to the first base station central unit and/or the second base station central unit, the at least one system information block. The base station distributed unit may receive, from the first base station central unit and/or the second base station central unit, the at least one system information block.) In an example, the base station distributed unit may transmit (forward/broadcast) the at least one system information block.

In an example, as shown in example figure FIG. 40, at least one system information block (e.g. SIB1, SIB2, SIB3, SIB4, SIB5, and/or the like) may comprise configuration parameters (e.g. (partially) common and/or (partially) separated) for multiple PLMNs (and/or for multiple gNB-CUs). The gNB-DU may receive, from the first gNB-CU and/or the second gNB-CU, parameters of the first gNB-CU (e.g. the first PLMN) and/or the second gNB-CU (e.g. the second PLMN). In an example, one of the first gNB-CU and the second gNB-CU may receive parameters of other gNB-CU (e.g. the second gNB-CU or the first gNB-CU respectively) via an interface between the first gNB-CU and the second gNB-CU, and/or may transmit to the gNB-DU. The gNB-DU may configure the at least one system information block based on the parameters. In an example, the base station distributed unit may receive, from the first base station central unit, at least one of: one or more first configuration parameters associated with the first base station central unit and/or the first PLMN; and/or one or more second configuration parameters associated with the second base station central unit or the second PLMN. The first base station central unit may receive the one or more second configuration parameters from the second base station central unit. The base station distributed unit may determine, based on the one or more first configuration parameters and/or the one or more second configuration parameters, at least one system information block comprising one or more configuration parameters associated with the first PLMN and/or the second PLMN (or associated with the first base station central unit and/or the second base station central unit). (In an example, the base station distributed unit may transmit, to the first base station central unit and/or the second base station central unit, the at least one system information block. The base station distributed unit may receive, from the first base station central unit and/or the second base station central unit, the at least one system information block.) In an example, the base station distributed unit may transmit (forward/broadcast) the at least one system information block.

In an example, a wireless device may select a serving cell of the gNB-DU based on the at least one third message and/or the at least one system information block. The wireless device may select/reselect the serving cell of the gNB-DU based on the first PLMN identifier and/or the second PLMN identifier of the at least one third message. The wireless device may select/reselect the serving cell of the gNB-DU based on the first cell identifier, the second cell identifier, the third cell identifier, and/or the fourth cell identifier for the serving cell of the at least one third message. The wireless device may select/reselect the serving cell of the gNB-DU based on the first gNB-CU identifier and/or the second gNB-CU identifier of the at least one third message. The wireless device may select/reselect the serving cell of the gNB-DU based on the first gNB identifier associated with the first gNB-CU and/or the second gNB identifier associated with the second gNB-CU of the at least one third message.

In an example, the wireless device may select/reselect the serving cell of the gNB-DU based on one or more elements of the first parameter, the second parameter, the third parameter, and/or the fourth parameter of the at least one third message. The first parameter may comprise at least one of the first TAC, the first TAI, the first RAC, the first RAI, the first cell identifier, the first gNB-CU identifier, the first gNB identifier, the first RNA identifier, the first RAN area identifier, the first resume identifier, and/or the like. The second parameter may comprise at least one of the second TAC, the second TAI, the second RAC, the second RAI, the second cell identifier, the second gNB-CU identifier, the second gNB identifier, the second RNA identifier, the second RAN area identifier, the second resume identifier, and/or the like. The third parameter may comprise at least one of the third TAC, the third TAI, the third RAC, the third RAI, the third cell identifier, the first gNB-CU identifier, the first gNB identifier, the third RNA identifier, the third RAN area identifier, the third resume identifier, and/or the like. The fourth parameter may comprise at least one of the fourth TAC, the fourth TAI, the fourth RAC, the fourth RAI, the fourth cell identifier, the second gNB-CU identifier, the second gNB identifier, the fourth RNA identifier, the fourth RAN area identifier, the fourth resume identifier, and/or the like. In an example, the wireless device may be in an RRC idle state, an RRC inactive state, and/or an RRC connected state.

In an example, the wireless device may have a list of PLMN identifiers of PLMNs allowed (and/or able) to access (e.g. the list of PLMN identifiers may comprise a PLMN identifier of an equivalent PLMN). In response to at least one of the first PLMN and/or the second PLMN being in the list of the PLMNs allowed to access (e.g. and/or the first PLMN and/or the second PLMN may comprise an equivalent PLMN), the wireless device may select (and/or reselect) the serving cell of the gNB-DU. In an example, the wireless device may have a list of cell identifiers of cells allowed (and/or able) to access. In response to at least one of the first cell identifier, the second cell identifier, the third cell identifier, and/or the fourth cell identifier being in the list of the cell identifiers of the cells allowed to access, the wireless device may select (and/or reselect) the serving cell of the gNB-DU. In an example, the wireless device may have a list of networks (e.g. TAC, TAI, RAC, RAI, gNB-CU, gNB, RNA, RAN area, and/or resume identifier) allowed (and/or able) to access. In response to at least one element of the first parameter, the second parameter, the third parameter, and/or the fourth parameter being in the list of the networks allowed to access, the wireless device may select (and/or reselect) the serving cell of the gNB-DU.

In an example, based on the selection of the serving cell of the gNB-DU by the wireless device, the wireless device may initiate one or more random access procedures to access to the serving cell of the gNB-DU. The wireless device may transmit one or more random access preambles via the serving cell, and may receive at least one random access response (RAR) for the one or more random access preambles via the serving cell from the gNB-DU. In an example, the wireless device may determine that one of the one or more random access procedures is on processing and/or successful based on interactions (comprising at least one of the one or more random access preambles and/or the at least one random access response) with the gNB-DU.

In an example, based on the selection of the serving cell of the gNB-DU by the wireless device and/or based on the one or more random access procedures of the wireless device, the gNB-DU may receive, from the wireless device, a first message (e.g. RRC message, RRC connection request message, RRC connection setup complete message, RRC connection resume request message, RRC connection resume complete message, and/or the like). In an example, in response to receiving the at least one RAR for the one or more random access preambles, the wireless device may transmit the first message (e.g. RRC connection request message and/or RRC connection resume request message; e.g. message3). The first message may comprise at least one of the first PLMN identifier (e.g. indicating that the wireless device is accessible to the first PLMN) and/or the second PLMN identifier (e.g. indicating that the wireless device is accessible to the second PLMN). In an example, the first PLMN identifier may comprise a first indication/index (e.g., one or more first bits) indicating the first PLMN. In an example, the second PLMN identifier may comprise a second indication/index (e.g., one or more second bits) indicating the second PLMN. In an example, the first message may comprise at least one of the first cell identifier (e.g. indicating that the wireless device is accessible/tries to access to the first cell and/or the first PLMN), the second cell identifier (e.g. indicating that the wireless device is accessible/tries to access to the second cell and/or the second PLMN), the third cell identifier (e.g. indicating that the wireless device is accessible/tries to access to the third cell and/or the first gNB-CU/the first gNB), and/or the fourth cell identifier (e.g. indicating that the wireless device is accessible/tries to access to the fourth cell and/or the second gNB-CU/the second gNB). The wireless device may send the first message based on the at least one third message and/or the at least one system information block. The wireless device may determine the first PLMN and/or the second PLMN based on the third message and/or the at least one system information block. Based on the determining, the wireless device may include/add the first PLMN identifier (e.g., or the first cell identifier) and/or the second PLMN identifier (e.g., or the second cell identifier) in the first message.

In an example, the first message may comprise at least one of one or more of the first parameter, one or more of the second parameter, one or more of the third parameter, and/or one or more of the fourth parameter. The one or more of the first parameter may indicate that the first message is for connection to the first PLMN and/or a network (e.g. tracking area, registration area, RNA, RAN area, and/or the like) associated with the first PLMN. The one or more of the second parameter may indicate that the first message is for connection to the second PLMN and/or a network (e.g. tracking area, registration area, RNA, RAN area, and/or the like) associated with the second PLMN. The one or more of the third parameter may indicate that the first message is for connection to the first gNB-CU/the first gNB and/or a network (e.g. tracking area, registration area, RNA, RAN area, and/or the like) associated with the first gNB-CU/the first gNB. The one or more of the fourth parameter may indicate that the first message is for connection to the second gNB-CU/the second gNB and/or a network (e.g. tracking area, registration area, RNA, RAN area, and/or the like) associated with the second gNB-CU/the second gNB.

In an example, if the wireless device selects the serving cell and the first PLMN to access, the first message may comprise at least one of the first PLMN identifier, the first cell identifier (and/or the third cell identifier), the first gNB identifier, the first gNB-CU identifier, the first TAC, the first TAI, the first RAC, the first RAI, the first RNA identifier, the first RAN area identifier, the first resume identifier, and/or the like.

In an example, if the wireless device selects the serving cell and the second PLMN to access, the first message may comprise at least one of the second PLMN identifier, the second cell identifier (and/or the fourth cell identifier), the second gNB identifier, the second gNB-CU identifier, the second TAC, the second TAI, the second RAC, the second RAI, the second RNA identifier, the second RAN area identifier, the second resume identifier, and/or the like.

In an example, if the wireless device selects the serving cell and the first gNB-CU and/or the first gNB to access, the first message may comprise at least one of the first PLMN identifier, the third cell identifier (and/or the first cell identifier), the first gNB identifier, the first gNB-CU identifier, the third TAC, the third TAI, the third RAC, the third RAI, the third RNA identifier, the third RAN area identifier, the third resume identifier, and/or the like.

In an example, if the wireless device selects the serving cell and the second gNB-CU and/or the second gNB to access, the first message may comprise at least one of the second PLMN identifier, the fourth cell identifier (and/or the second cell identifier), the second gNB identifier, the second gNB-CU identifier, the fourth TAC, the fourth TAI, the fourth RAC, the fourth RAI, the fourth RNA identifier, the fourth RAN area identifier, the fourth resume identifier, and/or the like.

In an example, at least one of the first PLMN identifier, the first cell identifier, the first gNB identifier, at least one of the first gNB-CU identifier, the first TAC, the first TAI, the first RAC, the first RAI, the first RNA identifier, the first RAN area identifier, the first resume identifier, the second PLMN identifier, the second cell identifier, the second gNB identifier, the second gNB-CU identifier, the second TAC, the second TAI, the second RAC, the second RAI, the second RNA identifier, the second RAN area identifier, the second resume identifier, the third cell identifier, the third TAC, the third TAI, the third RAC, the third RAI, the third RNA identifier, the third RAN area identifier, the third resume identifier, the fourth cell identifier, the fourth TAC, the fourth TAI, the fourth RAC, the fourth RAI, the fourth RNA identifier, the fourth RAN area identifier, and/or the fourth resume identifier may be transmitted from the wireless device to the gNB-DU (e.g. the base station) via MAC control element (e.g. MAC CE) and/or physical layer control information (e.g. UCI) with the first message.

In an example, a selected PLMN identity (identifier) information element of the first message may comprise the at least one of the first PLMN identifier and/or the second PLMN identifier. In an example, if the wireless device is allowed (and/or accessible, able, authorized) to access to (and/or employ) the first PLMN, the first message may comprise the first PLMN identifier. In an example, if the wireless device is allowed (and/or accessible, able, authorized) to access to (and/or employ) the second PLMN, the first message may comprise the second PLMN identifier (e.g. and/or the first cell identifier (and/or the third cell identifier), the first gNB identifier, the first gNB-CU identifier, the first TAC, the first TAI, the first RAC, the first RAI, the first RNA identifier, the first RAN area identifier, the first resume identifier, and/or the like). In an example, if the wireless device is allowed (and/or accessible, able, authorized) to access to (and/or employ) the first PLMN and the second PLMN, the first message may comprise the first PLMN identifier and the second PLMN identifier (e.g. and/or the second cell identifier (and/or the fourth cell identifier), the second gNB identifier, the second gNB-CU identifier, the second TAC, the second TAI, the second RAC, the second RAI, the second RNA identifier, the second RAN area identifier, the second resume identifier, and/or the like). In an example, if the wireless device is allowed (and/or accessible, able, authorized) to access to (and/or employ) the first PLMN and the second PLMN, the first message may further comprise a priority information between the first PLMN and the second PLMN.

In an example, the first message may comprise an RRC message. In an example, the first message may comprise at least one of a wireless device identifier (e.g. TMSI, S-TMSI, IMSI, C-RNTI, RNTI, Resume ID, and/or the like) of the wireless device, a counter check response message, a CSFB parameters request CDMA2000 message, an in-device coexistence (IDC) indication message, an inter frequency RSTD measurement indication message, an MBMS counting response message, an MBMS interest indication message, a measurement report message, a proximity indication message, a relay node reconfiguration complete message, an RRC connection reconfiguration complete message, an RRC connection reestablishment request message, an RRC connection reestablishment complete message, an RRC connection request message, an RRC connection setup complete message, an RRC connection resume request message, an RRC connection resume complete message, a secondary cell group (SCG) failure information (NR) message, a security mode complete message, a sidelink UE information message, a UE assistance information message, a UE capability information message, a UE information response message, a UE handover preparation transfer message, an uplink information transfer message (e.g. comprising at least one NAS message), an uplink information transfer MRDC message, a WLAN connection status report message, and/or an RRC message associated with the wireless device.

In an example, the first message may comprise at least one of a registered core network node information (e.g. a registered mobility management entity (MME), a registered access and mobility management function (AMF), a registered session management function (SMF), a registered serving gateway (SGW), a registered user plane function (UPF), a registered PDN gateway (PGW), and/or the like), a registered (e.g. preferred) base station information (e.g. registered base station identifier, a registered gNB, a registered gNB identifier, the first gNB identifier, the second gNB identifier, a first eNB identifier, a second eNB identifier, and/or the like), a registered (e.g. preferred) gNB-CU information (e.g. a gNB-CU identifier, the first gNB-CU identifier, the second gNB-CU identifier, and/or the like), a dedicated non-access stratum information (e.g. information between a core network (MME/AMF/SMF) and the wireless device), a RAN notification area identifier, a RAN area information associated with the wireless device (e.g. in an RRC inactive state), a GUMMEI type (e.g. native, mapped), a radio link failure information available information, a relay node subframe configuration request, mobility status information (e.g. moving speed of the wireless device, for example, high/medium/low/normal/static speed), a mobility history available information (e.g. list of cells at which the wireless device stayed), a logged measurement result available information (e.g. associated with MBSFN), a wireless device identifier (e.g. S-TMSI, IMSI, TMSI, and/or the like) of the wireless device, a resume identifier (e.g. resume ID) of the wireless device (e.g. in an RRC inactive state), an information of attach-without-PDN-connectivity, an user plane cellular Internet-of-things (CIoT) optimization information (e.g. indicating data transmission based on user plane CIoT optimization), an control plane cellular Internet-of-things (CIoT) optimization information (e.g. indicating data transmission based on control plane CIoT optimization), a dcn identifier (e.g. dcn ID), a registered MME (e.g. comprising a PLMN identity (the first PLMN identifier and/or the second PLMN identifier), MMEGI, MMEC, and/or the like), and/or the like.

In an example, in response to receiving the first message, the gNB-DU may select a central unit (e.g. as a selected gNB-CU) (e.g. between the first gNB-CU and the second gNB-CU) based on the first message. In an example, in response to receiving the first message, the gNB-DU may select a central unit (e.g. as a selected gNB-CU) at least between the first gNB-CU and the second gNB-CU based on the at least one of the first PLMN identifier and/or the second PLMN identifier of the first message. In an example, if the first message comprises the first PLMN identifier (e.g. indicates that the wireless device is allowed (and/or accessible, able, authorized) to access to (and/or employ) the first PLMN), the gNB-DU may select the first gNB-CU to forward the first message and/or one or more elements of the first message. In an example, if the first message comprises the second PLMN identifier (e.g. indicates that the wireless device is allowed (and/or accessible, able, authorized) to access to (and/or employ) the second PLMN), the gNB-DU may select the second gNB-CU to forward the first message and/or one or more elements of the first message. In an example, if the first message comprises the first PLMN identifier and the second PLMN identifier (e.g. indicates that the wireless device is allowed (and/or accessible, able, authorized) to access to (and/or employ) the first PLMN and the second PLMN), the gNB-DU may select one of the first gNB-CU or the second gNB-CU to forward the first message and/or one or more elements of the first message (e.g. based on the priority information of the first PLMN and the second PLMN indicated in the first message).

In an example, in response to receiving the first message, the gNB-DU may select a central unit (e.g. as a selected gNB-CU) at least between the first gNB-CU and the second gNB-CU based on the at least one of first PLMN related parameters and/or second PLMN related parameters of the first message. In an example, if the first message comprises at least one of the first PLMN identifier, the first cell identifier (and/or the third cell identifier), the first gNB identifier, the first gNB-CU identifier, the first TAC, the first TAI, the first RAC, the first RAI, the first RNA identifier, the first RAN area identifier, the first resume identifier, and/or the like (e.g. indicating that the wireless device is allowed (and/or accessible, able, authorized) to access to (and/or employ) the first PLMN and/or the serving cell), the gNB-DU may select the first gNB-CU to forward the first message and/or one or more elements of the first message. In an example, if the first message comprises at least one of the second PLMN identifier, the second cell identifier (and/or the fourth cell identifier), the second gNB identifier, the second gNB-CU identifier, the second TAC, the second TAI, the second RAC, the second RAI, the second RNA identifier, the second RAN area identifier, the second resume identifier, and/or the like (e.g. indicating that the wireless device is allowed (and/or accessible, able, authorized) to access to (and/or employ) the second PLMN and/or the serving cell), the gNB-DU may select the second gNB-CU to forward the first message and/or one or more elements of the first message.

In an example, in response to receiving the first message, the gNB-DU may select a central unit (e.g. as a selected gNB-CU) at least between the first gNB-CU and the second gNB-CU based on the at least one of first gNB-CU related parameters (e.g. first gNB related parameters) and/or second gNB-CU related parameters (e.g. second gNB related parameters) of the first message. In an example, if the first message comprises at least one of the first PLMN identifier, the third cell identifier (and/or the first cell identifier), the first gNB identifier, the first gNB-CU identifier, the third TAC, the third TAI, the third RAC, the third RAI, the third RNA identifier, the third RAN area identifier, the third resume identifier, and/or the like (e.g. indicating that the wireless device is allowed (and/or accessible, able, authorized) to access to (and/or employ) the first gNB-CU/the first gNB and/or the serving cell), the gNB-DU may select the first gNB-CU to forward the first message and/or one or more elements of the first message. In an example, if the first message comprises at least one of the second PLMN identifier, the fourth cell identifier (and/or the second cell identifier), the second gNB identifier, the second gNB-CU identifier, the fourth TAC, the fourth TAI, the fourth RAC, the fourth RAI, the fourth RNA identifier, the fourth RAN area identifier, the fourth resume identifier, and/or the like (e.g. indicating that the wireless device is allowed (and/or accessible, able, authorized) to access to (and/or employ) the second gNB-CU/the second gNB and/or the serving cell), the gNB-DU may select the second gNB-CU to forward the first message and/or one or more elements of the first message.

In an example, in response to receiving the first message, the gNB-DU may select a central unit (e.g. as a selected gNB-CU) at least between the first gNB-CU and the second gNB-CU based on the serving cell via which the wireless device transmits the first message to the gNB-DU. In an example, if the gNB-DU receives the first message via the one or more first serving cells (e.g. supporting the first PLMN and/or the first gNB-CU/the first gNB), the gNB-DU may select the first gNB-CU to forward the first message and/or one or more elements of the first message. In an example, if the gNB-DU receives the first message via the one or more second serving cells (e.g. supporting the second PLMN and/or the second gNB-CU/the second gNB), the gNB-DU may select the second gNB-CU to forward the first message and/or one or more elements of the first message. In an example, if the gNB-DU receives the first message via the one or more third serving cells (e.g. supporting the first PLMN and the second PLMN; and/or supporting the first gNB-CU/the first gNB and the second gNB-CU/the second gNB), the gNB-DU may select the first gNB-CU and/or the second gNB-CU to forward the first message and/or one or more elements of the first message (e.g. the gNB-DU may transmit/forward the first message to the first gNB-CU and/or the second gNB-CU (e.g. to either the first gNB-CU or the second gNB-CU; or to both the first gNB-CU and the second gNB-CU)).

In an example, the gNB-DU may select a central unit (gNB-CU) between the first gNB-CU and the second gNB-CU based on one or more elements of the first message (e.g. the registered core network node information, the registered (preferred) base station information, the registered (e.g. preferred) gNB-CU information, the RAN notification area identifier, the RAN area information, and/or the like). In an example, if the one or more elements of the first message are associated with the first gNB-CU/the first gNB and/or the first PLMN, the gNB-DU may select the first gNB-CU to forward the first message and/or one or more elements of the first message. In an example, if the one or more elements of the first message are associated with the second gNB-CU/the second gNB and/or the second PLMN, the gNB-DU may select the second gNB-CU to forward the first message and/or one or more elements of the first message. In an example, if a registered core network node of the registered core network node information (e.g. MME, AMF, SMF, UPF, SGW, PGW, and/or the like) is connected to (e.g. serve, operate, control, has an NG/S1 interface with, and/or the like) the first gNB-CU/the first gNB, the gNB-DU may select the first gNB-CU to forward the first message and/or one or more elements of the first message. In an example, if a registered core network node of the registered core network node information (e.g. MME, AMF, SMF, UPF, SGW, PGW, and/or the like) is connected to (e.g. serve, operate, control, has an NG/S1 interface with, and/or the like) the second gNB-CU/the second gNB, the gNB-DU may select the second gNB-CU to forward the first message and/or one or more elements of the first message.

In an example, if a registered base station (e.g. gNB, eNB, RNC, and/or the like) of the registered (preferred) base station information comprises (e.g. is associated with) the first gNB-CU identifier/the first gNB identifier, the gNB-DU may select the first gNB-CU to forward the first message and/or one or more elements of the first message. In an example, if a registered base station (e.g. gNB, eNB, RNC, and/or the like) of the registered (preferred) base station information comprises (e.g. is associated with) the second gNB-CU identifier/the second gNB identifier, the gNB-DU may select the first gNB-CU (or the second gNB-CU correspondingly) to forward the first message and/or one or more elements of the first message.

In an example, if a registered gNB-CU of the registered (e.g. preferred) gNB-CU information comprises the first gNB-CU, the gNB-DU may select the first gNB-CU to forward the first message and/or one or more elements of the first message. In an example, if a registered gNB-CU of the registered (e.g. preferred) gNB-CU information comprises the second gNB-CU, the gNB-DU may select the second gNB-CU to forward the first message and/or one or more elements of the first message.

In an example, if a RAN notification area of the RAN notification area identifier and/or a RAN area of the RAN area information comprise(s) the first gNB-CU/the first gNB, the gNB-DU may select the first gNB-CU to forward the first message and/or one or more elements of the first message. In an example, if a RAN notification area of the RAN notification area identifier and/or a RAN area of the RAN area information comprise(s) the second gNB-CU/the second gNB, the gNB-DU may select the second gNB-CU to forward the first message and/or one or more elements of the first message.

In an example, based on the selection of a gNB-CU based on the first message and/or one or more elements of the first message, the gNB-DU may transmit (e.g. forward) the first message to the selected gNB-CU (e.g. the first gNB-CU and/or the second gNB-CU). In an example, based on the selection of a gNB-CU based on the first message and/or one or more elements of the first message, the gNB-DU may transmit (e.g. forward) one or more elements of the first message to the selected gNB-CU (e.g. the first gNB-CU and/or the second gNB-CU). In an example, the gNB-DU may transmit, to the selected gNB-CU, the first message and/or the one or more elements of the first message via an F1 interface (e.g. at least one of the at least one first F1 interface (the first F1-CP) and/or the at least one second F1 interface (the second F1-CP). In an example, the F1 interface may comprise a F1 control plane interface. In an example, if the selected gNB-CU is the first gNB-CU, the gNB-DU may transmit (forward) the first message and/or the one or more elements of the first message to the first gNB-CU via the at least one first F1 interface (e.g. the first F1-CP). In an example, if the selected gNB-CU is the second gNB-CU, the gNB-DU may transmit (forward) the first message and/or the one or more elements of the first message to the second gNB-CU via the at least one second F1 interface (e.g. the second F1-CP).

In an example, the gNB-DU may transmit, to the selected gNB-CU (e.g. the first gNB-CU and/or the second gNB-CU), the first message and/or the one or more elements of the first message via one or more first F1 messages. In an example, the one or more first F1 messages may comprise at least one of an uplink (UL) RRC message transfer message, an initial UE context setup request message, an initial UE context message, a UE context setup response message, a UE context setup failure message, a UE context release request message, a UE context release complete message, a UE context modification response message, a UE context modification failure message, a UE context modification required message, an F1 message transmitted from the gNB-DU to the selected gNB-CU, and/or the like.

In an example, the one or more first F1 messages may comprise at least one of the first message, one or more elements of the first message, a UE identifier of the wireless device (e.g. gNB-CU UE F1-AP ID, gNB-DU UE F1AP ID, old gNB-DU UE F1 AP ID, IMSI, TMSI, S-TMSI, C-RNTI, and/or the like), the resume identifier (ID) received via the first message, a signaling radio bearer (SRB) identifier associated with the first message, an RRC container comprising the first message and/or one or more elements of the first message, DU to CU RRC information, one or more success (accepted) bearer identifiers of one or more success (accepted) bearers (e.g. data radio bearers (DRBs), and/or signaling radio bearers (SRBs)) to setup/modify, one or more downlink tunnel endpoint identifiers (e.g. TEID, GTP TEID) for the one or more success (accepted) bearers, one or more failed bearer identifiers of one or more failed bearers (e.g. data radio bearers (DRBs), and/or signaling radio bearers (SRBs)) to setup/modify, cause information of the one or more failed bearers, one or more success (accepted) cell identifiers of one or more success (accepted) cells (e.g. secondary cells, secondary cell group, a SpCell, a master cell, PUCCH secondary cells, a PUCCH cell, and/or the like) to setup/modify, one or more failed cell identifiers of one or more failed cells (e.g. secondary cells, secondary cell group, a SpCell, a master cell, PUCCH secondary cells, a PUCCH cell, and/or the like) to setup/modify, cause information of the one or more failed cells, a resource coordination transfer container, one or more bearer identifiers of one or more bearers (e.g. data radio bearers (DRBs), and/or signaling radio bearers (SRBs)) required to be modified/released, cause information of the one or more bearers required to be modified/released, one or more cell identifiers of one or more cells (e.g. secondary cells, secondary cell group, a SpCell, a master cell, PUCCH secondary cells, a PUCCH cell, and/or the like) required to be modified/released, cause information of the one or more cells required to be modified/released, and/or the like.

In an example, in response to receiving the first message and/or the one or more elements of the first message from the gNB-DU via the F1 interface and/or via the one or more first F1 messages, the selected gNB-CU (e.g. the first gNB-CU and/or the second gNB-CU) may transmit, to the gNB-DU and via the F1 interface and/or via one or more second F1 messages, a response message comprising a downlink RRC message and/or one or more elements for a downlink RRC message associated with the wireless device. In an example, the one or more second F1 messages may comprise at least one of a downlink (DL) RRC message transfer message, an initial UE context setup response message, an initial UE context message, a UE context setup request message, a UE context release command message, a UE context modification request message, a UE context modification confirm message, an F1 message transmitted from the selected gNB-CU to the gNB-DU, and/or the like. In an example, the selected gNB-CU may configure the response message and/or one or more elements of the response message based on the first message and/or the one or more elements of the first message.

In an example, the one or more second F1 messages may comprise at least one of the response message (e.g. the downlink RRC message), one or more elements of the response message (e.g. the downlink RRC message), a UE identifier of the wireless device (e.g. gNB-CU UE F1-AP ID, gNB-DU UE F1AP ID, old gNB-DU UE F1 AP ID, IMSI, TMSI, S-TMSI, C-RNTI, and/or the like), a signaling radio bearer (SRB) identifier associated with the response message, an RRC container comprising the response message and/or one or more elements of the response message, CU to DU RRC information, one or more bearer identifiers of one or more bearers (e.g. data radio bearers (DRBs), and/or signaling radio bearers (SRBs)) to setup/modify, one or more uplink tunnel endpoint identifiers (e.g. TEID, GTP TEID) for the one or more bearers, one or more release bearer identifiers of one or more release bearers (e.g. data radio bearers (DRBs), and/or signaling radio bearers (SRBs)) to release, cause information of the one or more release bearers, one or more cell identifiers of one or more cells (e.g. secondary cells, secondary cell group, a SpCell, a master cell, PUCCH secondary cells, a PUCCH cell, and/or the like) to setup/modify, one or more release cell identifiers of one or more release cells (e.g. secondary cells, secondary cell group, a SpCell, a master cell, PUCCH secondary cells, a PUCCH cell, and/or the like) to release, cause information of the one or more release cells, a resource coordination transfer container, and/or the like.

In an example, the response message (e.g. the downlink RRC message) may comprise at least one of a counter check message, a downlink information transfer message, a handover from NR/EUTRA preparation request message, a logged measurement configuration message, a master information block message, a master information block MBMS message, an MBMS counting request, an MBSFN area configuration message, a mobility from NR/EUTRA command message, a paging message, a relay node reconfiguration message, an RRC connection reconfiguration message, an RRC connection reestablishment message, an RRC connection reestablishment reject message, an RRC connection release message, an RRC connection resume message, an RRC connection setup message, an SCPTM configuration (e.g. BR) message, a security mode command message, a system information block, a system information block type 1, a system information block type 1 MBMS, a UE capability inquiry message, a UE information request message, and/or an RRC message associated with the wireless device. In an example, the gNB-DU may transmit/forward the response message and/or one or more elements of the response message (e.g. the downlink RRC message) to the wireless device via radio interface.

In an example, the response message may comprise at least one of an rrc-transactionidentifier information element (IE), a radio resource configuration dedicated IE comprising one or more radio resource configuration parameters, measurement configuration parameters, mobility control information parameters, one or more NAS layer parameters, security parameters, antenna information parameters, secondary cell addition/modification parameters, secondary cell release parameters, WLAN configuration parameters, WLAN offloading configuration parameters, LWA configuration parameters, LWIP configuration parameters, RCLWI configuration parameters, sidelink configuration parameters, V2X configuration parameters, uplink transmission power configuration parameters (e.g. p-MAX, p-MeNB, p-SeNB), a power control mode information element, secondary cell group configuration parameters, and/or the like.

In an example, the selected gNB-CU (e.g. the first gNB-CU and/or the second gNB-CU) may configure one or more elements of the response message. In an example, the gNB-DU may configure one or more elements of the response message. In an example, based on the first message, the selected gNB-CU may transmit a message to the gNB-DU to configure one or more radio configuration parameters (e.g. physical layer resource/power/cell configuration parameters, and/or RLC/MAC layer configuration parameters associated with resource/power/cell) for the wireless device, and/or may receive, from the gNB-DU, the one or more radio configuration parameters configured by the gNB-DU. The one or more radio configuration parameters configured by the gNB-DU may be added to the response message.

In an example, the selected gNB-CU and/or the gNB-DU may configure/apply one or more parameters associated with the wireless device and/or to serve the wireless device, e.g. based on the first message and/or the response message. The one or more parameters may comprise at least one of configuration parameters for an F1 bearer/logical channel, radio resource parameters (e.g. for SDAP, RRC, RLC, MAC, PHY, and/or the like), security parameters, NG interface session parameters (e.g. PDU sessions, QoS flows, network slices, and/or the like), resource scheduling parameters, priority management parameters, service policy related parameters, and/or the like. In an example, the response message (transmitted to the wireless device) for the first message may comprise the one or more parameters. In an example, the selected gNB-CU (e.g. the first gNB-CU and/or the second gNB-CU) and/or the gNB-DU may serve the wireless device based on the one or more parameters. In an example, the selected gNB-CU (e.g. the first gNB-CU and/or the second gNB-CU) and/or the gNB-DU may transmit (forward)/receive packets (e.g. PDCP packets) to/from the wireless device via radio interface and/or the F1 interface (e.g. F1 user plane interface (e.g. configured bearers/logical channels), F1 control plane interface, and/or the like). In an example, if the selected gNB-CU is the first gNB-CU (e.g. the first PLMN), packets (e.g. PDCP packets, PDCP SDU, SDAP SDU, data, and/or the like) associated with the wireless device may be received/transmitted (forwarded) by a first core network (e.g. UPF, SGW, PGW, and/or the like) of the first PLMN (e.g. first service operator). In an example, if the selected gNB-CU is the second gNB-CU (e.g. the second PLMN), packets (e.g. PDCP packets, PDCP SDU, SDAP SDU, data, and/or the like) associated with the wireless device may be received/transmitted (forwarded) by a second core network (e.g. UPF, SGW, PGW, and/or the like) of the second PLMN (e.g. second service operator).

In an example, if the first message comprises an RRC connection request message, the gNB-DU may receive, from the first gNB-CU and/or the second gNB-CU, an RRC connection setup message in response to the RRC connection request message. In an example, the gNB-DU may forward/transmit the RRC connection setup message to the wireless device, and/or may receive an RRC connection setup complete message in response to transmitting the RRC connection setup message. The gNB-DU may transmit/forward the RRC connection setup complete message to the gNB-CU. In an example, if the first message comprises an RRC connection resume request message, the gNB-DU may receive, from the first gNB-CU and/or the second gNB-CU, an RRC connection resume message in response to the RRC connection resume request message. In an example, the gNB-DU may forward/transmit the RRC connection resume message to the wireless device, and/or may receive an RRC connection resume complete message in response to transmitting the RRC connection resume message. The gNB-DU may transmit/forward the RRC connection resume complete message to the gNB-CU.

In an example, in response to/based on receiving the first message (e.g. the RRC connection request message/the RRC connection setup complete message; and/or the RRC connection resume request message/the RRC connection resume complete message) comprising at least one of the first PLMN identifier, the first cell identifier (and/or the third cell identifier), the first gNB identifier, the first gNB-CU identifier, the first TAC, the first TAI, the first RAC, the first RAI, the first RNA identifier, the first RAN area identifier, the first resume identifier, and/or the like (e.g. indicating that the wireless device is allowed (and/or accessible, able, authorized) to access to (and/or employ) the first PLMN and/or the serving cell), the first gNB and/or the base station (e.g. comprising the gNB-DU) may transmit, to a core network entity (e.g. AMF, MME) of the first PLMN, an NG interface message (e.g. an initial UE message, and/or one or more UE context configuration related messages) to configure UE context with one or more core network entities (e.g. AMF, MME, UPF, SGW, PGW).

In an example, in response to/based on receiving the first message (e.g. the RRC connection request message/the RRC connection setup complete message; and/or the RRC connection resume request message/the RRC connection resume complete message) comprising at least one of the first PLMN identifier, the third cell identifier (and/or the first cell identifier), the first gNB identifier, the first gNB-CU identifier, the third TAC, the third TAI, the third RAC, the third RAI, the third RNA identifier, the third RAN area identifier, the third resume identifier, and/or the like (e.g. indicating that the wireless device is allowed (and/or accessible, able, authorized) to access to (and/or employ) the first gNB-CU/the first gNB/the first PLMN and/or the serving cell), the first gNB and/or the base station (e.g. comprising the gNB-DU) may transmit, to a core network entity (e.g. AMF, MME) of the first PLMN, an NG interface message (e.g. an initial UE message, and/or one or more UE context configuration related messages) to configure UE context with one or more core network entities (e.g. AMF, MME, UPF, SGW, PGW).

In an example, in response to/based on receiving the first message (e.g. the RRC connection request message/the RRC connection setup complete message; and/or the RRC connection resume request message/the RRC connection resume complete message) comprising at least one of the second PLMN identifier, the second cell identifier (and/or the fourth cell identifier), the second gNB identifier, the second gNB-CU identifier, the second TAC, the second TAI, the second RAC, the second RAI, the second RNA identifier, the second RAN area identifier, the second resume identifier, and/or the like (e.g. indicating that the wireless device is allowed (and/or accessible, able, authorized) to access to (and/or employ) the second PLMN and/or the serving cell), the second gNB and/or the base station (e.g. comprising the gNB-DU) may transmit, to a core network entity (e.g. AMF, MME) of the second PLMN, an NG interface message (e.g. an initial UE message, and/or one or more UE context configuration related messages) to configure UE context with one or more core network entities (e.g. AMF, MME, UPF, SGW, PGW).

In an example, in response to/based on receiving the first message (e.g. the RRC connection request message/the RRC connection setup complete message; and/or the RRC connection resume request message/the RRC connection resume complete message) comprising at least one of the second PLMN identifier, the fourth cell identifier (and/or the second cell identifier), the second gNB identifier, the second gNB-CU identifier, the fourth TAC, the fourth TAI, the fourth RAC, the fourth RAI, the fourth RNA identifier, the fourth RAN area identifier, the fourth resume identifier, and/or the like (e.g. indicating that the wireless device is allowed (and/or accessible, able, authorized) to access to (and/or employ) the second gNB-CU/the second gNB/the second PLMN and/or the serving cell), the second gNB and/or the base station (e.g. comprising the gNB-DU) may transmit, to a core network entity (e.g. AMF, MME) of the second PLMN, an NG interface message (e.g. an initial UE message, and/or one or more UE context configuration related messages) to configure UE context with one or more core network entities (e.g. AMF, MME, UPF, SGW, PGW).

In an example, in response to/based on receiving the first message, the base station (e.g. the gNB, the first gNB, the second gNB) may select a core network entity (e.g. AMF, MME) based on the serving cell via which the wireless device transmits the first message to the base station (e.g. the gNB, the first gNB, the second gNB, the gNB-DU).

In an example, if the base station receives the first message via the one or more first serving cells (e.g. supporting the first PLMN and/or the first gNB-CU/the first gNB), the base station may select a core network entity (e.g. AMF, MME) of the first PLMN and/or transmit, to the selected core network entity of the first PLMN, an NG interface message (e.g. an initial UE message, and/or one or more UE context configuration related messages) to configure UE context with one or more core network entities (e.g. AMF, MME, UPF, SGW, PGW).

In an example, if the base station receives the first message via the one or more second serving cells (e.g. supporting the second PLMN and/or the second gNB-CU/ the second gNB), the base station may select a core network entity (e.g. AMF, MME) of the second PLMN and/or transmit, to the selected core network entity of the second PLMN, an NG interface message (e.g. an initial UE message, and/or one or more UE context configuration related messages) to configure UE context with one or more core network entities (e.g. AMF, MME, UPF, SGW, PGW).

In an example, if the gNB-DU receives the first message via the one or more third serving cells (e.g. supporting the first PLMN and the second PLMN; and/or supporting the first gNB-CU/the first gNB and the second gNB-CU/the second gNB), the base station may select at least one core network entity (e.g. AMF, MME) of the first PLMN and/or the second PLMN and/or transmit, to the at least one selected core network entity of the first PLMN and/or the second PLMN, an NG interface message (e.g. an initial UE message, and/or one or more UE context configuration related messages) to configure UE context with one or more core network entities (e.g. AMF, MME, UPF, SGW, PGW).

In an example, a base station distributed unit may receive, from a first base station central unit, a first message comprising a first public land mobile network (PLMN) identifier of a first PLMN supported by the first base station central unit. The base station distributed unit may receive from a second base station central unit, a second message comprising a second PLMN identifier of a second PLMN supported by the second base station central unit. In an example, the base station distributed unit may transmit (e.g. broadcast) at least one third message comprising the first PLMN identifier and the second PLMN identifier. The base station distributed unit may receive, from a wireless device, a fourth message comprising one of the first PLMN identifier or the second PLMN identifier. The base station distributed unit may select one of the first base station central unit and the second base station central unit as a selected one based on the one of the first PLMN identifier or the second PLMN identifier. The selected one may support a PLMN of the one of the first PLMN identifier or the second PLMN identifier PLMN. The base station distributed unit may forward the fourth message to the selected one.

In an example, the first message and/or the second message may comprise at least one of an F1 setup response message, a base station central unit configuration update message, and/or a base station distributed unit configuration update acknowledge message. In an example, the base station distributed unit may transmit, to the first base station central unit, a fifth message indicating a first F1 setup request, and/or the first message may be response for the fifth message. The base station distributed unit may transmit, to the second base station central unit, a sixth message indicating a second F1 setup request, and/or the second message may be response for the sixth message.

In an example, the base station distributed unit may transmit to the first base station central unit and/or in response to receiving the first message, a seventh message indicating a first base station central unit configuration update acknowledge. In an example, the base station distributed unit may transmit to the second base station central unit and/or in response to receiving the second message, an eighth message indicating a second base station central unit configuration update acknowledge. In an example, the at least one third message may comprise a system information block (e.g. system information block type 1). In an example, the base station distributed unit may transmit, to the first base station central unit and/or the second base station central unit, a system information block comprising at least one of the first PLMN identifier and/or the second PLMN identifier. The base station distributed unit may receive the at least one third message from the first base station central unit and/or the second base station central unit, and/or the at least one third message may comprise the system information block (e.g. system information block type 1). In an example, the fourth message may comprise a radio resource control message. In an example, the base station distributed unit may transmit the at least one third message via a first cell supporting at least one of the first PLMN and/or the second PLMN. In an example, the base station distributed unit may transmit first one of the at least one third message via a second cell, the first one comprising the first PLMN identifier. In an example, the base station distributed unit may transmit second one of the at least one third message via a third cell, the second one comprising the second PLMN identifier.

In an example, the base station distributed unit may receive, from the second base station central unit, one or more second configuration parameters associated with the second base station central unit and/or the second PLMN. The base station distributed unit may transmit, to the first base station central unit, the one or more second configuration parameters. The base station distributed unit may receive, from the first base station central unit, at least one system information block comprising at least one of: one or more first configuration parameters (e.g. and/or a first system information block) associated with the first base station central unit and/or the first PLMN; and/or the one or more second configuration parameters (e.g. and/or a second system information block) associated with the second base station central unit and/or the second PLMN. The base station distributed unit may transmit (forward/broadcast) the at least one system information block. The base station distributed unit may transmit, to the second base station central unit, the at least one system information block.

In an example, the base station distributed unit may receive, from the first base station central unit, at least one system information block comprising at least one of: one or more first configuration parameters (e.g. and/or a first system information block) associated with the first base station central unit and/or the first PLMN; and/or one or more second configuration parameters (e.g. and/or a second system information block) associated with the second base station central unit and/or the second PLMN. The first base station central unit may receive the one or more second configuration parameters from the second base station central unit (e.g. via an interface between the first gNB-CU and the second gNB-CU). The base station distributed unit may transmit (forward/broadcast) the at least one system information block. In an example, the base station distributed unit may transmit, to the second base station central unit, the at least one system information block.

In an example, the base station distributed unit may receive, from the first base station central unit, one or more first configuration parameters associated with the first base station central unit and/or the first PLMN. The base station distributed unit may receive, from the second base station central unit, one or more second configuration parameters associated with the second base station central unit and/or the second PLMN. The base station distributed unit may determine at least one system information block comprising at least one of: the one or more first configuration parameters (e.g. and/or a first system information block) associated with the first gNB-CU and/or the first PLMN; and/or the one or more second configuration parameters (e.g. and/or a second system information block) associated with the second base station central unit and/or the second PLMN. (In an example, the base station distributed unit may transmit, to the first base station central unit and/or the second base station central unit, the at least one system information block. The base station distributed unit may receive, from the first base station central unit and/or the second base station central unit, the at least one system information block.) In an example, the base station distributed unit may transmit (forward/broadcast) the at least one system information block.

In an example, the base station distributed unit may receive, from the first base station central unit, at least one of: one or more first configuration parameters associated with the first base station central unit and/or the first PLMN; and/or one or more second configuration parameters associated with the second base station central unit and/or the second PLMN. The first base station central unit may receive the one or more second configuration parameters from the second base station central unit. The base station distributed unit may determine at least one system information block comprising the one or more first configuration parameters (e.g. and/or a first system information block) associated with the first base station central unit and/or the first PLMN and/or the one or more second configuration parameters (e.g. and/or a second system information block) associated with the second base station central unit and/or the second PLMN. (In an example, the base station distributed unit may transmit, to the first base station central unit and/or the second base station central unit, the at least one system information block. The base station distributed unit may receive, from the first base station central unit and/or the second base station central unit, the at least one system information block.) In an example, the base station distributed unit may transmit (forward/broadcast) the at least one system information block.

In an example, the base station distributed unit may receive, from the second base station central unit, one or more second configuration parameters associated with the second base station central unit and/or the second PLMN. The base station distributed unit may transmit, to the first base station central unit, the one or more second configuration parameters. The base station distributed unit may receive, from the first base station central unit, at least one system information block comprising one or more configuration parameters associated with the first PLMN and/or the second PLMN (and/or associated with the first base station central unit and/or the second base station central unit). The base station distributed unit may transmit (forward/broadcast) the at least one system information block. The base station distributed unit may transmit, to the second base station central unit, the at least one system information block.

In an example, the base station distributed unit may receive, from the first base station central unit, at least one system information block comprising one or more configuration parameters associated with the first PLMN and/or the second PLMN (and/or associated with the first base station central unit and/or the second base station central unit). The base station distributed unit may transmit (forward/broadcast) the at least one system information block. The base station distributed unit may transmit, to the second base station central unit, the at least one system information block.

In an example, the base station distributed unit may receive, from the first base station central unit, one or more first configuration parameters associated with the first base station central unit and/or the first PLMN, and/or may receive, from the second base station central unit, one or more second configuration parameters associated with the second base station central unit and/or the second PLMN. In an example, the base station distributed unit may determine, based on the one or more first configuration parameters and/or the one or more second configuration parameters, at least one system information block comprising one or more configuration parameters associated with the first PLMN and/or the second PLMN (and/or associated with the first base station central unit and/or the second base station central unit). (In an example, the base station distributed unit may transmit, to the first base station central unit and/or the second base station central unit, the at least one system information block. The base station distributed unit may receive, from the first base station central unit and/or the second base station central unit, the at least one system information block.) In an example, the base station distributed unit may transmit (forward/broadcast) the at least one system information block.

In an example, the base station distributed unit may receive, from the first base station central unit, at least one of: one or more first configuration parameters associated with the first base station central unit and/or the first PLMN; and/or one or more second configuration parameters associated with the second base station central unit or the second PLMN. The first base station central unit may receive the one or more second configuration parameters from the second base station central unit. The base station distributed unit may determine, based on the one or more first configuration parameters and/or the one or more second configuration parameters, at least one system information block comprising one or more configuration parameters associated with the first PLMN and/or the second PLMN (or associated with the first base station central unit and/or the second base station central unit). (In an example, the base station distributed unit may transmit, to the first base station central unit and/or the second base station central unit, the at least one system information block. The base station distributed unit may receive, from the first base station central unit and/or the second base station central unit, the at least one system information block.) In an example, the base station distributed unit may transmit (forward/broadcast) the at least one system information block.

In an example, a base station distributed unit may transmit, to a first base station central unit, a first message indicating a first interface setup request. The base station distributed unit may receive, from the first base station central unit in response to the first message, a second message indicating a first interface setup response. The second message may comprise a first public land mobile network (PLMN) identifier of a first PLMN supported by the first base station central unit. The base station distribute unit may transmit, to a second base station central unit, a third message indicating a second interface setup request. The base station distributed unit may receive, from the second base station central unit in response to the third message, a fourth message indicating a second interface setup response. The fourth message may comprise a second PLMN identifier of a second PLMN supported by the second base station central unit. In an example, the base station distributed unit may transmit, to the first base station central unit, a fifth message comprising a system information block for a cell of the base station distributed unit. The system information block may comprise the first PLMN identifier and the second PLMN identifier. In an example, the base station distributed unit may transmit, to the second base station central unit, a sixth message comprising the system information block for the cell of the base station distributed unit. The system information block may comprise the first PLMN identifier and the second PLMN identifier.

In an example, a base station distributed unit may establish interface connections with a plurality of base station central units comprising a first base station central unit of a first public land mobile network (PLMN) and/or a second base station central unit of a second PLMN. The base station distributed unit may transmit to a wireless device a random-access response in response to receiving one or more random-access preambles (e.g. via a cell). The base station distributed unit may receive, from the wireless device and/or in response to the random-access response, a first message comprising a first PLMN identifier of the first PLMN. The base station distributed unit may select the first base station central unit based on the first PLMN identifier. The base station distributed unit may transmit/forward, to the first base station central unit, the first message in response to selecting the first base station central unit. In an example, the base station distributed unit may transmit/broadcast at least one system information block comprising at least one of the first PLMN identifier of the first PLMN and/or a second PLMN identifier of the second PLMN. In an example, the base station distributed unit may transmit/broadcast the at least on system information block via a cell shared by the first PLMN and the second PLMN. In an example, the wireless device may transmit the one or more random-access preambles to the base station distributed unit based on the at least one system information block.

In an example, the base station distributed unit may receive, from the first base station central unit, a response message for the first message. The base station distributed unit may transmit/forward, to the wireless device, the response message. In an example, the response message may comprise at least one of a radio resource control connection setup message and/or a radio resource control connection resume message. In an example, the first message may comprise a radio resource control message. In an example, the first message may comprise at least one of a radio resource control connection request message and/or a radio resource control connection resume request message. In an example, the first message may comprise a wireless device identifier of the wireless device. In an example, the wireless device may be allowed to access to the first PLMN. In an example, the wireless device may have one or more PLMN identifiers of one or more PLMNs allowed to access. The one or more PLMN identifiers may comprise the first PLMN identifier. In an example, the interface connections may comprise at least one of an F1 control plane interface and/or an F1 user plane interface.

In an example, the base station distributed unit may receive, from a second wireless device, a second message comprising a second PLMN identifier of the second PLMN. The base station distributed unit may select the second base station central unit based on the second PLMN identifier. The base station distributed unit may transmit/forward, to the second base station central unit, the second message in response to selecting the second base station central unit. In an example, the base station distribute unit may receive, from the wireless device, the one or more random-access preambles via the cell. In an example, the cell may be shared by the first PLMN and the second PLMN. In an example, the base station distributed unit may receive, from the wireless device, one or more radio resource control messages comprising at least one of: a wireless device identifier of the wireless device (e.g. C-RNTI); a first cell identifier of the cell (e.g. the cell identifier may be associated with the first PLMN); a first base station central unit identifier of the first base station central unit; a first base station identifier of the first base station central unit; a first tracking area code of the cell for the first PLMN; and/or the first PLMN identifier. The base station distributed unit may select the first base station central unit based on at least one of: the wireless device identifier (e.g. C-RNTI); the first cell identifier of the cell; the first base station central unit identifier; the first base station identifier; the first tracking area code; and/or the first PLMN identifier. The base station distributed unit may transmit/forward, to the first base station central unit, the one or more radio resource control messages.

In an example, a base station distributed unit may establish interface connections with a plurality of base station central units comprising a first base station central unit of a first public land mobile network (PLMN) and/or a second base station central unit of a second PLMN. The base station distributed unit may transmit, to a wireless device, a random-access response in response to receiving one or more random-access preambles. The base station distributed unit may receive, from the wireless device and/or in response to the random-access response, a first message comprising a first cell identifier of a cell. The first cell identifier may be for the first PLMN. The base station distributed unit may select the first base station central unit based on the first cell identifier. The base station distributed unit may transmit/forward, to the first base station central unit, the first message in response to selecting the first base station central unit. In an example, the base station distributed unit may transmit/broadcast at least one system information block comprising at least one of: the first cell identifier of the cell; a second cell identifier of the cell (e.g. the second cell identifier may be for the second PLMN); a first PLMN identifier of the first PLMN; and/or a second PLMN identifier of the second PLMN.

In an example, the base station distribute unit may transmit/broadcast the at least on system information block via the cell. In an example, the wireless device may transmit the one or more random-access preambles to the base station distributed unit based on the at least one system information block. In an example, the base station distributed unit may receive, from the first base station central unit, a response message for the first message. The base station distributed unit may transmit/forward, to the wireless device, the response message. In an example, the response message may comprise at least one of a radio resource control connection setup message and/or a radio resource control connection resume message. In an example, the first message may comprise a radio resource control message. In an example, the first message may comprise at least one of a radio resource control connection request message (e.g. message 3) and/or a radio resource control connection resume request message. In an example, the first message may comprise a wireless device identifier of the wireless device. In an example, the wireless device may be allowed to access to the first PLMN. In an example, the wireless device may have one or more PLMN identifiers of one or more PLMNs allowed to access. The one or more PLMN identifiers may comprise a first PLMN identifier of the first cell identifier of the cell. In an example, the interface connections may comprise at least one of an F1 control plane interface and/or an F1 user plane interface.

In an example, the base station distributed unit may receive, from a second wireless device, a second message comprising a second cell identifier of the cell. The second cell identifier may be for the second PLMN. The base station distributed unit may select the second base station central unit based on the second cell identifier. The base station distributed unit may transmit/forward, to the second base station central unit, the second message in response to selecting the second base station central unit. In an example, the base station distribute unit may receive, from the wireless device, the one or more random-access preambles via the cell. In an example, the cell may be shared by the first PLMN and the second PLMN.

In an example, a base station distributed unit may establish interface connections with a plurality of base station central units comprising a first base station central unit of a first public land mobile network (PLMN) and/or a second base station central unit of a second PLMN. The base station distributed unit may transmit, to a wireless device, a random-access response in response to receiving one or more random-access preambles via a cell. The base station distributed unit may receive, from the wireless device and/or in response to the random-access response, a first message comprising a first indication parameter. The base station distributed unit may select the first base station central unit based on the first indication parameter. The base station distributed unit may transmit/forward, to the first base station central unit, the first message in response to selecting the first base station central unit. In an example, the first indication parameter may comprise at least one of: a first PLMN identifier of the first PLMN; a first cell identifier of the cell (e.g. the first cell identifier may be for the first PLMN); a first tracking area code of the cell (e.g. the first tracking area code may be for the first PLMN); a first tracking area identifier of the cell (e.g. the first tracking area identifier may be for the first PLMN); a first registration area code of the cell (e.g. the first registration area code may be for the first PLMN); a first registration area identifier of the cell (e.g. the first registration area identifier may be for the first PLMN); a first base station identifier of the first base station central unit; and/or a first base station central unit identifier of the first base station central unit.

In an example, the base station distributed unit may transmit/broadcast at least one system information block comprising at least one of: a first PLMN identifier of the first PLMN; a first cell identifier of the cell (e.g. the first cell identifier may be for the first PLMN); a first tracking area code of the cell (e.g. the first tracking area code may be for the first PLMN); a first tracking area identifier of the cell (e.g. the first tracking area identifier may be for the first PLMN); a first registration area code of the cell (e.g. the first registration area code may be for the first PLMN); a first registration area identifier of the cell (e.g. the first registration area identifier may be for the first PLMN); a first base station identifier of the first base station central unit; a first base station central unit identifier of the first base station central unit; a second PLMN identifier of the second PLMN; a second cell identifier of the cell (e.g. the second cell identifier may be for the second PLMN); a second tracking area code of the cell (e.g. the second tracking area code may be for the second PLMN); a second tracking area identifier of the cell (e.g. the second tracking area identifier may be for the second PLMN); a second registration area code of the cell (e.g. the second registration area code may be for the second PLMN); a second registration area identifier of the cell (e.g. the second registration area identifier may be for the second PLMN); a second base station identifier of the second base station central unit; and/or a second base station central unit identifier of the second base station central unit.

In an example, the base station distribute unit may transmit/broadcast the at least on system information block via the cell. The wireless device may transmit the one or more random-access preambles to the base station distributed unit based on the at least one system information block. In an example, the base station distribute unit may receive, from the first base station central unit, a response message for the first message. The base station distributed unit may transmit/forward, to the wireless device, the response message. The response message may comprise at least one of a radio resource control connection setup message and/or a radio resource control connection resume message. In an example, the first message may comprise a radio resource control message. In an example, the first message may comprise at least one of a radio resource control connection request message (e.g. message 3) and/or a radio resource control connection resume request message. In an example, the first message further may comprise a wireless device identifier of the wireless device. In an example, the wireless device may be allowed to access to the first PLMN.

In an example, the wireless device may have one or more PLMN identifiers of one or more PLMNs allowed to access. The one or more PLMN identifiers may comprise a first PLMN identifier associated with the first indication parameter. The interface connections may comprise at least one of an F1 control plane interface and/or an F1 user plane interface. In an example, the base station distributed unit may receive, from a second wireless device, a second message comprising a second indication parameter of the cell. The second cell identifier may be for the second PLMN. The base station distribute unit may select the second base station central unit based on the second indication parameter. The base station distribute unit may transmit/forward, to the second base station central unit, the second message in response to selecting the second base station central unit. In an example, the base station distribute unit may receive, from the wireless device, the one or more random-access preambles via the cell. In an example, the cell may be shared by the first PLMN and the second PLMN.

In an example, a base station may receive, from a wireless device, a first radio resource control message comprising a first indication parameter of a cell. The first indication parameter may be associated with a first PLMN. The base station may select a core network entity based on the first indication parameter. The base station may transmit, to the selected core network entity, a first message indicating an initial access of the wireless device. In an example, the cell may be shared by the first PLMN and a second PLMN. In an example, the base station may be connected to at least one of a first core network entity of the first PLMN and/or a second core network entity of a second PLMN. In an example, the first indication parameter may comprise at least one of: a first PLMN identifier of the first PLMN; a first cell identifier of a cell (e.g. the first cell identifier may be for the first PLMN); a first tracking area code of the cell (e.g. the first tracking area code may be for the first PLMN); a first tracking area identifier of the cell (e.g. the first tracking area identifier may be for the first PLMN); a first registration area code of the cell (e.g. the first registration area code may be for the first PLMN); a first registration area identifier of the cell (e.g. the first registration area identifier may be for the first PLMN); a first base station identifier of the first base station central unit; and/or a first base station central unit identifier of the first base station central unit.

In an example, the base station may transmit/broadcast at least one system information block comprising at least one of: a first PLMN identifier of the first PLMN; a first cell identifier of the cell (e.g. the first cell identifier may be for the first PLMN); a first tracking area code of the cell (e.g. the first tracking area code may be for the first PLMN); a first tracking area identifier of the cell (e.g. the first tracking area identifier may be for the first PLMN); a first registration area code of the cell (e.g. the first registration area code may be for the first PLMN); a first registration area identifier of the cell (e.g. the first registration area identifier may be for the first PLMN); a first base station identifier of the first base station central unit; a first base station central unit identifier of the first base station central unit; a second PLMN identifier of the second PLMN; a second cell identifier of the cell (e.g. the second cell identifier may be for the second PLMN); a second tracking area code of the cell (e.g. the second tracking area code may be for the second PLMN); a second tracking area identifier of the cell (e.g. the second tracking area identifier may be for the second PLMN); a second registration area code of the cell (e.g. the second registration area code may be for the second PLMN); a second registration area identifier of the cell (e.g. the second registration area identifier may be for the second PLMN); a second base station identifier of the second base station central unit; and/or a second base station central unit identifier of the second base station central unit. In an example, the wireless device may transmit the first radio resource control message based on the at least one system information block.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

According to various embodiments, a device such as, for example, a wireless device, a base station, base station distributed unit, a base station central unit, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figures 43, 44:
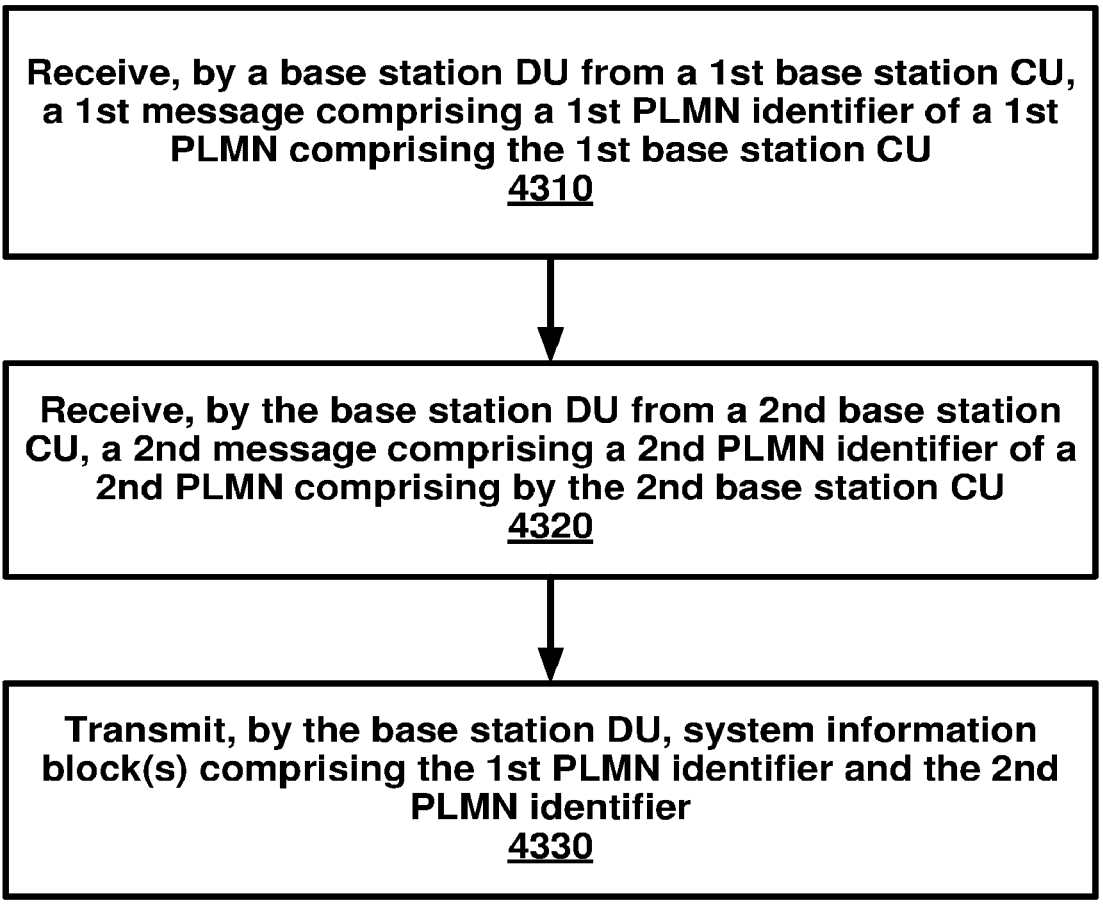
FIG. 43 is an diagram of an aspect of an example embodiment of the present disclosure.
FIG. 44 is an diagram of an aspect of an example embodiment of the present disclosure.

FIG. 43 is an flow diagram as per an aspect of an example embodiment of the present disclosure. At 4310, a first message may be received by a base station distributed unit from a first base station central unit. The first message may comprise a first public land mobile network (PLMN) identifier of a first PLMN. The first PLMN may comprise the first base station central unit. At 4120, the base station distributed unit may receive a second message from a second base station central unit. The second message may comprise a second PLMN identifier of a second PLMN. The second PLMN may comprise the second base station central unit. At 4130, the base station distributed unit may transmit at least one system information block. The at least one system information block may comprise the first PLMN identifier and the second PLMN identifier.

According to an example embodiment, the base station distributed unit may receive a radio resource control message from a wireless device. The radio resource control message may be based on the at least one system information block. The base station distributed unit may configure radio resources for the wireless device based on the radio resource control message. The wireless device may be associated with the first PLMN. The wireless device may be associated with the second PLMN.

According to an example embodiment, the base station distributed unit may receive packets from the first base station central unit. The base station distributed unit may receive packets from the second base station central unit. The base station distributed unit may transmit the packets to a wireless device associated with the first PLMN, The base station distributed unit may transmit the packets to a wireless device associated with the second PLMN.

According to an example embodiment, the first message and the second message comprise an F1 setup response message. The first message and the second message comprise a base station central unit configuration update message. The first message and the second message comprise a base station distributed unit configuration update acknowledge message.

According to an example embodiment, the base station distributed unit may transmit a first F1 setup request message to the first base station central unit. The first message may be response for the first F1 setup request message. the base station distributed unit may transmit a second F1 setup request message to the second base station central unit. The second message is response for the second F1 setup request message.

According to an example embodiment, the at least one system information block may comprise cell parameters for at least one of the first PLMN or the second PLMN. The cell parameters may comprise a cell identifier of a cell that the at least one system information block is transmitted via. The cell parameters may comprise a closed subscriber group identifier of the cell. The cell parameters may comprise a first cell identifier of the cell. The first cell identifier may be associated with the first PLMN. The cell parameters may comprise a second cell identifier of the cell. The second cell identifier may be associated with the second PLMN. The cell parameters may comprise a first closed subscriber group identifier of the cell. The first closed subscriber group identifier may be associated with the first PLMN. The cell parameters may comprise a second closed subscriber group identifier of the cell. The second closed subscriber group identifier may be associated with the second PLMN. The cell parameters may comprise a first base station central unit identifier of the first base station central unit. The cell parameters may comprise a second base station central unit identifier of the first base station central unit. The cell parameters may comprise a first base station identifier of a first base station associated with the first base station central unit. The cell parameters may comprise a second base station identifier of a second base station associated with the second base station central unit.

According to an example embodiment, the transmission of the at least one system information block may comprise transmitting the at least one system information block via a cell that is shared for the first PLMN and the second PLMN. According to an example embodiment, the at least one system information block may comprise a first system information block comprising the first PLMN identifier. The at least one system information block may comprise a second system information block comprising the second PLMN identifier.

According to an example embodiment, the first system information block may comprise a first cell identifier of a cell. The first cell identifier may be associated with the first PLMN. The first system information block may comprise a first closed subscriber group identifier of the cell. The first closed subscriber group identifier may be associated with the first PLMN. The first system information block may comprise a first base station central unit identifier of the first base station central unit. The first system information block may comprise a first base station identifier of a first base station may be associated with the first base station central unit. According to an example embodiment, the first system information block comprise a second cell identifier of a cell. The second cell identifier may be associated with the second PLMN. The first system information block comprise a second closed subscriber group identifier of the cell. The second closed subscriber group identifier may be associated with the second PLMN. The first system information block comprise a second base station central unit identifier of the first base station central unit. The first system information block comprise a second base station identifier of a second base station may be associated with the second base station central unit. According to an example embodiment, the at least one system information block may comprise a first system information block. The first system information block may comprise the first PLMN identifier.

The first system information block may be transmitted via a first cell of the first PLMN. The at least one system information block may comprise a second system information block comprising the second PLMN identifier. The second system information block transmitted via a second cell of the second PLMN. According to an example embodiment, the base station distributed unit may receive the at least one system information block from the first base station central unit. According to an example embodiment, the base station distributed unit may transmit configuration parameters to the first base station central unit. The configuration parameters may comprise the second PLMN identifier. The at least one system information block may be based on the configuration parameters. According to an example embodiment, the base station distributed unit may determine the at least one system information block based on the first message and the second message. According to an example embodiment, the base station distributed unit may transmit the at least one system information block to at least one of the first base station central unit or the second base station central unit. According to an example embodiment, the at least one system information block may comprise a system information block 1. According to an example embodiment, a base station may comprise the first base station central unit, the second base station central unit, and the base station distributed unit.

According to an example embodiment, a first base station may comprise the first base station central unit and the base station distributed unit. A second base station may comprise the second base station central unit and the base station distributed unit. According to an example embodiment, the base station distributed unit may serve a cell shared by the first PLMN and the second PLMN. The base station distributed unit may serve a first cell of the first PLMN. The base station distributed unit may serve a second cell of the second PLMN. According to an example embodiment, the base station distributed unit may receive a third message from a third base station central unit. The third message may comprise a third PLMN identifier of a third PLMN comprising the third base station central unit. The at least one system information block may comprise the third PLMN identifier.

FIG. 44 is an example flow diagram as per an aspect of an embodiment of the present disclosure. At 4410, a shared base station distributed unit may communicate first packets with a first non-shared base station central unit of a first public land mobile network (PLMN). The first packets may be associated with the first PLMN. According to an example embodiment, the shared base station distributed unit may be shared by the first PLMN and a second PLMN. According to an example embodiment, a first non-shared base station central unit of a first public land mobile network (PLMN) may communicate first packets with a shared base station distributed unit. The first packets may be associated with the first PLMN. According to an example embodiment, the shared base station distributed unit may be shared by the first PLMN and a second PLMN.

FIG. 45 is an example flow diagram as per an aspect of an embodiment of the present disclosure. At 4510, a base station distributed unit may communicate first packets with a first base station central unit of a first public land mobile network (PLMN). The first packets may be associated with the first PLMN. The base station distributed unit may communicate with a second PLMN. The first base station central unit may not communicate with the second PLMN. According to an example embodiment, the base station distributed unit may be shared by the first PLMN and the second PLMN. According to an example embodiment, a first base station central unit of a first public land mobile network (PLMN) may communicate first packets with a base station distributed unit. The first packets may be associated with the first PLMN. The first base station central unit may not communicate with a second PLMN. The base station distributed unit may communicate with the second PLMN. According to an example embodiment, the base station distributed unit may be shared by the first PLMN and the second PLMN.

According to an example embodiment, a base station distributed unit may communicate first packets with a first base station central unit of a first public land mobile network (PLMN). The first packets may be associated with the first PLMN. The base station distributed unit may communicate second packets with a second base station central unit of a second PLMN. The second packets may be associated with the second PLMN. According to an example embodiment, the base station distributed unit may determine the first base station central unit for the communication of the first packets based on the first base station central unit being associated with the first PLMN. The base station distributed unit may determine the second base station central unit for the communicating the second packets based on the second base station central unit being associated with the second PLMN. According to an example embodiment, the communication of the first packets may comprise transmitting at least one of the first packets. The communication of the first packets may comprise receiving at least one of the first packets.

According to an example embodiment, a base station distributed unit may transmit first packets to a first base station central unit of a first public land mobile network (PLMN). The first packets may be received from a first wireless device associated with the first PLMN. The base station distributed unit may transmit second packets to a second base station central unit of a second PLMN. The second packets may be received from a second wireless device associated with the second PLMN. According to an example embodiment, the first packets may comprise control plane packets. The second packets may comprise control plane packets. According to an example embodiment, the first packets may comprise user plane packets. The second packets may comprise user plane packets.

According to an example embodiment, a base station distributed unit may transmit at least one system information block. The at least one system information block may comprise a first public land mobile network (PLMN) identifier of a first PLMN. The at least one system information block may comprise a second PLMN identifier of a second PLMN. The base station distributed unit may communicate first packets with a first base station central unit of the first PLMN. The first packets may be associated with the first PLMN. The base station distributed unit may communicate second packets with a second base station central unit of the second PLMN. The second packets may be associated with the second PLMN.

According to an example embodiment, a base station distributed unit may transmit at least one system information block. The at least one system information block may comprise a first public land mobile network (PLMN) identifier of a first PLMN. The at least one system information block may comprise a second PLMN identifier of a second PLMN. The base station distributed unit may transmit first packets to a first base station central unit of the first PLMN. The first packets may be received from a first wireless device associated with the first PLMN. The base station distributed unit may transmit second packets to a second base station central unit of the second PLMN. The second packets may be received from a second wireless device associated with the second PLMN.

According to an example embodiment, a base station distributed unit may communicate with a first base station central unit of a first public land mobile network (PLMN). The base station distributed unit may communicate with a second base station central unit of a second PLMN. The base station distributed unit may transmit at least one system information block. The at least one system information block may comprise a first PLMN identifier of a first PLMN. The at least one system information block may comprise a second PLMN identifier of a second PLMN.

According to an example embodiment, a base station distributed unit may receive a first message from a first base station central unit. The first message may comprise a first public land mobile network (PLMN) identifier of a first PLMN comprising the first base station central unit. The base station distributed unit may receive a second message from a second base station central unit. The second message may comprise a second PLMN identifier of a second PLMN comprising the second base station central unit. The base station distributed unit may transmit packets to a wireless device associated with at least one of the first PLMN and the second PLMN. The packets may be received from at least one of the first base station central unit and the second base station central unit.

FIG. 46 is an example flow diagram as per an aspect of an embodiment of the present disclosure. At 4610, a base station distributed unit may receive at least one system information block from a first base station central unit. The at least one system information block may comprise one or more first configuration parameters associated with the first base station central unit. The at least one system information block may comprise one or more second configuration parameters associated with a second base station central unit. At 4620, the base station distributed unit may transmit the at least one system information block. According to an example embodiment, the first base station central unit may be associated with a first public land mobile network (PLMN). The second base station central unit may be associated with a second PLMN. According to an example embodiment, the one or more first configuration parameters may comprise a first public land mobile network (PLMN) identifier of the first PLMN. The one or more second configuration parameters may comprise a second PLMN identifier of a second PLMN.

Figure 47:
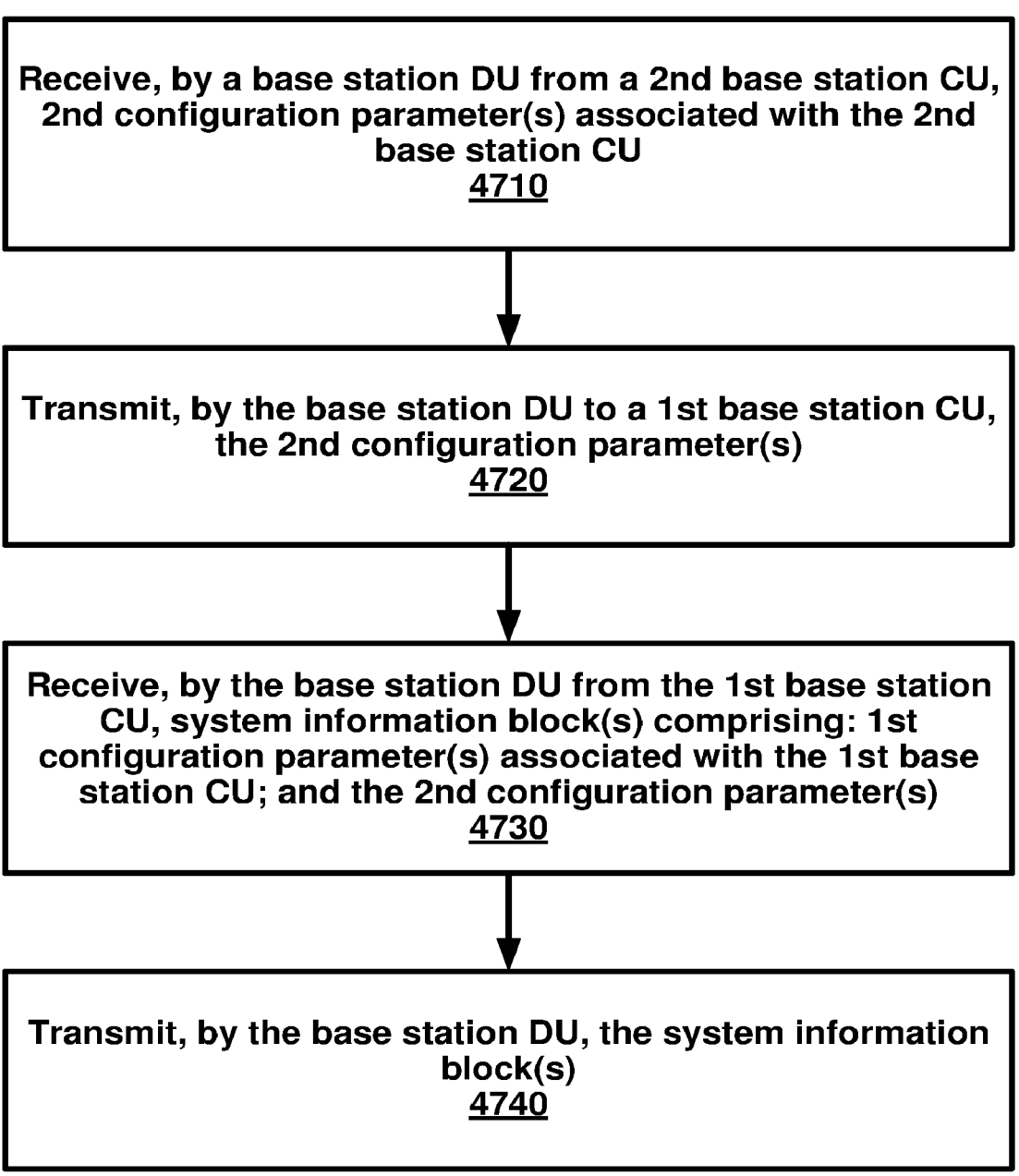
FIG. 47 is an diagram of an aspect of an example embodiment of the present disclosure.

FIG. 47 is an example flow diagram as per an aspect of an embodiment of the present disclosure. At 4710, a base station distributed unit may receive one or more second configuration parameters from a second base station central unit. The one or more second configuration parameters may be associated with the second base station central unit. At 4720, the base station distributed unit may transmit the one or more second configuration parameters to a first base station central unit. At 4730, the base station distributed unit may receive at least one system information block from the first base station central unit. The at least one system information block may comprise one or more first configuration parameters associated with the first base station central unit. The at least one system information block may comprise the one or more second configuration parameters. At 4740, the base station distributed unit may transmit the at least one system information block.

FIG. 48 is an example flow diagram as per an aspect of an embodiment of the present disclosure. At 4810, a first base station central unit may receive one or more second configuration parameters from a base station distributed unit. The one or more second configuration parameters may be associated with a second base station central unit. At 4820, the first base station central unit may send at least one system information block to the base station distributed unit. The at least one system information block may comprise one or more first configuration parameters associated with the first base station central unit. The at least one system information block may comprise the one or more second configuration parameters.

According to an example embodiment, a first base station central unit may receive one or more second configuration parameters from a second base station central unit. The one or more second configuration parameters may be associated with the second base station central unit. The first base station central unit may send at least one system information block to a base station distributed unit. The at least one system information block may comprise one or more first configuration parameters associated with the first base station central unit. The at least one system information block may comprise the one or more second configuration parameters.

FIG. 49 is an example flow diagram as per an aspect of an embodiment of the present disclosure. At 4910, a base station distributed unit may receive a first message from a first base station central unit. The first message may comprise a first network identifier of a first network that the first base station central unit supports. At 4920, a second message may be received from a second base station central unit. The second message may comprise a second network identifier of a second network that the second base station central unit supports. At 4930, at least one system information block may be transmitted. The at least one system information block may comprise the first network identifier. The at least one system information block may comprise the second network identifier. According to an example embodiment, the first network may comprise a public land mobile network (PLMN). The first network may comprise a mobile network. The first network may comprise a vehicle-to-everything communication system. The first network may comprise an intelligent transportation system (ITS). The first network may comprise an Internet-of-things (IoT) system. The first network may comprise satellite network. The second network may comprise a public land mobile network (PLMN). The second network may comprise a mobile network. The second network may comprise a vehicle-to-everything communication system. The second network may comprise an intelligent transportation system (ITS). The second network may comprise an Internet-of-things (IoT) system. The second network may comprise satellite network.

Figure 50:
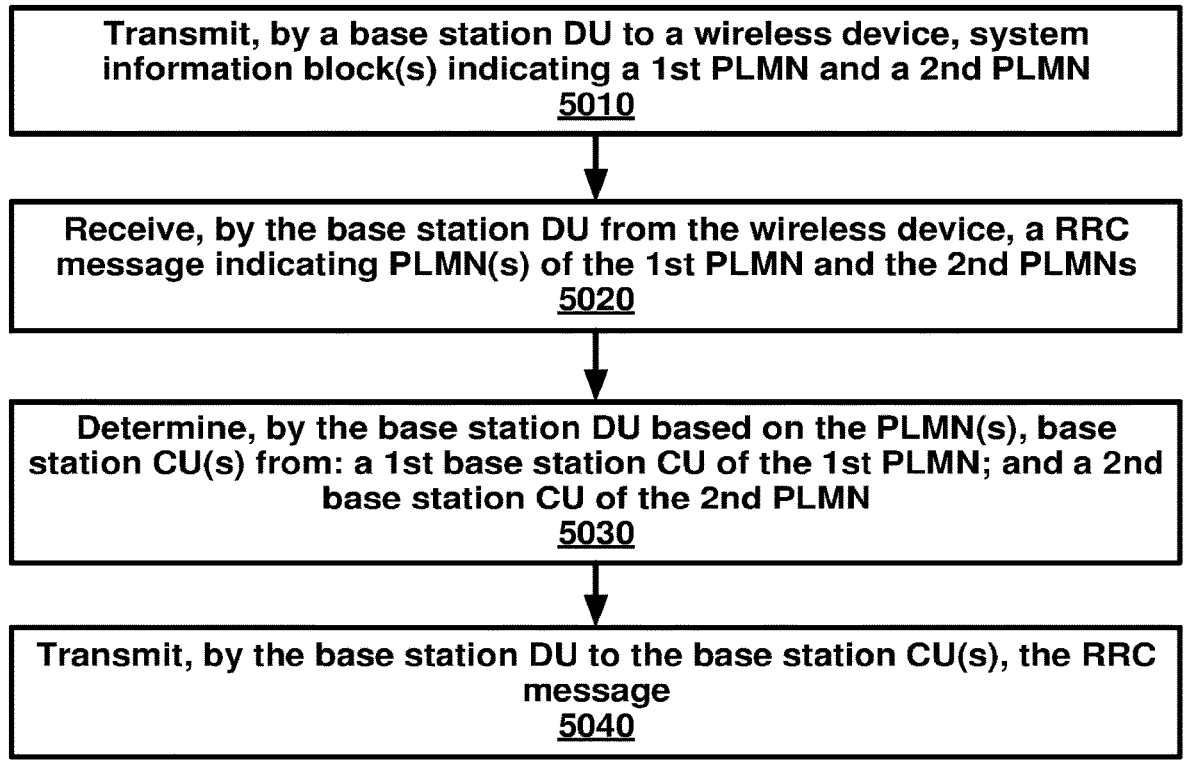
FIG. 50 is an diagram of an aspect of an example embodiment of the present disclosure.

FIG. 50 is an example flow diagram as per an aspect of an embodiment of the present disclosure. At 5010, a base station distributed unit may transmit at least one system information block to a wireless device. The at least one system information block may indicate a first public land mobile network (PLMN). The at least one system information block may indicate a second PLMN. At 5020, the base station distributed unit may receive a radio resource control message from the wireless device. The radio resource control message may indicate at least one PLMN of the first PLMN and the second PLMN. At 5030, the base station distributed unit may determine, based on the at least one PLMN, at least one base station central unit from: a first base station central unit of the first PLMN; and a second base station central unit of the second PLMN. At 5040, the base station distributed unit may transmit the radio resource control message to the at least one base station central unit.

According to an example embodiment, the radio resource control message may comprise a radio resource control complete message. The radio resource control message may comprise a radio resource control request message. The radio resource control message may comprise a radio resource control resume complete message. The radio resource control message may comprise a radio resource control resume request message. According to an example embodiment, the base station distributed unit may receive from the wireless device, at least one random access preamble based on the at least one system information block. The base station distributed unit may transmit to the wireless device, a random access response for the at least one random access preamble. The radio resource control message may be based on the random access response.

According to an example embodiment, the base station distributed unit may receive a radio resource control setup message from the at least one base station central unit. The radio resource control setup message may comprise cell configuration parameters for the wireless device. The radio resource control setup message may be a response for the radio resource control message. The base station distributed unit may transmit the radio resource control setup message to the wireless device. According to an example embodiment, the base station distributed unit may receive a configuration request message for the wireless device from the at least one base station central unit. The base station distributed unit may determine, based on the configuration request message, the cell configuration parameters. The base station distributed unit may transmit a configuration response message to the at least one base station central unit. The configuration response message may comprise the cell configuration parameters. The radio resource control setup message may be based on the configuration response message.

According to an example embodiment, the base station distributed unit may receive from the at least one base station central unit, packets for the wireless device. The base station distributed unit may transmit the packets to the wireless device. According to an example embodiment, the receiving of the radio resource control message may comprise receiving the radio resource control message via a cell that is shared for the first PLMN and the second PLMN. According to an example embodiment, the receiving of the radio resource control message may comprise receiving the radio resource control message via a first cell of the first PLMN. The receiving of the radio resource control message may comprise receiving the radio resource control message via a second cell of the second PLMN.

According to an example embodiment, the determination of the at least one base station central unit may be further based on a cell that the base station distributed unit receives the radio resource control message via. The cell may comprise the first cell. The cell may comprise the second cell.

According to an example embodiment, the transmission of the at least one system information block may comprise transmitting the at least one system information block via a cell that is shared for the first PLMN and the second PLMN. The transmission of the at least one system information block may comprise transmitting a first system information block comprising a first PLMN identifier of the first PLMN via a first cell of the first PLMN. The transmission of the at least one system information block may comprise transmitting a second system information block comprising a second PLMN identifier of the second PLMN via a second cell of the second PLMN.

According to an example embodiment, the radio resource control message may comprise one or more parameters for the at least one PLMN. The one or more parameters may comprise at least one PLMN identifier of the at least one PLMN. The one or more parameters may comprise a cell identifier of a cell that the base station distributed unit receives the radio resource control message via. The one or more parameters may comprise a tracking area code of the cell. The one or more parameters may comprise a registration area code of the cell. The one or more parameters may comprise a first cell identifier of a first cell associated with the first PLMN. The one or more parameters may comprise a second cell identifier of a second cell associated with the second PLMN. The one or more parameters may comprise a base station central unit identifier of the at least one base station central unit. The one or more parameters may comprise a base station identifier of a base station associated with the at least one base station central unit. According to an example embodiment, the determination of the at least one base station central unit may be further based on the one or more parameters for the at least one PLMN. According to an example embodiment, the at least one system information block may comprise the one or more parameters for the at least one PLMN.

According to an example embodiment, the base station distributed unit may configure radio resources for the wireless device. According to an example embodiment, the wireless device may be allowed to access the at least on PLMN. According to an example embodiment, the at least one system information block may comprise a first system information block comprising a first PLMN identifier of the first PLMN. The first system information block may be transmitted via a first cell of the first PLMN. According to an example embodiment, the at least one system information block may comprise a second system information block comprising a second PLMN identifier of the second PLMN. The second system information block may be transmitted via a second cell of the second PLMN. According to an example embodiment, the at least one system information block may comprise a system information block 1. According to an example embodiment, a base station may comprise the first base station central unit. A base station may comprise the second base station central unit. A base station may comprise the base station distributed unit. According to an example embodiment, a first base station may comprise the first base station and the base station distributed unit. According to an example embodiment, a second base station comprise the second base station and the base station distributed unit. According to an example embodiment, the base station distributed unit may serve a cell shared by the first PLMN and the second PLMN. The base station distributed unit may serve a first cell of the first PLMN. The base station distributed unit may serve a second cell of the second PLMN. According to an example embodiment, the base station distributed unit may receive a second radio resource control message from a second wireless device. The second radio resource control message may indicate a third PLMN. The base station distributed unit may determine, based on the third PLMN, a third base station central unit of the third PLMN. The base station distributed unit may transmit the radio resource control message to the third base station central unit.

Figure 51:
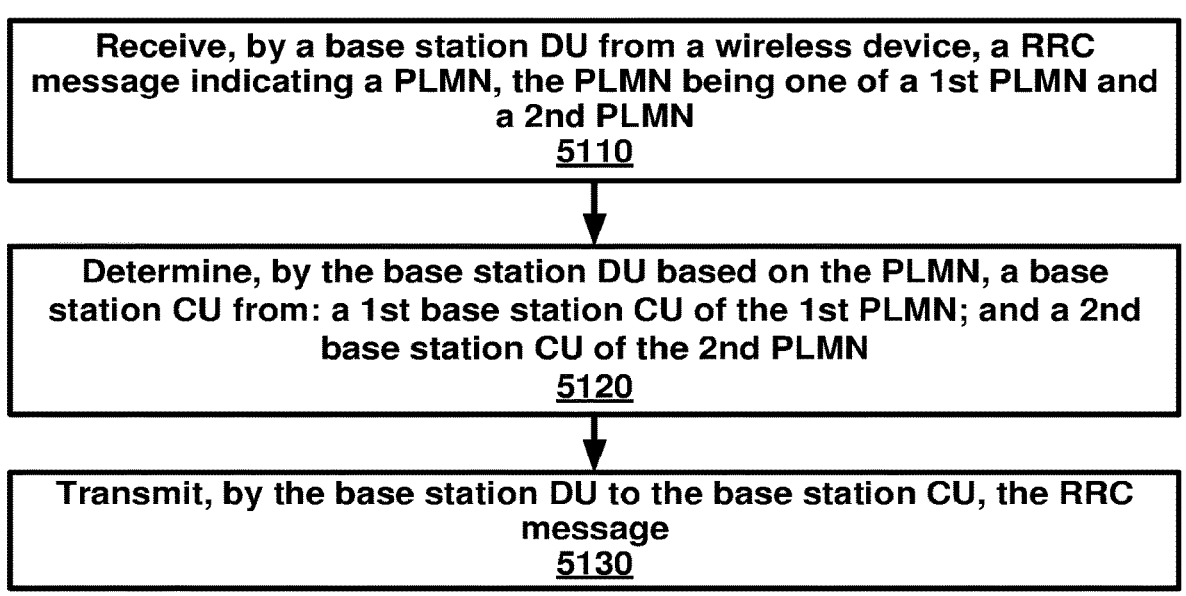
FIG. 51 is an diagram of an aspect of an example embodiment of the present disclosure.

FIG. 51 is an example flow diagram as per an aspect of an embodiment of the present disclosure. At 5110, a base station distributed unit may receive a radio resource control message from a wireless device. The radio resource control message may indicate a public land mobile network (PLMN). The PLMN may be one of a first PLMN and a second PLMN. At 5120, the base station distributed unit may determine, based on the PLMN, a base station central unit from: a first base station central unit of the first PLMN; and a second base station central unit of the second PLMN. At 5130, the base station distributed unit may transmit the radio resource control message to the base station central unit.

According to an example embodiment, the radio resource control message may comprise a first parameter indicating the first PLMN. The first parameter may comprise a first PLMN identifier. The first parameter may comprise a first cell identifier of a cell. The first parameter may comprise a first base station central unit identifier of the first base station central unit. The first parameter may comprise a first base station identifier of the first base station central unit. The first parameter may comprise a first closed subscriber group identifier of a cell. The first parameter may comprise a first tracking area code of the cell. The first parameter may comprise a first registration area code of the cell.

According to an example embodiment, the radio resource control message may comprise a second parameter indicating the second PLMN. The second parameter may comprise a second PLMN identifier. The second parameter may comprise a second cell identifier of a cell. The second parameter may comprise a second base station central unit identifier of the second base station central unit. The second parameter may comprise a second base station identifier of the second base station central unit. The second parameter may comprise a second closed subscriber group identifier of a cell. The second parameter may comprise a second tracking area code of the cell. The second parameter may comprise a second registration area code of the cell.

FIG. 52 is an example flow diagram as per an aspect of an embodiment of the present disclosure. At 5210, a base station distributed unit may transmit at least one system information block to a wireless device. The at least one system information block may comprise a first public land mobile network (PLMN) identifier of a first base station central unit. The at least one system information block may comprise a second PLMN identifier of a second base station central unit. At 5220, the base station distributed unit may receive a radio resource control message from the wireless device. The radio resource control message may comprise at least one PLMN identifier selected from the first PLMN identifier and the second PLMN identifier. At 5230, the base station distributed unit may select at least one base station central unit from the first base station central unit and the second base station central unit. The selection may be based on the at least one PLMN identifier. At 5240, the base station distributed unit may transmit the radio resource control message to the at least one base station central unit.

According to an example embodiment, a base station distributed unit may transmit at least one system information block to a wireless device. The at least one system information block may indicate a first public land mobile network (PLMN). The at least one system information block may indicate a second PLMN. the base station distributed unit may receive a radio resource control message from the wireless device. The radio resource control message may comprise at least one base station central unit identifier associated with at least one PLMN of the first PLMN and the second PLMN. The base station distributed unit may select, based on the at least one base station central unit identifier, at least one base station central unit from: a first base station central unit of the first PLMN; and a second base station central unit of the second PLMN. The base station distributed unit may transmit the radio resource control message to the at least one base station central unit. According to an example embodiment, the at least one base station central unit identifier may indicate the at least one base station central unit supports the at least one PLMN.

FIG. 53 is an example flow diagram as per an aspect of an embodiment of the present disclosure. At 5310, a base station distributed unit may transmit at least one system information block to a wireless device. The at least one system information block may indicate a first public land mobile network (PLMN). he at least one system information block may indicate a second PLMN. At 5320, may receive, by the base station distributed unit from the wireless device, a radio resource control message comprising at least one cell identifier of a cell. The at least one cell identifier may be associated with at least one PLMN of the first PLMN and the second PLMN. At 5330, the base station distributed unit may determine, based on the at least one cell identifier, at least one base station central unit from: a first base station central unit of the first PLMN; and a second base station central unit of the second PLMN. At 5340, the base station distributed unit may transmit the radio resource control message to the at least one base station central unit.

Figure 54:
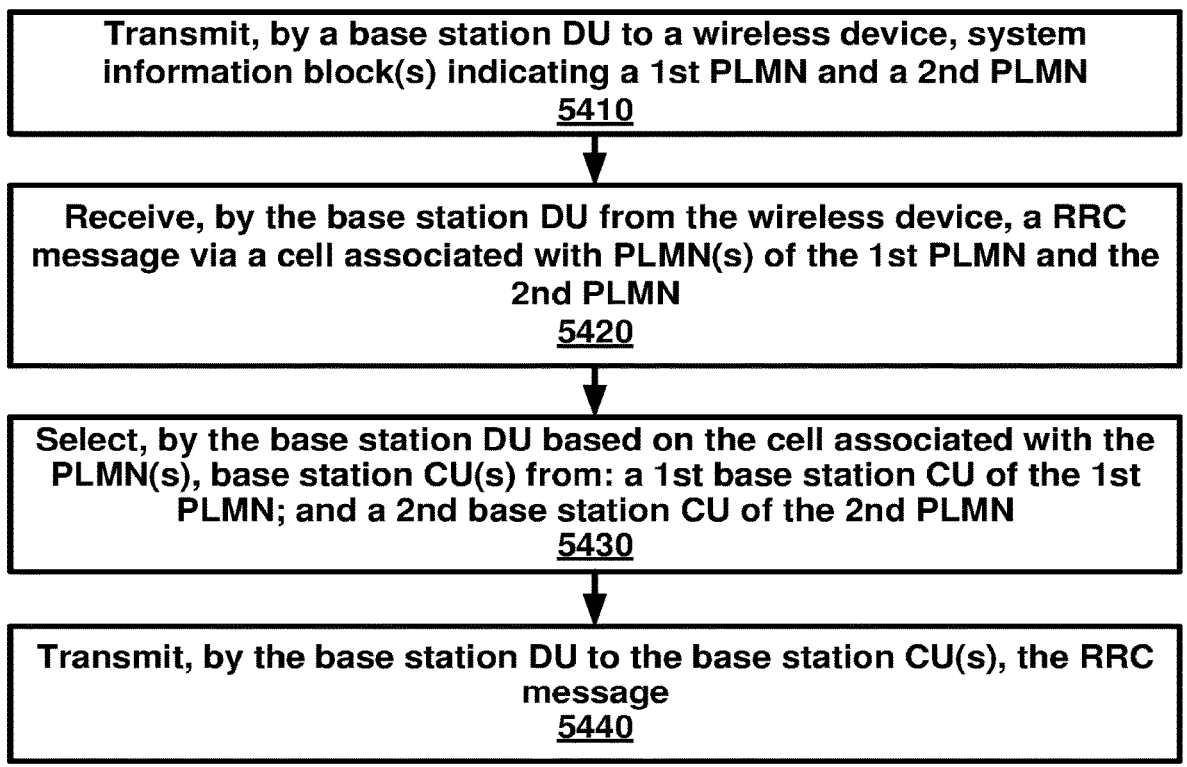
FIG. 54 is an diagram of an aspect of an example embodiment of the present disclosure.

FIG. 54 is an example flow diagram as per an aspect of an embodiment of the present disclosure. At 5410, a base station distributed unit may transmit at least one system information block to a wireless device. The at least one system information block may indicate a first public land mobile network (PLMN). The at least one system information block may indicate a second PLMN. At 5420, the base station distributed unit may receive a radio resource control message from the wireless device via a cell associated with at least one PLMN of the first PLMN and the second PLMN. At 5430, the base station distributed unit may select, based on the cell associated with the at least one PLMN, at least one base station central unit from: a first base station central unit of the first PLMN; and a second base station central unit of the second PLMN. At 5440, the base station distributed unit may transmit the radio resource control message to the at least one base station central unit.

According to an example embodiment, a base station distributed unit may transmit to a wireless device, at least one system information block indicating a plurality of public land mobile networks (PLMNs). A radio resource control message may be received from the wireless device. The radio resource control message may indicate a selected PLMN from the plurality of PLMNs. A base station central unit may be selected, based on the selected PLMN, from a plurality of base station central units. the base station central unit may transmit the radio resource control message. According to an example embodiment, the base station central unit may be associated with the selected PLMN.

Figure 55:
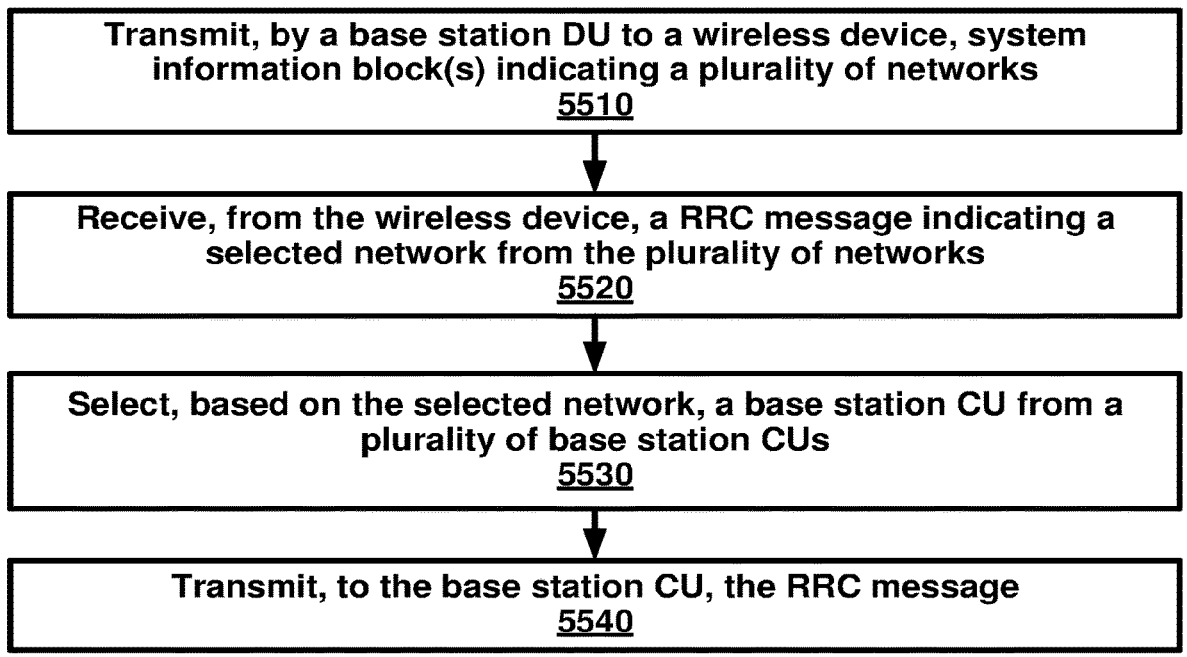
FIG. 55 is an diagram of an aspect of an example embodiment of the present disclosure.

FIG. 55 is an example flow diagram as per an aspect of an embodiment of the present disclosure. At 5510, a base station distributed unit may transmit at least one system information block to a wireless device. The at least one system information block may indicate a plurality of networks. At 5520, a radio resource control message may be received from the wireless device. The radio resource control message may indicate a selected network from the plurality of networks. At 5530, a base station central unit may be selected, based on the selected network, from a plurality of base station central units. At 5540, the base station central unit may transmit the radio resource control message. According to an example embodiment, the base station central unit may be associated with the selected network.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more (or at least one) message(s) comprise a plurality of parameters, it implies that a parameter in the plurality of parameters is in at least one of the one or more messages, but does not have to be in each of the one or more messages. In an example embodiment, when one or more (or at least one) message(s) indicate a value, event and/or condition, it implies that the value, event and/or condition is indicated by at least one of the one or more messages, but does not have to be indicated by each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:

1. A method comprising:
receiving, by a first base station central unit from a second base station central unit, a first message comprising a second public land mobile network (PLMN) identifier of a second PLMN comprising the second base station central unit,
transmitting, by the first base station central unit to a base station distributed unit, a second message comprising:
a first PLMN identifier of a first PLMN comprising the first base station central unit, and
the second PLMN identifier of the second PLMN;
receiving, by the first base station central unit from the base station distributed unit a radio resource control message indicating the first PLMN.

2. The method of claim 1, further comprising:
configuring, by the base station distributed unit at least one system information block comprising the first PLMN identifier and the second PLMN identifiers; and
transmitting, by the base station distributed unit to a wireless device, the at least one system information block.

3. The method of claim 2 further comprising:
receiving, by the base station distributed unit from the wireless device a radio resource control message indicating at least one PLMN of the first and the second PLMN;
determining, by the base station distributed unit based on the at least one PLMN, at least one base station central unit from:
the first base station central unit of the first PLMN; and
the second base station central unit of the second PLMN; and
transmitting, by the base station distributed unit to the at least one base station central unit, the radio resource control message.

4. The method of claim 1, wherein the radio resource control message comprises at least one of:
a radio resource control complete message;
a radio resource control request message;
a radio resource control resume complete message; or
a radio resource control resume request message.

5. The method of claim 1, further comprising:
transmitting, by at least one base station central unit to the base station distributed unit, a radio resource control setup message comprising cell configuration parameters for the wireless device, wherein the radio resource control setup message is a response for the radio resource control message; and
transmitting, by the base station distributed unit to the wireless device, the radio resource control setup message.

6. The method of claim 5, further comprising:
transmitting, by at least one base station central unit to the base station distributed unit, a configuration request message for the wireless device; and
receiving, by the at least one base station central unit from the base station distributed unit, a configuration response message comprising the cell configuration parameters, wherein the radio resource control setup message is based on the configuration response message.

7. The method of claim 1, further comprising:
transmitting, by at least one base station central unit to the base station distributed unit, packets for the wireless device.

8. The method of claim 3, wherein the receiving the radio resource control message comprises receiving the radio resource control message via a cell that is shared for the first PLMN and the second PLMN.

9. The method of claim 3, wherein the receiving the radio resource control message comprises receiving the radio resource control message via at least one of:
   a first cell of the first PLMN; or
   a second cell of the second PLMN.

10. The method of claim 2, wherein the transmitting the at least one system information block comprises at least one of:
   transmitting the at least one system information block via a cell that is shared for the first PLMN and the second PLMN;
   transmitting a first system information block comprising a first PLMN identifier of the first PLMN via a first cell of the first PLMN; or
   transmitting a second system information block comprising a second PLMN identifier of the second PLMN via a second cell of the second PLMN.

11. The method of claim 1, wherein the radio resource control message comprises one or more parameters for the at least one PLMN, the one or more parameters comprising at least one of:
   at least one PLMN identifier of the at least one PLMN;
   a cell identifier of a cell that the base station distributed unit receives the radio resource control message via;
   a tracking area code of the cell;
   a registration area code of the cell;
   a first cell identifier of a first cell associated with the first PLMN;
   a second cell identifier of a second cell associated with the second PLMN;
   a base station central unit identifier of at least one base station central unit; or
   a base station identifier of a base station associated with at least one base station central unit.

12. The method of claim 3, wherein the determining the at least one base station central unit is further based on the one or more parameters for the at least one PLMN.

13. The method of claim 2, further comprising configuring, by the base station distributed unit, radio resources for the wireless device.

14. The method of claim 2, wherein the wireless device is allowed to access the at least one PLMN.

15. The method of claim 2, wherein the at least one system information block comprises at least one of:
   a first system information block comprising a first PLMN identifier of the first PLMN, the first system information block transmitted via a first cell of the first PLMN; or
   a second system information block comprising a second PLMN identifier of the second PLMN, the second system information block transmitted via a second cell of the second PLMN.

16. The method of claim 2, wherein the at least one system information block comprises a system information block 1.

17. The method of claim 1, wherein a base station comprises the first base station central unit, the second base station central unit, and the base station distributed unit.

18. The method of claim 1, wherein:
   a first base station comprises the first base station central unit and the base station distributed unit; and
   a second base station comprises the second base station central unit and the base station distributed unit.

19. The method of claim 1, wherein the base station distributed unit serves at least one of: a cell shared by the first PLMN and the second PLMN;
   a first cell of the first PLMN; or
   a second cell of the second PLMN.

* * * * *